United States Patent [19]
Nagoshi et al.

[11] Patent Number: 6,164,745
[45] Date of Patent: Dec. 26, 2000

[54] INK JET RECORDING METHOD AND APPARATUS

[76] Inventors: Shigeyasu Nagoshi; Makoto Torigoe; Hiromitsu Hirabayashi; Miyuki Matsubara, all of c/o Canon Kabushiki Kaisha 30-2, 3-chome, Shimomaruko, Ohta-ku, Tokyo, Japan

[21] Appl. No.: 08/249,838

[22] Filed: May 26, 1994

[30] Foreign Application Priority Data

| May 27, 1993 | [JP] | Japan | 5-126393 |
|---|---|---|---|
| May 27, 1993 | [JP] | Japan | 5-126394 |
| Sep. 20, 1993 | [JP] | Japan | 5-233326 |
| Oct. 15, 1993 | [JP] | Japan | 5-258499 |

[51] Int. Cl.$^7$ ........................................... B41J 2/01
[52] U.S. Cl. ............................. 347/15; 347/41; 347/43
[58] Field of Search ............................. 347/15, 19, 41, 347/43

[56] References Cited

U.S. PATENT DOCUMENTS

| 4,313,124 | 1/1982 | Hara | 347/57 |
|---|---|---|---|
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,528,576 | 7/1985 | Koumara et al. | 346/140 R |
| 4,558,333 | 12/1985 | Sugitani et al. | 347/65 |
| 4,608,577 | 8/1986 | Hori | 347/66 |
| 4,675,696 | 6/1987 | Suzuki . | |
| 4,723,129 | 2/1988 | Endo et al. | 347/56 |
| 4,740,796 | 4/1988 | Endo et al. | 347/56 |
| 4,748,453 | 5/1988 | Lin et al. | 347/41 |
| 4,878,063 | 10/1989 | Katerberg | 346/75 |
| 4,967,203 | 10/1990 | Doan et al. | 347/41 |
| 4,999,646 | 3/1991 | Trask | 347/41 |
| 5,069,556 | 12/1991 | Sasaki et al. . | |
| 5,448,269 | 9/1995 | Beauchamp et al. | 347/19 |
| 5,633,663 | 5/1997 | Matsubara et al. | 347/41 |

FOREIGN PATENT DOCUMENTS

| 0173952 | 3/1986 | European Pat. Off. . |
|---|---|---|
| 0378759 | 7/1990 | European Pat. Off. . |
| 0526186 | 2/1993 | European Pat. Off. . |
| 0540245 | 5/1993 | European Pat. Off. . |
| 4015799 | 11/1991 | Germany . |
| 54-056847 | 5/1979 | Japan . |
| 55-113573 | 9/1980 | Japan . |
| 58-194541 | 11/1983 | Japan . |
| 59-123670 | 7/1984 | Japan . |
| 59-138461 | 8/1984 | Japan . |
| 60-071260 | 4/1985 | Japan . |
| 60-107975 | 6/1985 | Japan . |
| 62-135379 | 6/1987 | Japan . |
| 4041245 | 2/1992 | Japan . |
| WO93004443 | 3/1993 | WIPO . |

OTHER PUBLICATIONS

Research Disclosure, "Bi–Directional Print Alignment Ease–of–Use", No. 317, Sep. 1990.

*Primary Examiner*—John Barlow
*Assistant Examiner*—Craig A. Hallacher

[57] ABSTRACT

A plurality of recording heads capable of ejecting inks of different colors is reciprocated relative to a recording material to print ink dots on the recording material while effecting main scanning in the forward and the backward pass thereof. A plurality of thinning patterns produced by preparing m×n unit picture element groups and arraying these unit groups in such a manner that the groups avoid mutually adjoining and assume a mutually complementary relation is used to effect a plurality of rounds of main scanning in the forward and the backward pass over an area which can be printed by one round of main scanning, record a thinned image, and complete the recording of an image. The array of picture element groups in the thinning patterns is determined so that the groups may mutually adjoin relative to the direction of main scanning.

42 Claims, 60 Drawing Sheets

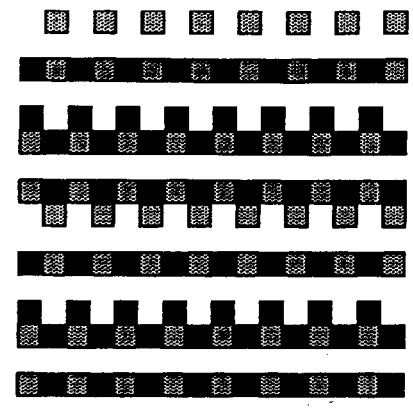
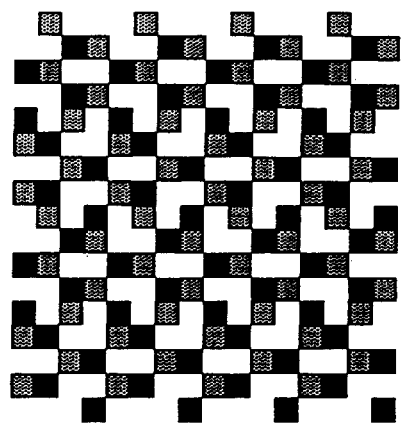
DEVIATION OF ONE PIXEL
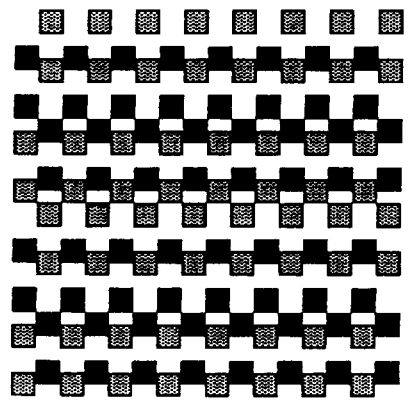
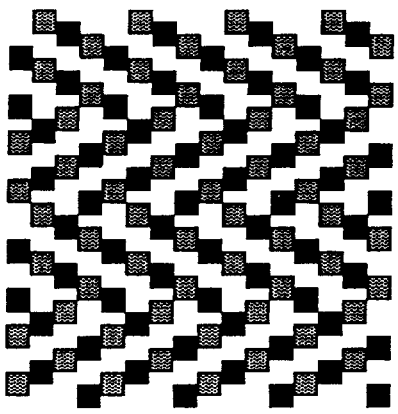
DEVIATION OF 1/2 PIXEL
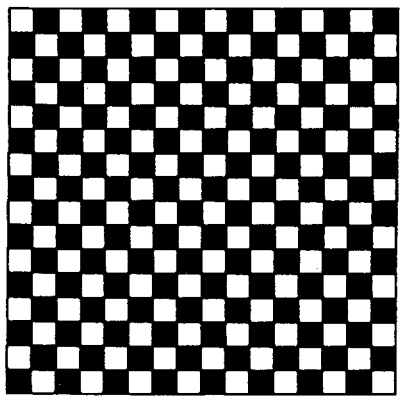
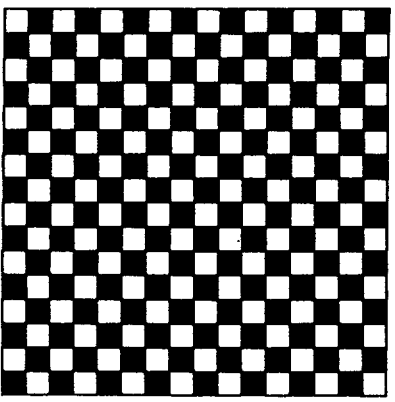
NO DEVIATION
FIG. 10A
DITHER A
FIG. 10B
DITHER B

FIG. 11A

| 43 | 27 | 39 | 23 | 42 | 26 | 38 | 22 |
|----|----|----|----|----|----|----|----|
| 11 | 59 | 7  | 55 | 10 | 58 | 6  | 54 |
| 35 | 19 | 47 | 31 | 34 | 18 | 46 | 30 |
| 3  | 51 | 15 | 63 | 2  | 50 | 14 | 62 |
| 41 | 25 | 37 | 21 | 44 | 28 | 40 | 24 |
| 9  | 57 | 5  | 53 | 12 | 60 | 8  | 56 |
| 33 | 17 | 45 | 29 | 36 | 20 | 48 | 32 |
| 1  | 49 | 13 | 61 | 4  | 52 | 16 | 64 |

(DITHER A)

FIG. 11B

| 47 | 11 | 31 | 59 | 54 | 18 | 6  | 34 |
|----|----|----|----|----|----|----|----|
| 27 | 63 | 43 | 15 | 2  | 38 | 50 | 22 |
| 39 | 3  | 23 | 51 | 62 | 26 | 14 | 42 |
| 19 | 55 | 35 | 7  | 10 | 46 | 58 | 30 |
| 61 | 25 | 13 | 41 | 40 | 4  | 24 | 52 |
| 9  | 45 | 57 | 29 | 20 | 56 | 36 | 8  |
| 53 | 17 | 5  | 33 | 48 | 12 | 32 | 60 |
| 1  | 37 | 49 | 21 | 28 | 64 | 44 | 16 |

(DITHER B)

FIG. 15

|  | 1ST SCAN | 2ND SCAN |
|---|---|---|
| FIG. 22A BLACK | 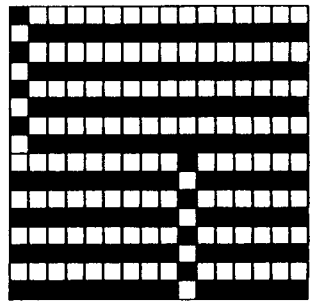 | 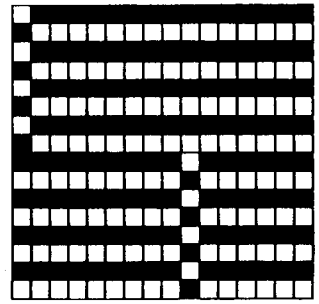 |
| FIG. 22B CYAN | 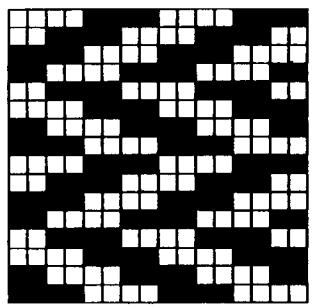 | 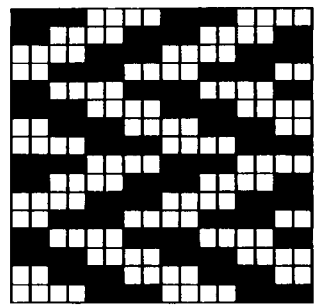 |
| FIG. 22C MAGENTA | 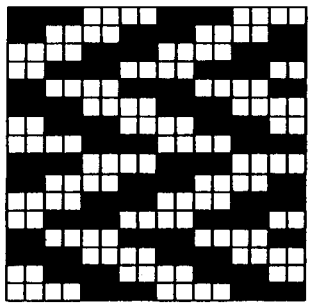 | 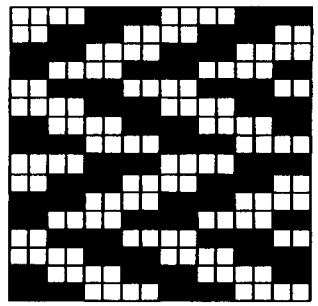 |
| FIG. 22D YELLOW | 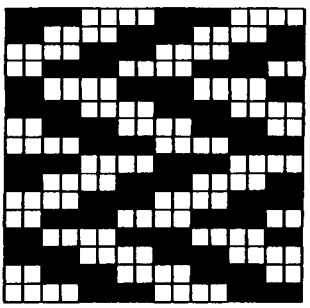 | 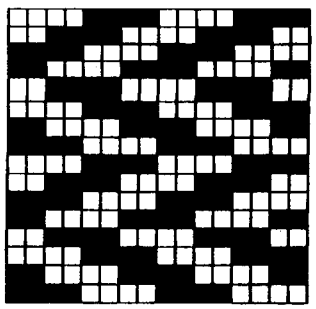 |

|  | 1ST SCAN | 2ND SCAN |
|---|---|---|
| FIG. 23A<br>EXAMPLE 1 | 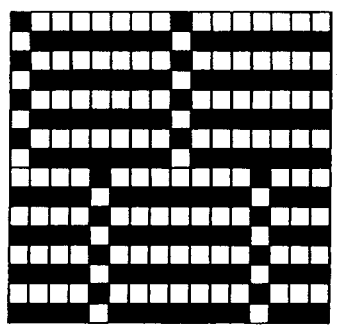 | 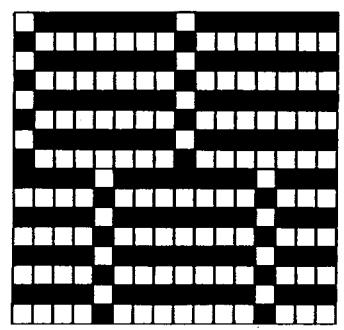 |
| FIG. 23B<br>EXAMPLE 2 | 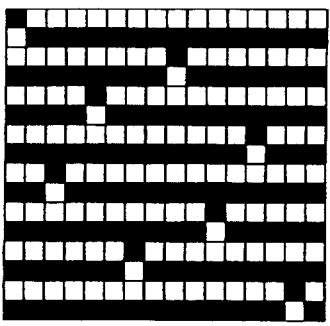 | 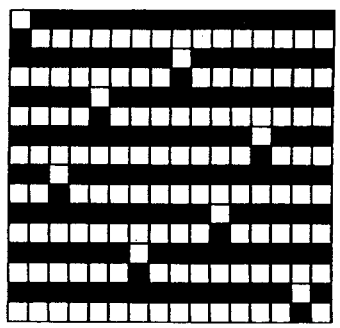 |

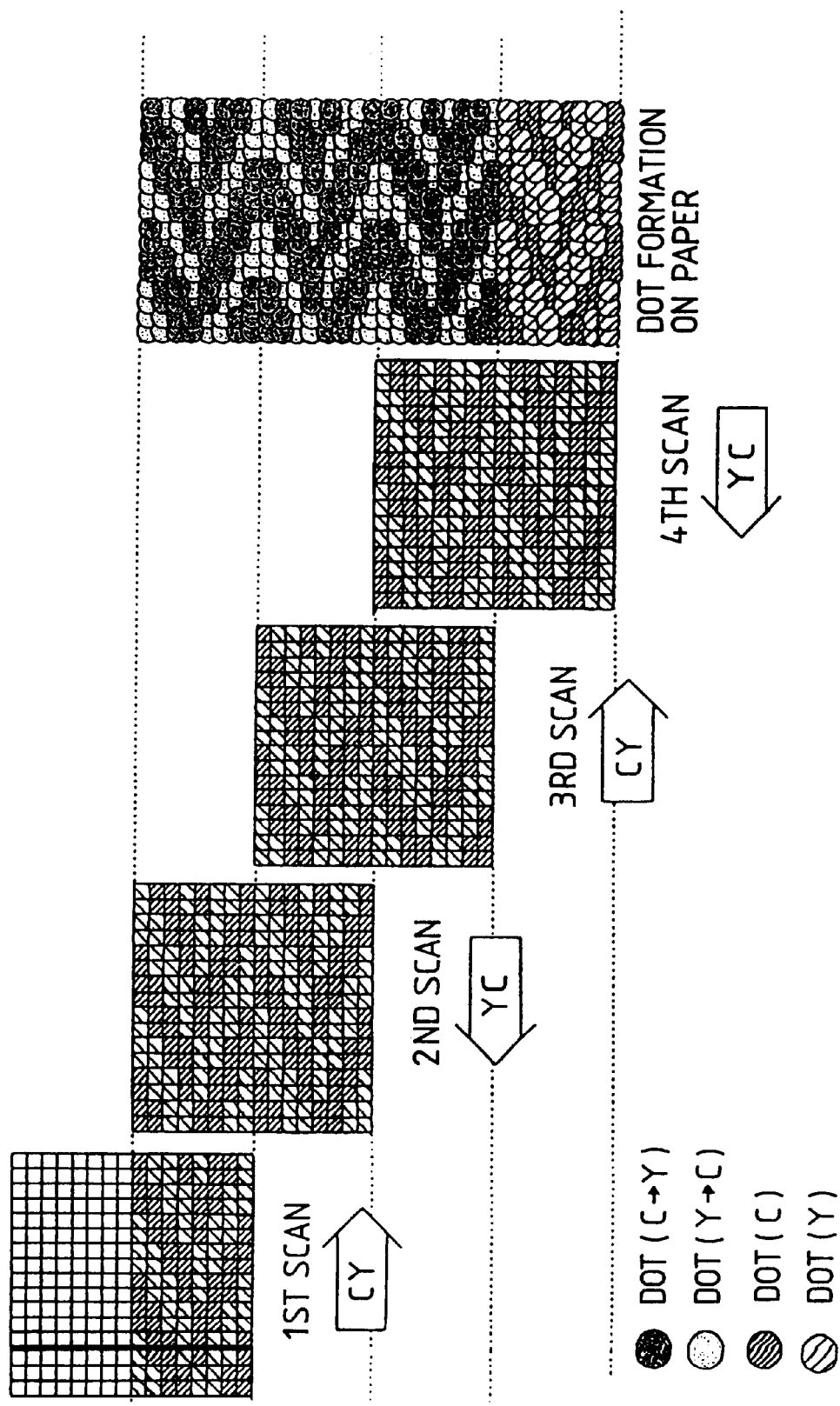

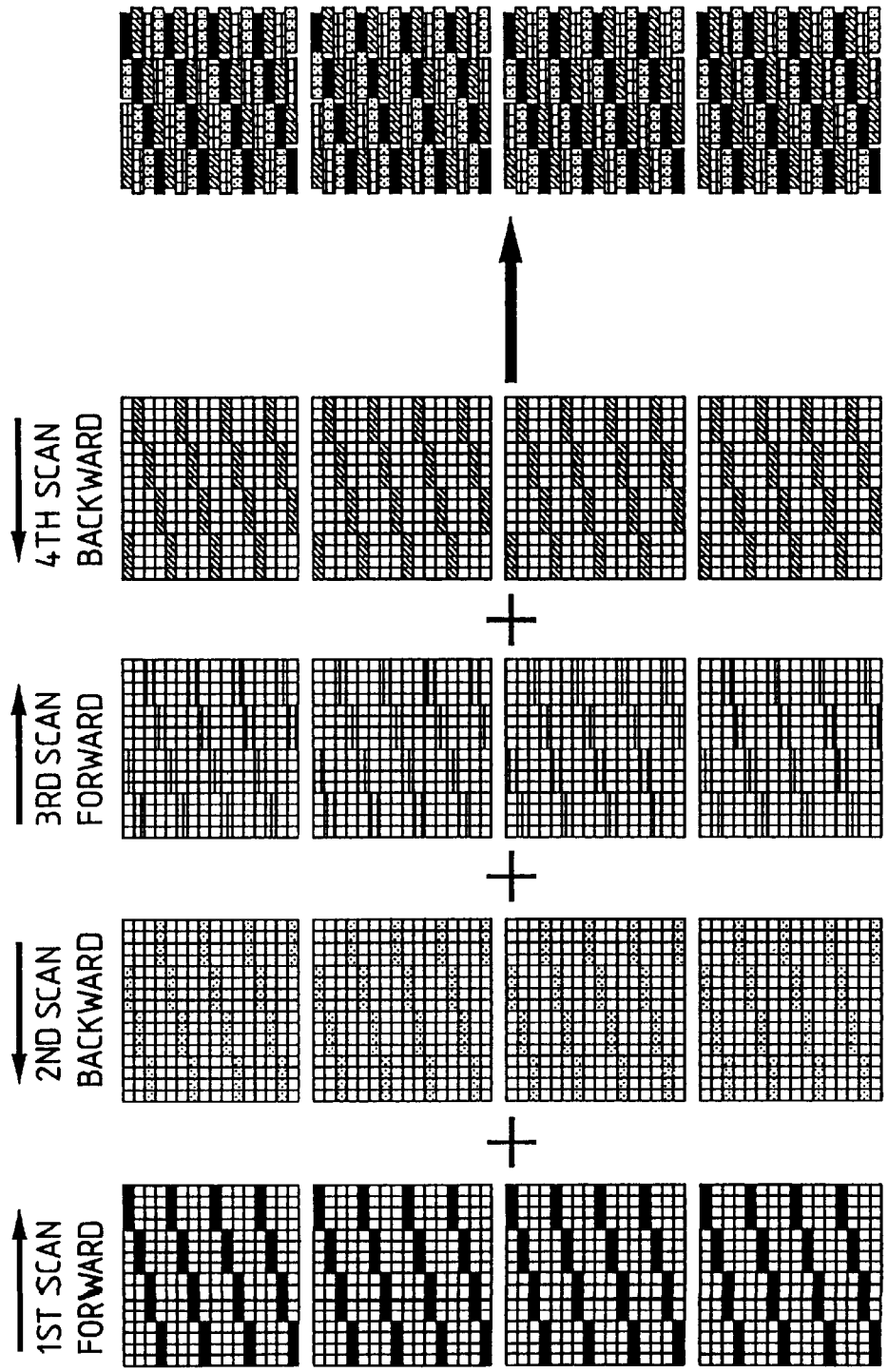

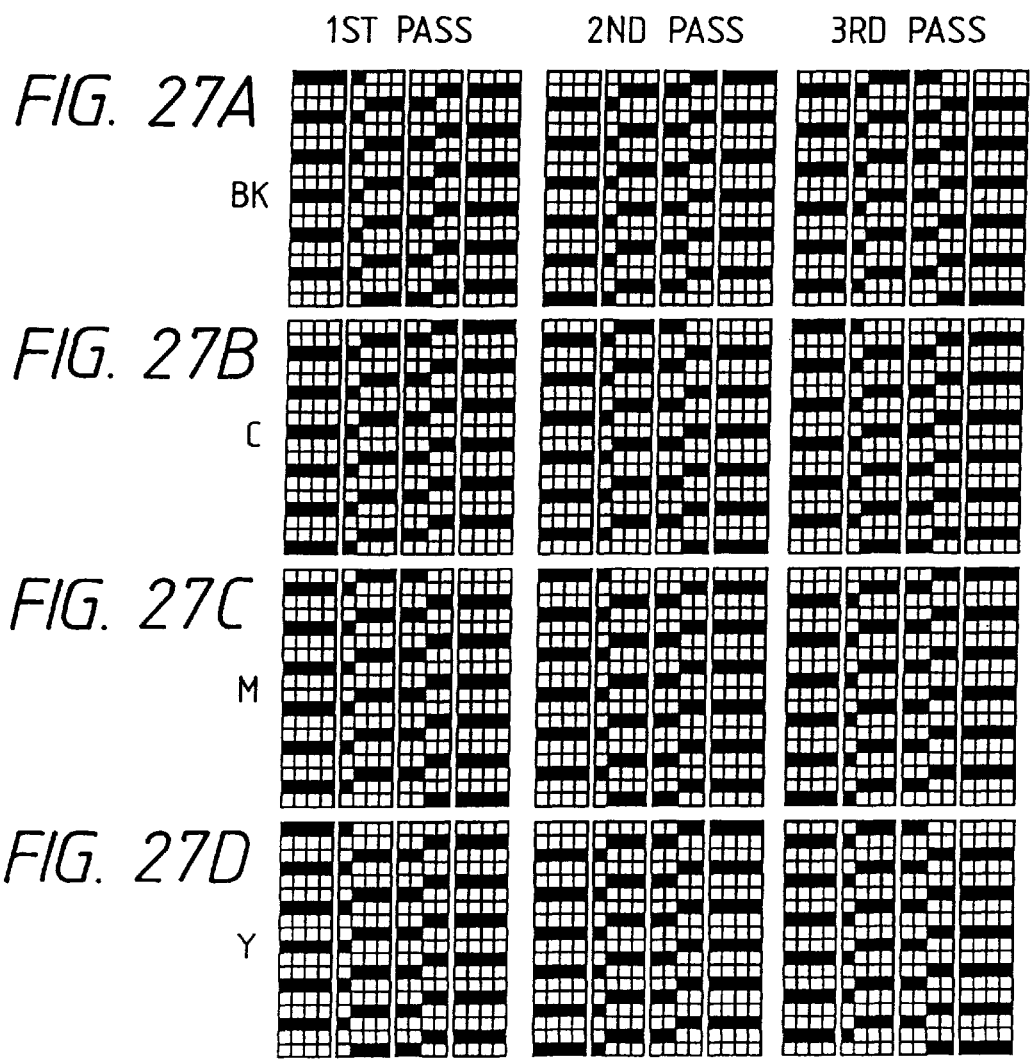

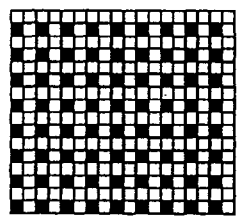
FIG. 29A
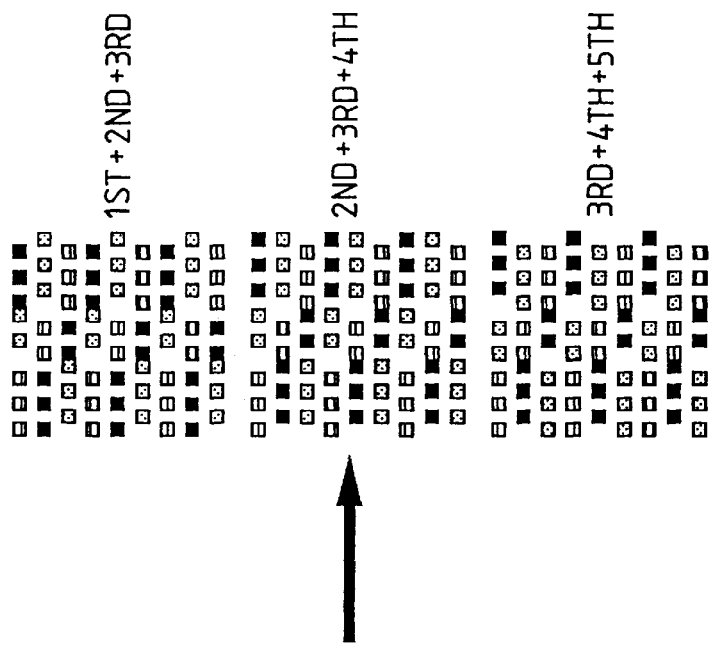
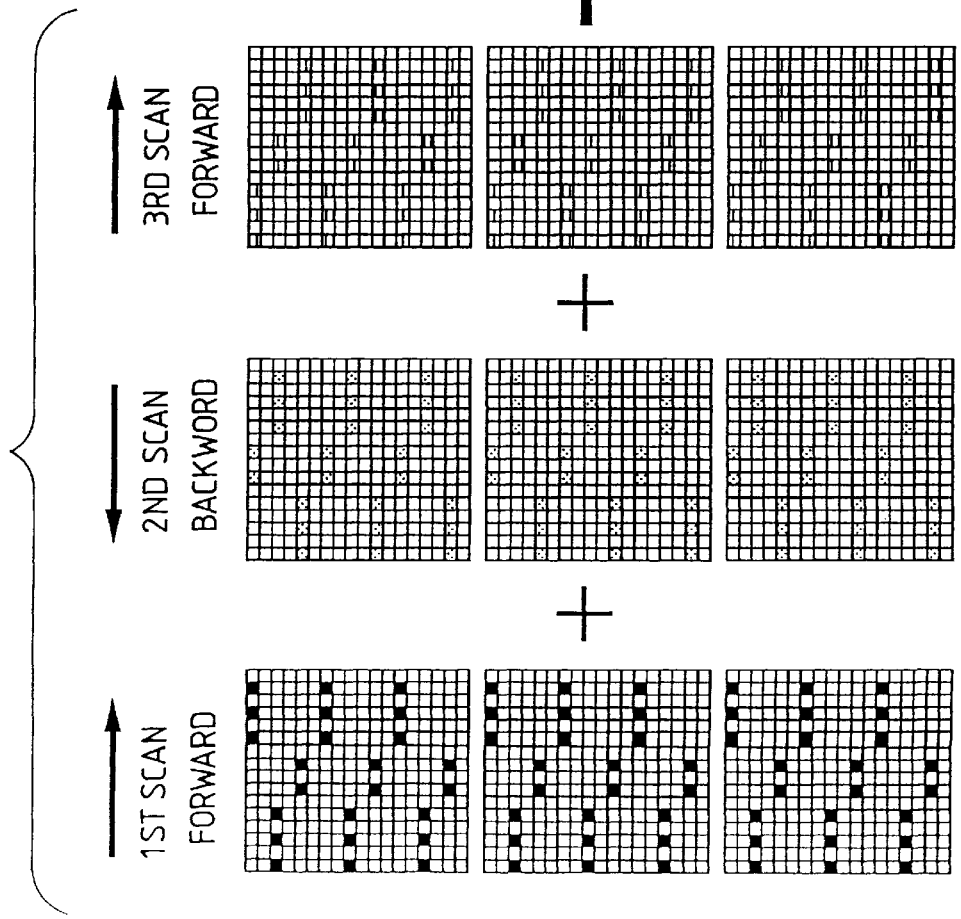
FIG. 29B

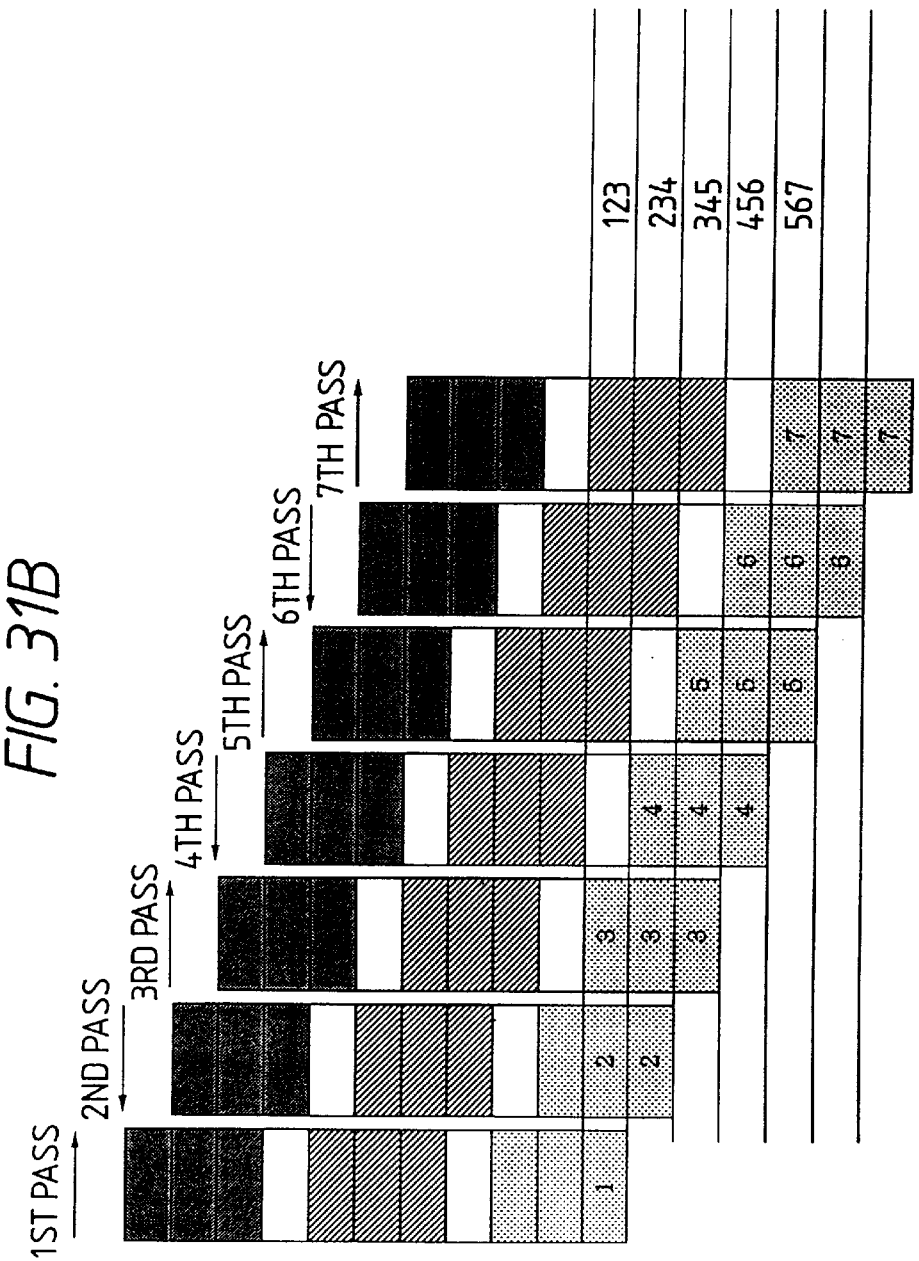

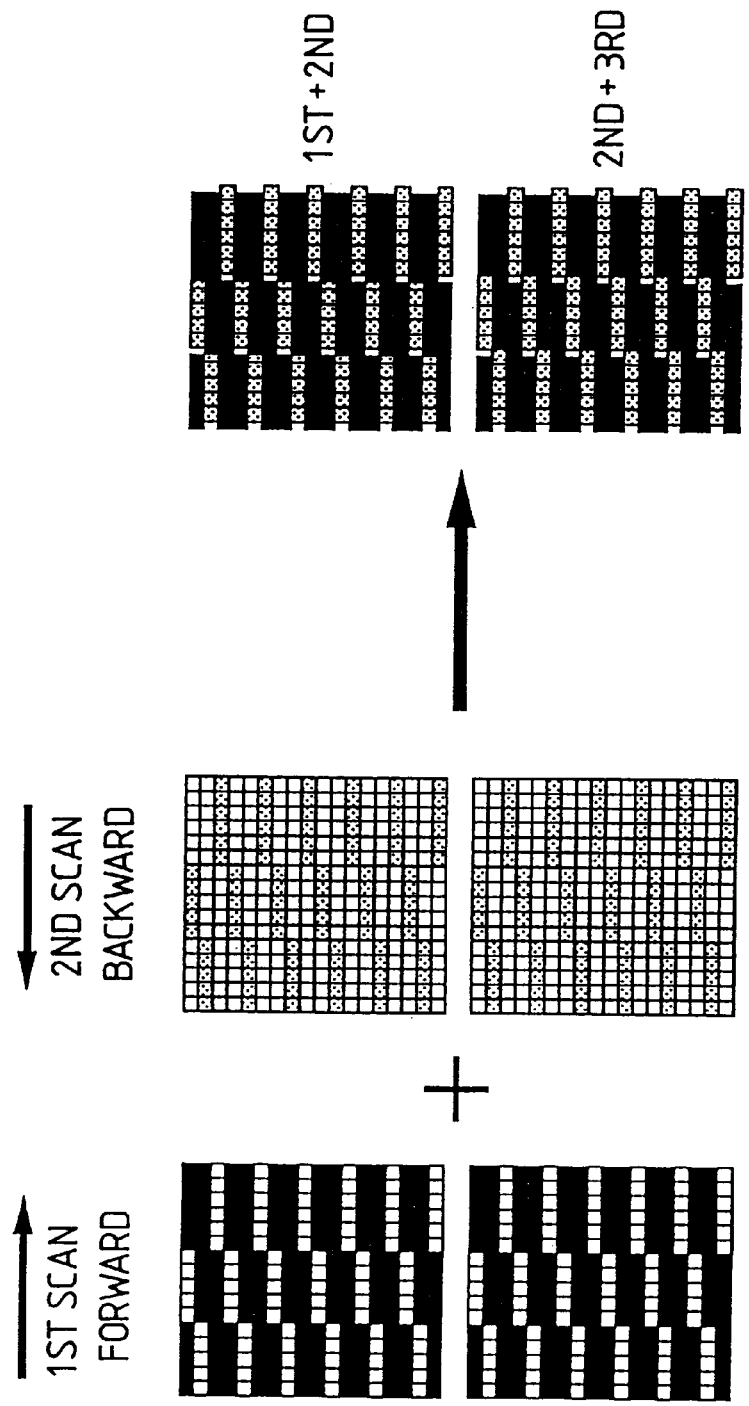

−0.50 PIXEL

−0.25 PIXEL

±0.00 PIXEL

+0.25 PIXEL

+0.50 PIXEL

−0.50 PIXEL

−0.25 PIXEL

±0.00 PIXEL

+0.25 PIXEL

+0.50 PIXEL

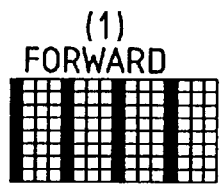
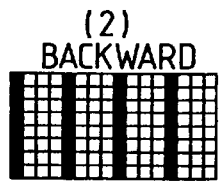
FIG. 36A PRIOR ART
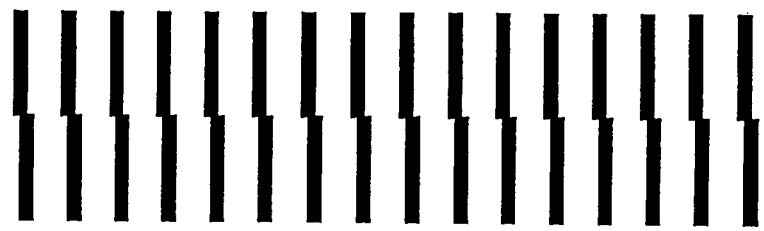
FIG. 36B PRIOR ART
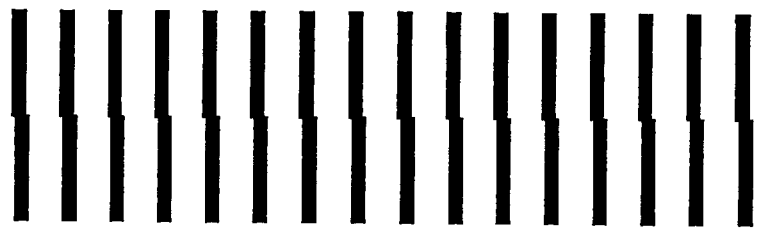
FIG. 36C PRIOR ART
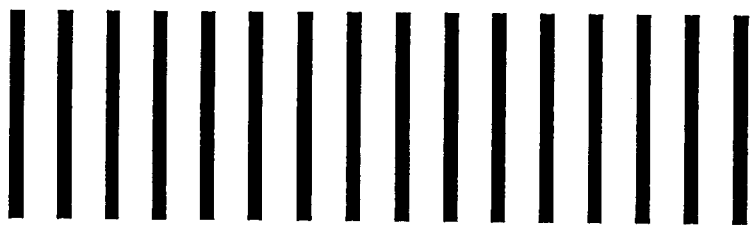
FIG. 36D PRIOR ART
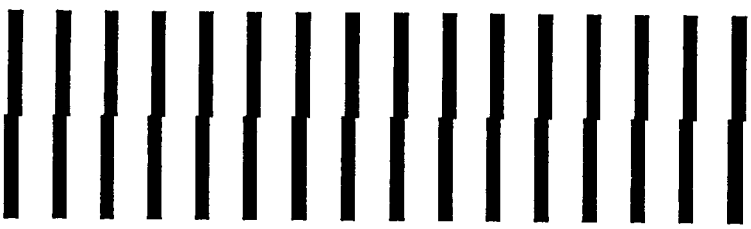
FIG. 36E PRIOR ART
FIG. 36F PRIOR ART FIG. 39A  1ST SCAN  2ND SCAN  3RD SCAN  4TH SCAN
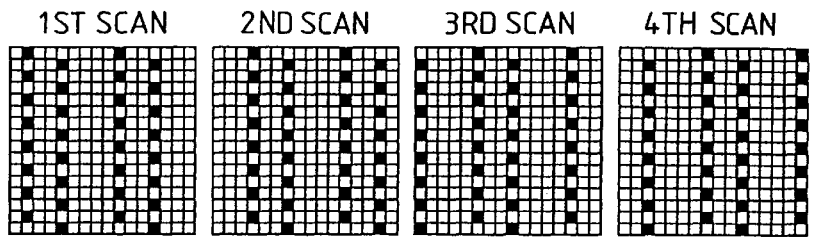
FIG. 39B
−0.50 PIXEL
FIG. 39C
−0.25 PIXEL
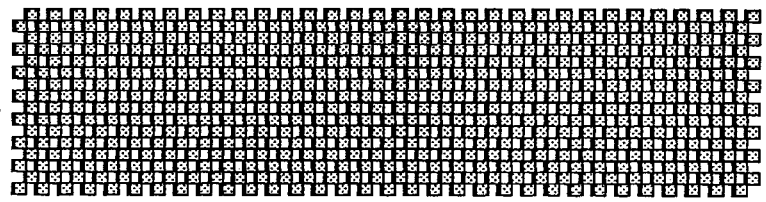
FIG. 39D
±0.00 PIXEL
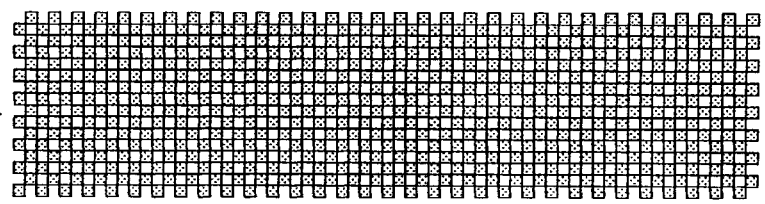
FIG. 39E
+0.25 PIXEL
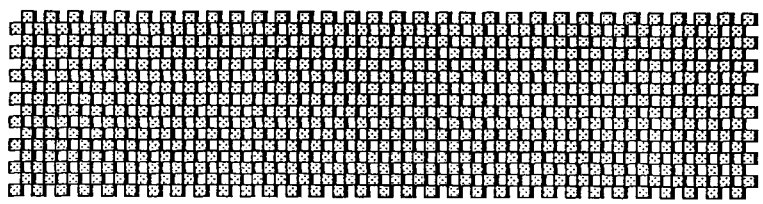
FIG. 39F
+0.50 PIXEL
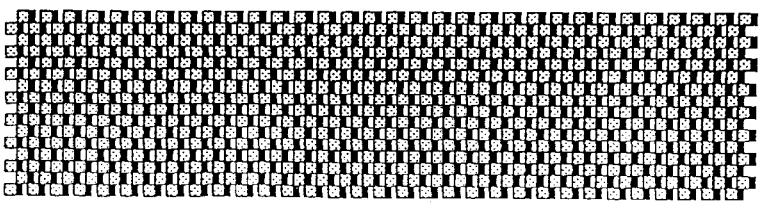

PRINT PATTERN   DENSITY DISTRIBUTION

FIG. 44A
FIG. 44B
FIG. 44C
FIG. 44D
FIG. 44E
FIG. 44F
FIG. 44G
FIG. 44H
FIG. 44I
FIG. 44J
FIG. 44K
FIG. 44L
FIG. 44M
FIG. 44N
FIG. 44O

DENSITY

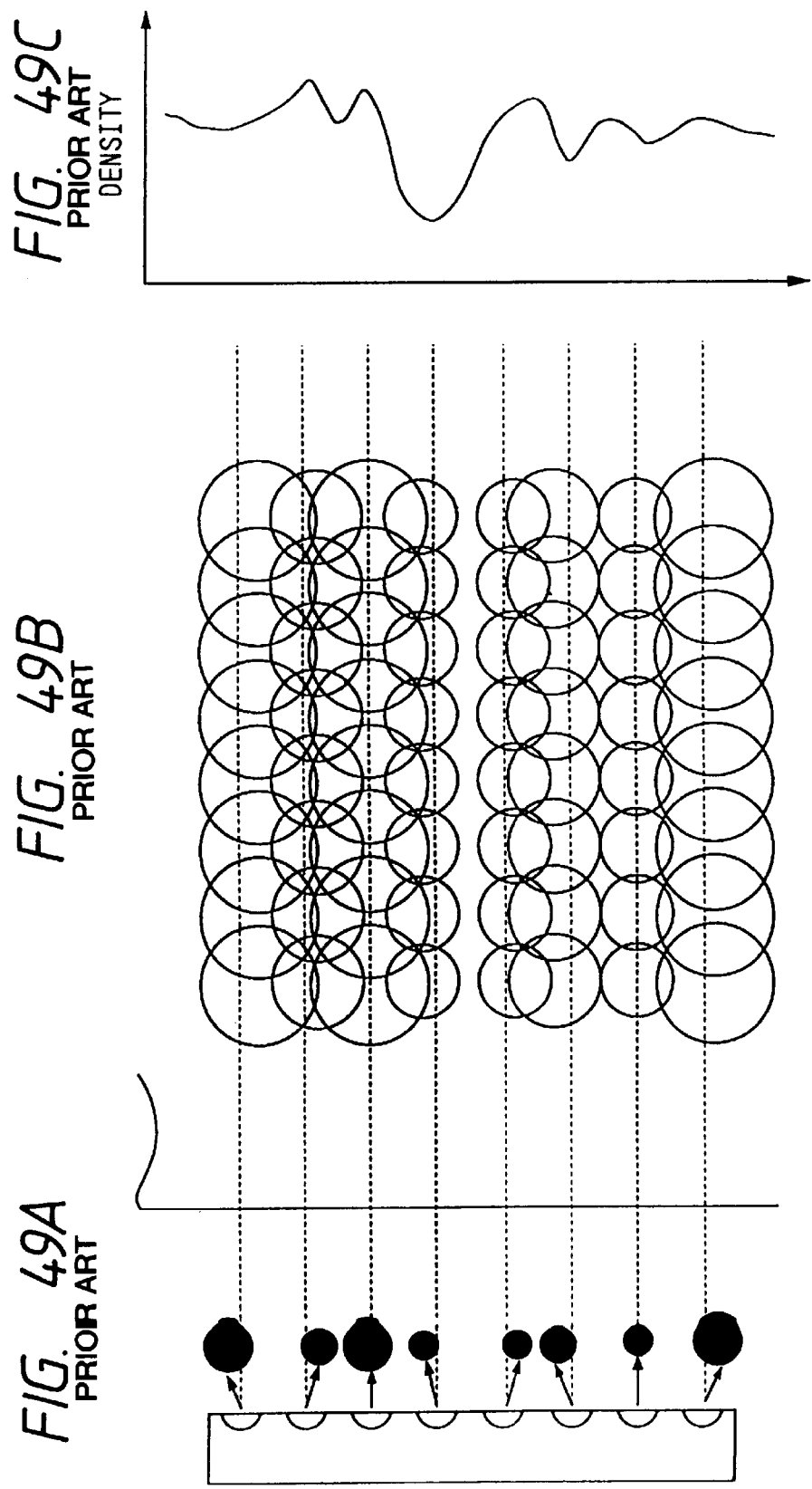

CHECKER

REVERSE CHECKER

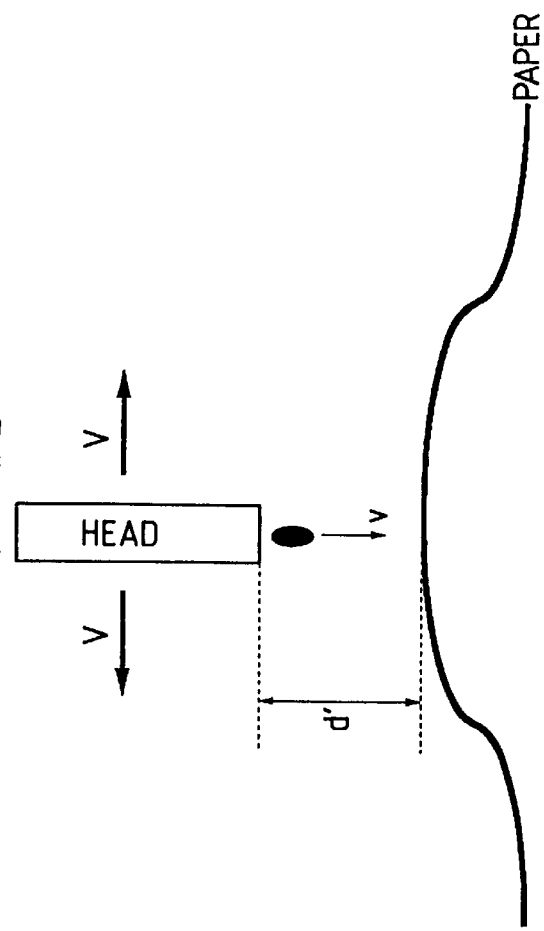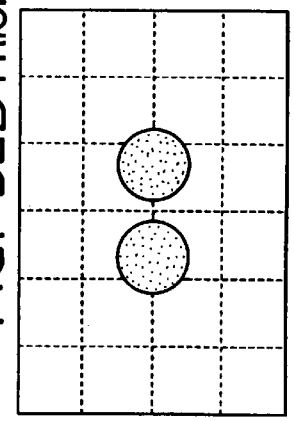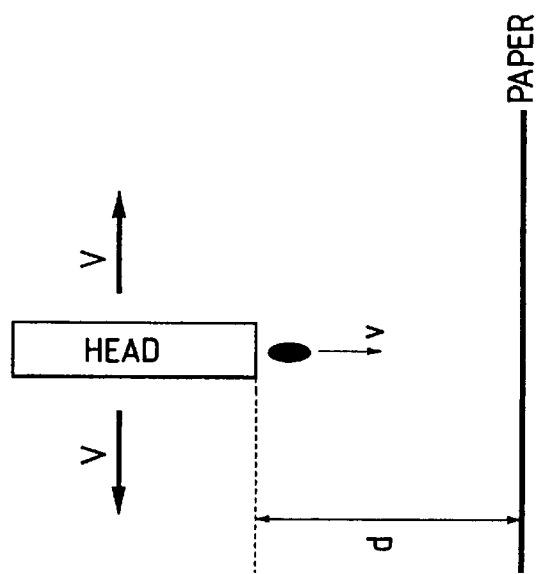

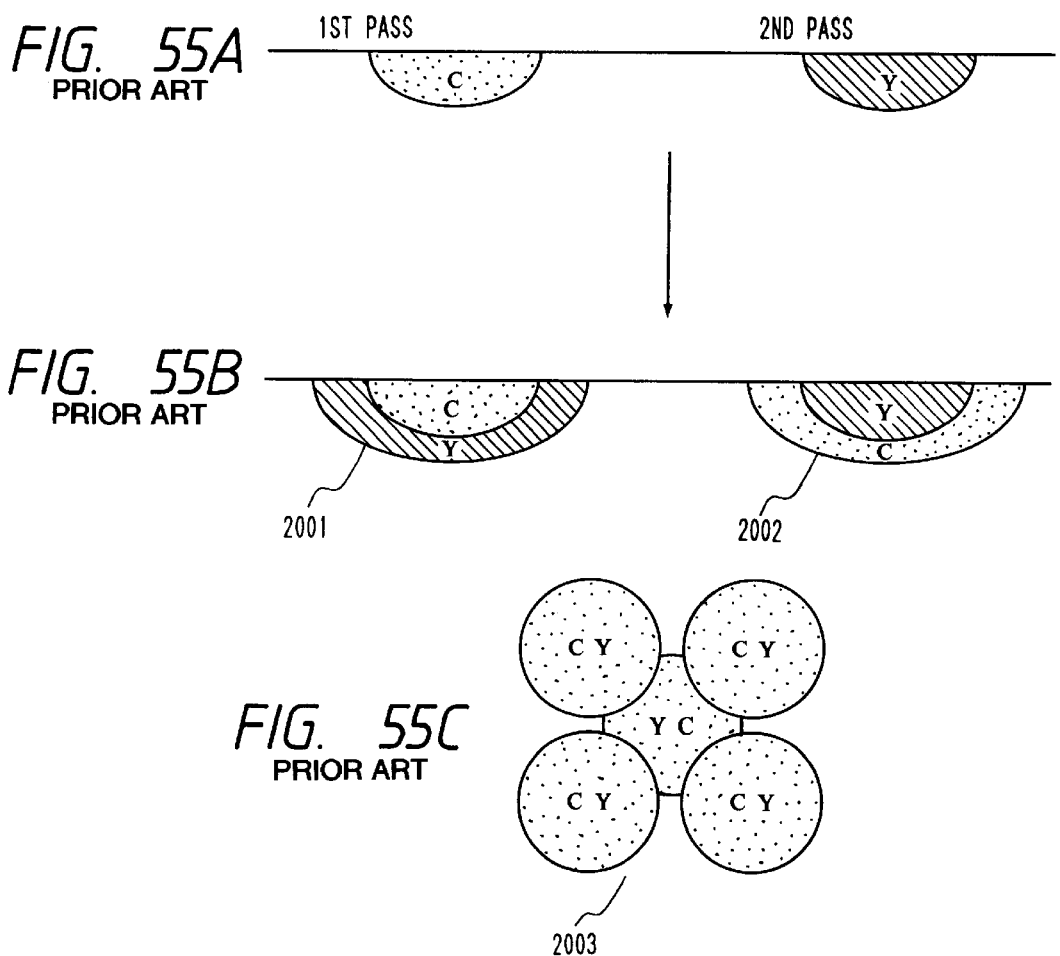

FIG. 57A PRIOR ART
1ST PASS (FOWARD SCAN)
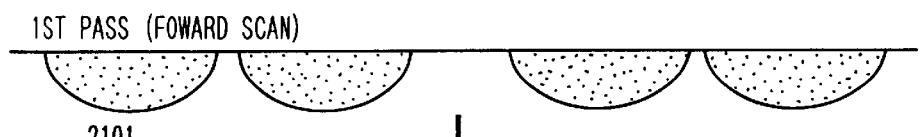
2101
TIME INTERVAL SHORT              TIME INTERVAL LONG
FIG. 57B PRIOR ART
2ND PASS (BACKWARD SCAN)
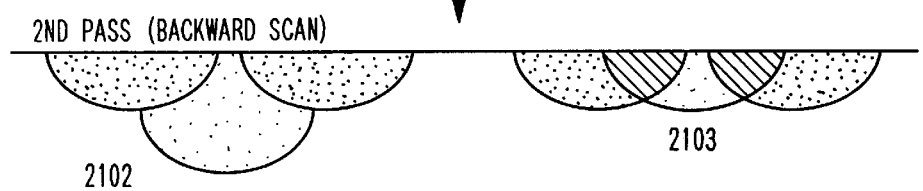
2102                              2103
FIG. 57C PRIOR ART            FIG. 57D PRIOR ART
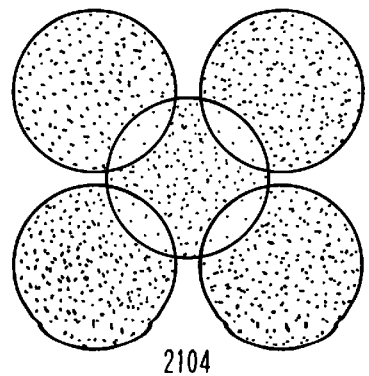    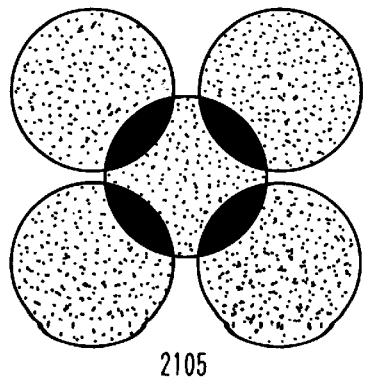
2104                              2105

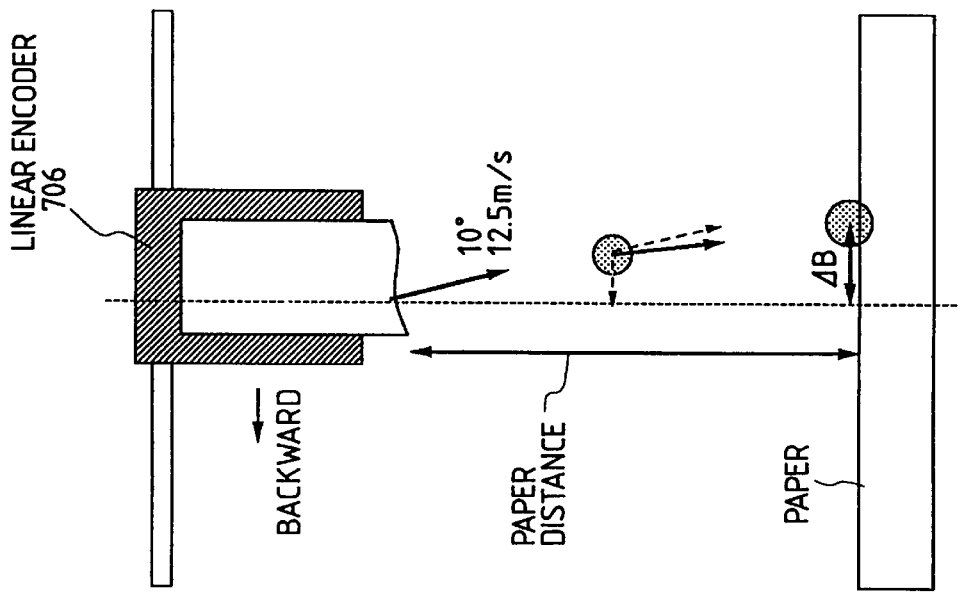
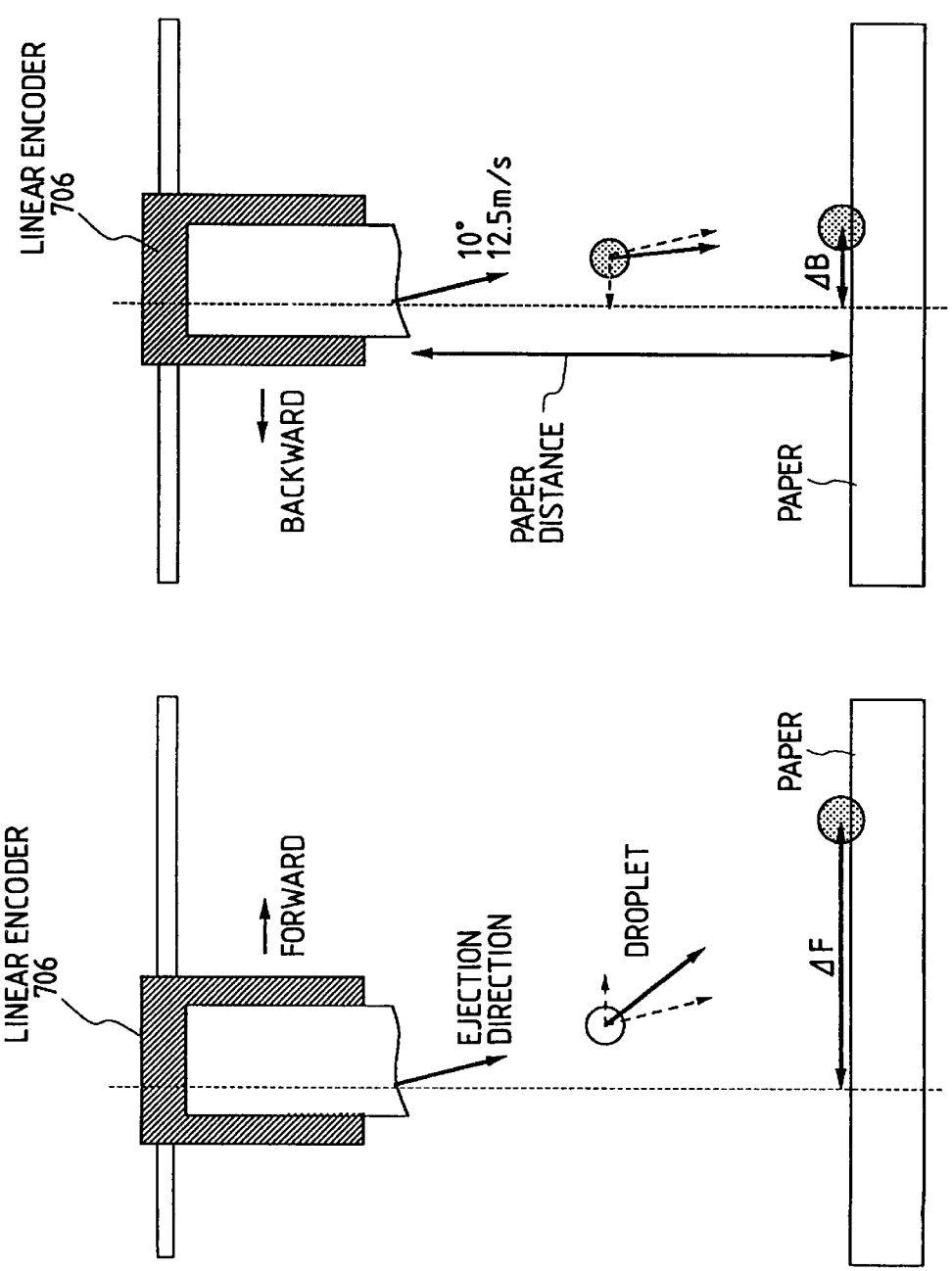

FIG. 61

| DOT POSITION DEVIATION (μm) | OPTIMUM CORRECTION AMOUNT (μm) | FORWARD PRINT | | | | BACKWARD PRINT | | | |
|---|---|---|---|---|---|---|---|---|---|
| | | PAPER DISTANCE (mm) | CARRIAGE SPEED S (m/sec) | EJECTION SPEED V (m/sec) | EJECTION ANGLE θ (DEG) | CORRECTION AMOUNT R (μm) | PAPER DISTANCE (mm) | CARRIAGE SPEED S (m/sec) | EJECTION SPEED V (m/sec) | EJECTION ANGLE θ (DEG) | CORRECTION AMOUNT R (μm) |
| -757.67 | 841.85 | 1.20 | 4.318 | 12.50 | 10.00 | 632.52 | 1.20 | 4.318 | 12.50 | 10.00 | -209.33 |
| -637.44 | 757.62 | 1.20 | 3.886 | 12.50 | 10.00 | 590.40 | 1.20 | 3.886 | 12.50 | 10.00 | -167.22 |
| -841.69 | 925.87 | 1.20 | 4.749 | 12.50 | 10.00 | 674.53 | 1.20 | 4.749 | 12.50 | 10.00 | -251.34 |
| -851.20 | 935.38 | 1.20 | 4.318 | 11.25 | 10.00 | 679.28 | 1.20 | 4.318 | 11.25 | 10.00 | -256.10 |
| -681.13 | 765.31 | 1.20 | 4.318 | 13.75 | 10.00 | 594.25 | 1.20 | 4.318 | 13.75 | 10.00 | -171.06 |
| -755.21 | 839.39 | 1.20 | 4.318 | 12.50 | 9.00 | 609.76 | 1.20 | 4.318 | 12.50 | 9.00 | -229.63 |
| -760.39 | 844.57 | 1.20 | 4.318 | 12.50 | 11.00 | 655.54 | 1.20 | 4.318 | 12.50 | 11.00 | -189.03 |
| -761.86 | 846.04 | 1.20 | 4.318 | 12.50 | 11.50 | 667.16 | 1.20 | 4.318 | 12.50 | 11.50 | -178.88 |
| -863.08 | 947.26 | 1.40 | 4.318 | 12.50 | 10.00 | 737.93 | 1.40 | 4.318 | 12.50 | 10.00 | -209.33 |
| -652.25 | 736.43 | 1.00 | 4.318 | 12.50 | 10.00 | 527.10 | 1.00 | 4.318 | 12.50 | 10.00 | -209.33 |
| -897.87 | 982.15 | 1.40 | 4.318 | 12.50 | 10.00 | 737.93 | 1.40 | 4.318 | 12.50 | 10.00 | -244.22 |
| -617.36 | 701.54 | 1.00 | 4.318 | 12.50 | 10.00 | 527.10 | 1.00 | 4.318 | 12.50 | 10.00 | -174.44 |
| -815.23 | 898.14 | 1.20 | 4.318 | 12.50 | 0.00 | 483.62 | 1.20 | 4.318 | 12.50 | 0.00 | -414.53 |
| -677.06 | 759.97 | 1.00 | 4.318 | 12.50 | 0.00 | 345.44 | 1.00 | 4.318 | 12.50 | 0.00 | -414.53 |
| -884.32 | 967.23 | 1.40 | 4.318 | 12.50 | 0.00 | 483.62 | 1.40 | 4.318 | 12.50 | 0.00 | -483.62 |
| -607.97 | 690.88 | 1.00 | 4.318 | 12.50 | 0.00 | 345.44 | 1.00 | 4.318 | 12.50 | 0.00 | -345.44 |

INK JET RECORDING METHOD AND APPARATUS

BACKGROUND OF THE INVENTION

1. Field of the Invention

This invention relates to an ink jet recording method and apparatus for recording an image on a recording material by ejecting ink droplets in conformity to the data of the image.

2. Related Background Art

In consequence of the dissemination of reproducing devices, information processors such as word processors and computers, and communication devices as well, digital image recording devices adapted to operate by use of an ink jet type recording head have been finding widespread acceptance among other image recording devices serving the apparatuses mentioned above. As a recording head having a plurality of recording elements arrayed integrally therein (hereinafter referred to as a "multi-head"), the recording devices of this kind are generally provided for the sake of enhancing their recording speed with a modified multi-head which has a plurality of ink nozzles and conduits integrally arrayed therein. Further, to permit production of color images, they are provided with a plurality of such multi-heads.

Unlike the monochromic printer which prints characters exclusively, the color printer needs to fulfill various factors such as color development property, gradient of tone, and uniformity in printing color images. As regards the uniformity in particular, even slight inconstancy possibly caused among nozzle units by a deviation involved in the process of manufacture of a multi-head affects the amounts of ink droplets discharged through individual nozzles and the directions in which the ink droplets are ejected in the course of printing and eventually impairs uniform density of a printed image and deteriorates the quality of the produced image.

A concrete example of this adverse case will be depicted below with reference to FIG. 48A to FIG. 48C. In FIG. 48A, 91 stands for a multi-head which is identical with a multi-head shown in FIG. 49A. Here, for the sake of simplicity, this multi-head is assumed to comprise 8 multinozzles 92. Denoted by 93 are ink droplets which are ejected by the multinozzles 92. Generally, the ink is ideally ejected in droplets of a uniform amount in parallel directions as illustrated in the diagram. If the ink is ejected as just described, then ink dots of a uniform size will land on the paper surface as illustrated in FIG. 48B and form a wholly uniform image free from uneven density (FIG. 48C).

Actually, as pointed out previously, the individual nozzles betray inconstancy of quality among themselves. If they are used for printing in spite of the defect, the ink droplets ejected therethrough will vary in size and direction as illustrated in FIG. 49A and land on the paper surface as illustrated in FIG. 49B. From this diagram, it is clearly noted that blank areas unfulfilling the area factor of 100% occur periodically relative to the main scanning direction of the head, dots overlap one another to an unduly large extent on the contrary, or white streaks occur as found in the central part of the diagram. The aggregate of the dots which have landed in this condition describes a density distribution shown in FIG. 49C relative to the direction in which the nozzles are arrayed. As a result, these phenomena are generally perceived as uneven density by the human eyes.

The following method has been proposed as a measure to this uneven density. The method will be described below with reference to FIG. 50A to FIG. 51C. This method requires the multi-head 91 to make three passes (or three scans) to complete such a print area as shown in FIG. 48A to FIG. 48C. One half of the area consisting of four picture element units is completed by two passes of the multi-head 91. In this case, the eight nozzles of the multi-head are divided into two groups, namely the upper and the lower group of four nozzles. The dots printed by one nozzle in one pass (or one scan) are such as result from thinning relevant image data roughly to one half in accordance with a prescribed image data array. Then, in the second scan dots corresponding to the remaining half image data filled or recorded, whereby the printing of the area of four picture element units is completed. The recording method just described will be hereinafter referred to as the "split recording method." This split recording method halves the effects inherently exerted by the individual nozzles on a printed image even when the recording head used therein happens to be equal to the recording head shown in FIG. 49A. The printed image consequently obtained is as shown in FIG. 50B. In this printed image, such black streaks or white streaks as are found in FIG. 49B are not very conspicuous. The uneven density of image, as shown in FIG. 50C, is appreciably alleviated as compared with what is shown in FIG. 49C.

In the recording of image thus performed, the first and the second scans split the image data in a mutually offsetting manner in accordance with a prescribed array. Heretofore, as the image data array (thinning pattern), it has been most popular to adopt such an image data array as to produce a pattern resembling a shepherd's check by each set of one longitudinal and one lateral picture element as illustrated in FIG. 15. In the unit printing area (composed of four picture element units), therefore, the printing is completed by the first scan which prints a shepherd's check and the second scan which prints an inverted shepherd's check. FIGS. 51A, 51B, and 51C portray how the record in a given area is completed with these shepherd's checks and inverted shepherd's checks by use of a multi-head provided with eight nozzles as illustrated in FIGS. 50A to 50C. First, the first scan records a shepherd's check ● by use of the four lower nozzles (FIG. 51A). Then, the second scan records an inverted shepherd's check ○ by feeding the paper across four picture elements (one half of the head length) (FIG. 51B). Further, the third scan again records a shepherd's check by feeding the paper across four picture elements (one half of the head length) (FIG. 51C). The record area of four picture element units is completed for each scan by sequentially alternating the feeding of the paper across four picture element units and the recording of a shepherd's check and an inverted shepherd's check as described above. Since the print is completed in one and the same area by use of two different kinds of nozzles as described above, this method permits production of an image of high quality free from uneven density.

The drawing depicts the split recording method as adapted to complete a record in one and the same area by two passes. It should be remarked, however, that the effect of the split recording method gains in conspicuity in proportion as the number of groups into which the nozzles are divided increases. Even the recording apparatus described above is enabled to complete an image in one scanning direction by use of four kinds of nozzles when the number of picture elements to be recorded by one pass is further halved and the scan for paper feeding is given a scanning width of two picture elements (one quarter of the head length). Thus, this apparatus is capable of producing a smoother and more desirable image.

The split recording of this principle, however, has the disadvantage that the time cost for printing a given image on one paper surface increases and the throughput consequently decreases inevitably in proportion as the number of groups into which the nozzles are divided increases. For the purpose of further expediting the printing operation in this case, a method of adapting a carriage to produce printing and scanning operations on both the forward and backward directions may be conceived. In fact, this method can substantially halve the recording time spent normally heretofore on one paper surface because it wholly eliminates the motion which the carriage would have otherwise produced in returning idly to its home position after the recording by one pass has been completed. Actually, the monochromic printing apparatuses which adopt the principle of reciprocating printing are not few.

FIGS. 52A to 52D illustrate a head in the process of moving at a fixed velocity V in the forward or the backward direction while causing an ink drop to be ejected at a fixed velocity v to a smooth paper surface. When the paper surface is flat and smooth as shown in FIG. 52A and, therefore, the distance d between the paper surface and the head face is always constant, the timing of the reciprocating printing motions of the head with respect to the discharge of ink is so set in advance that the position of the dot printed on the forward pass may coincide with that of the dot printed on the backward pass. When the paper surface is somehow caused to rise from the normal level as shown in FIG. 52C and, consequently, the distance d between the head face and the paper surface becomes shorter (d') and the interval between the time the ink drop departs from the head and the time it reaches the paper surface differs from the actually preset interval in each of the forward and the backward directions, the positions of the printed dots deviate from the target position as shown in FIG. 52D.

Now, the detriment which arises when a thinning mask is used in the condition described above and the production of a 100% duty image is attempted by the reciprocating printing operation will be described below. FIGS. 2A and 2B illustrate examples of the picture element array obtained by a varying recording scan in accordance with the split recording method designed to complete an image by four recording scans and the condition of a print of dots obtained therein. The picture element array to be printed by each recording scan has thinning masks (a) to (d) for the picture element arrays which are complementary to one another. In this case, the picture element array of the thinning mask used for the first recording scan and that used for the third recording scan are printed during the forward pass of the head, while those used for the second and the fourth recording scan are printed during the backward pass of the head. In the diagram, the number of picture elements recorded in the forward pass and that recorded in the backward pass are equal. If the deviation of dots shown in FIGS. 52C and 52D occurs under this condition, the dots printed during the forward pass and those printed during the backward pass will deviate from each other and give rise to gaps between the horizontal rows of dots and between the vertical columns of dots to the extent of imparting a coarse appearance conspicuously to the produced image as shown in FIG. 2B. The image produced in this state betrays uneven density and inferior linearity of characters and lines because of the uneven arrangement of dots.

As described thus far, an attempt to realize the split recording and the reciprocating printing simultaneously for the purpose of exalting the quality of image and expediting the printing operation results in yielding a printed image impaired by the deviation of dot positions which occurs during the reciprocating printing described above.

The split recording method of this principle has been already disclosed as in JP-A-60-107,975 and U.S. Pat. No. 4,967,203. It is described as profoundly effective in countering such adverse phenomena as uneven density and lengthy streaks. The former patent specification defines this method as "being characterized by comprising means to assign a smaller width to the area of paper feed by each main scan than the width of said main scan and impart an overlapping part to the widths of two adjacent main scans and means to array printed dots in said overlapping part in such a manner as to prevent said printed dots from overlapping each other during said two main scans". According to the method of this specification, the thinning masks are so adapted as to "print an odd-number stage and an even-number stage alternately every other row", or to print an odd-number stage by the first main scan and an even-number stage by the second main scan, or alternatively to produce random recording by each pass. The thinning masks and the paper feed widths are not completely defined.

In contrast, the latter US patent specification (U.S. Pat. No. 4,967,203) discloses this method as "comprising the steps of a) printing by the first pass the non-adjoining but alternating pixel positions in the horizontal and vertical directions only in the upper half part of the first band, b) printing by the second pass the pixels which have escaped being printed by said first pass in said first band and the non-adjoining but alternating pixels in the horizontal and vertical directions in the lower half part of said first band, and c) printing by the third pass the pixels in said first band which have escaped being printed by said first and second passes and, at the same time, effecting a first pass in the immediately following band". Thus, the invention of this US patent specification defines the thinning masks for effecting the split recording as non-adjoining but alternating pixels arranged in the vertical and horizontal directions.

As a supplemental element, the invention under discussion discloses a recording method which comprises forming a pseudo pixel (superpixel) with an aggregate of several picture elements for the sake of gradient expression or multicolor expression and producing non-adjoining but alternating thinned prints with the superpixel units in the horizontal and vertical directions. Regarding this method, the specification has this passage: "Once the system for embodying this method is incorporated in a program software or a printer formware, the program of the system can be retrieved with a combined color number designated with respect to relevant superpixels and, therefore, the quality of print in question can be accomplished without indiscriminately complicating the work of forming a computer program for the production of a host of colors." The simplification of programming for the multicolor expression is adduced as one of the effects of this invention. Further, a mention is made to the effect that since the individual superpixels are intended to be perceived as unique uniform colors, the color bleeding possibly occurring in the superpixels is harmless.

Incidentally, the split recording described above is at a disadvantage in requiring a large time cost for printing on one paper surface and entailing an inevitable decrease in the throughput. For the purpose of further curtailing the time spent in printing in this case, a method of adapting the carrier to produce reciprocating printing and scanning may be conceived. This method, in fact, can substantially halve the time required for recording on one paper surface because it wholly eliminates the motion which the carriage would have made otherwise in idly returning to its home position after the recording by one pass has been completed. Actually, the monochromic printing apparatuses which adopt the principle of reciprocating printing are not few. A color ink jet apparatus constructed as contemplated by the present invention had not yet been realized for the following reason.

FIGS. 54A to 54D are cross sections illustrating drops of the recording inks of popular use today in the process of falling onto a paper surface and subsequently diffusing in the wall of the paper. The diagrams represent the case of causing drops (dots) of the two inks different in color to fall with a time lag at two virtually adjoining positions on the paper surface and then diffuse (recording) in the paper. What should be remarked in this case is the fact that, in the part of the paper at which the two dots have overlapped each other, the dot which has landed on the paper later tends to sink farther in the direction of thickness of the paper than the dot which has landed on the paper earlier. This phenomenon may be logically explained by postulating that during the physical and chemical union of the coloring matter like a dye in the ejected ink with the recording medium, since the union of the recording medium with the coloring matter has its own limit, the union of the coloring matter of the earlier ejected ink with the recording medium proceeds preferentially and, therefore, the dot of this ink remains much on the surface of the recording paper and the coloring matter of the ink landing the paper later is not easily bound on the surface of the recording medium but left sinking farther in the direction of thickness of the paper and lodged fast in the depth of the paper unless the strength of union widely varies with the kind of coloring matter.

If the two inks different in kind are printed at one and the same position in this case, the preference of coloring is varied by the sequence in which the two inks land on the paper. As a result, they will have expressed two different colors to the visual characteristics of man. It is now assumed that the colors of a four-color head are sequentially arranged from right in the order of black, cyan, magenta, and yellow and the head is reciprocated in the direction of arrangement of these colors (left to right) to effect a main scan. In the forward pass (or forward scan), the head is moved to the right and simultaneously caused to perform a recording action. At this time, the order of recording colors conforms to the aforementioned order in which the colors are arranged. When a green (cyan +yellow) signal is injected in a certain area, for example, cyan and yellow inks are absorbed in each of the affected picture elements in the order mentioned. In the present scan, therefore, the earlier absorbed cyan forms a preferential color by the mechanism of union described above and imparts a chromatic taste strongly of cyan to the eventually produced green dot. Conversely, in the backward pass (or backward scan) which follows the paper feeding made in the direction of a secondary scan, the head is moved in the direction opposite to that of the forward pass and simultaneously caused to effect a recording action. As a result, the order of injection of the color inks is reversed. In the present scan, a chromatic taste strongly of yellow is imparted to the produced green dot. When the scanning operation described above is repeated, green dots having a chromatic taste strongly of cyan and green dots having a chromatic taste strongly of yellow are recorded in accordance with forward passes and backward passes which are made by each of the recording heads. If the paper feeding is made by the width of the head as a unit for each of the forward and backward passes without using the split recording method in each pass, the areas of green having a chromatic taste strongly of cyan and those of green having a chromatic taste strongly of yellow will be alternated repeatedly by the width of the head as a unit and, as the result, the eventually produced green image which ought to be uniform in color will raise to serious degradation of quality.

This drawback, however, can be overcome more or less by adopting the conventional split recording method demonstrated hereinabove. Specifically, in the operation of split printing, green dots having a chromatic taste strongly of cyan are recorded by the forward pass (FIGS. 51A and 51C) and green dots having a chromatic taste strongly of yellow are recorded by the backward pass (FIGS. 51B) as already explained with reference to FIGS. 51A to 51C. The overall chromatic taste in a stated area, therefore, is moderated by the intermixture of the dots of the two chromatic tastes.

The construction and effect of moderating the uneven coloration within the individual bands by intermixing the dots of two chromatic tastes within the stated area as described above have been already disclosed in U.S. Pat. No. 4,748,453. Though the US patent specification does not specify any limit for the amount of paper feeding, it has a mention to the effect that the method of this invention has the effect of preventing the beading of ink on the medium such as of an OHP grade paper by causing the first and the second (or more) split recording scan to perform a complementary recording on the picture elements alternately situated in the horizontal and vertical direction in one and the same area and, at the same time, preventing the color banding (uneven coloration) during the formation of a color image by reversing the order of ink injection into picture elements of a mixed color in the first pass (or first scan) and the second pass (or second scan) (reciprocating recording). Since the invention under discussion primarily aims to prevent the beading between the adjacent picture elements, it is characterized by the fact the picture elements which are recorded by one pass (or one scan) are alternated (not mutually adjoined) in the horizontal and the vertical direction.

JP-A-58-194,541 which has issued to the same applicant as the present invention discloses a technique for the operation of an apparatus which is provided with a plurality of parallelly arranged series of recording elements and adapted to effect the main scan of a record of a dot matrix by reciprocating the head in a direction perpendicularly intersecting the series of recording elements mentioned above. This technique, in the operation mentioned above, comprises causing a smaller number of dots than the total number of dots destined to be recorded in at least either of the columns and rows of the dot matrix to be recorded intermittently in the forward pass of the main scan and, at the same time, causing the remaining dots in at least either of the rows and columns of the matrix to be intermittently recorded in the backward pass of the main scan thereby varying the order of overlapping of record in the overlapped recorded dots produced by the aforementioned plurality of series of recording elements in the forward and the backward pass of the main scan. The invention under discussion, unlike the split recording already described, has no restriction designed to decrease the number of rounds of paper feeding from the ordinary number and, as a result, succeeds in preventing a recorded image from being degraded in quality by the deviation of color tone (uneven coloration) due to the overlapped recording of color inks.

Since this invention primarily aims to prevent deviation of color tone, it specifies no specially limited positions for the dots to be recorded by each pass. In the working examples of the invention cited in the patent specification, the lateral thinning for effecting alternate recording only in the longitudinal direction and the longitudinal thinning for effecting alternate recording only in the lateral direction are mentioned in addition to the recording in a checkerwise pattern (a shepherd's check and an inverted shepherd's check).

Besides, JP-A-55-113,573 discloses a construction for effecting a reciprocating recording by use of a twill line (a shepherd's check and an inverted shepherd's check) pattern, though not limited to a color printer. The invention in this case aims to prevent the phenomenon of distortion of dots by avoiding continuous printing of adjacent dots and allowing an immediately succeeding dot to be printed before the immediately preceding dot dried up. Like the invention of U.S. Pat. No. 4,748,453 mentioned above, therefore, the invention under discussion limits the thinning masks to the twill line pattern.

Incidentally, the inventions of the three patents cited above invariably aim to prevent the uneven coloration or beading in the course of reciprocating recording. They, therefore, avoid adopting the construction for "decreasing the amount of paper feeding between adjacent passes to below the ordinary width of heat" for the purpose of preventing the uneven density due to the inconstancy of nozzles in quality unlike the split recording method demonstrated hereinabove.

It has been held that the reciprocating multicolor recording is feasible in spite of being susceptible of uneven coloration because the adoption of the split recording method for the reciprocating recording enables two kinds of recording picture elements for which the order of injection of ink colors is mutually reversed to be uniformly imparted in the recording area.

The drawback of uneven coloration is not thoroughly overcome even when the split recording is effected in the pattern of the shepherd's check/inverted shepherd's check mentioned above. The reason for this failure follows. Generally, the amount of an ink droplet is so designed that it may spread on the paper surface to an area larger than the area assigned to a picture element. The larger area is necessary for wholly concealing the part of white paper surface in the area of data of printing ratio of 100% Even when the split recording method is followed, therefore, the printing medium (recording paper) has practically 100% of the area thereof covered notwithstanding only 50% of the recording picture elements are printed as illustrated in FIG. 53. A cross section taken through this recording paper is illustrated in FIG. 55A to FIG. 55C. The diagram represents the case of using a first pass (in the forward scan) to print a shepherd's check on a white paper and a second pass (in the backward scan) an inverted shepherd's check thereon. The reference numeral 2001 denotes the state of the ink droplet immediately after the printing by the first pass (forward). The part completely filled with black represents cyan ink and the hatched part yellow ink. Since the yellow ink has been injected at the same position as previously occupied by the cyan ink with only a small time lag, the cyan ink is absorbed by the paper in a state of high density with a sign of sparing bleeding and the yellow ink is induced to bleed heavily to the extent of enveloping the lower side and the peripheral part of the cyan ink and eventually assuming a print of low density. Further at this time, these inks are absorbed and spread out so widely as to reach the immediately next picture element, with the result that the entire paper surface will be filled up with the inks as illustrated in FIG. 53.

The print made by the second pass (backward) under the condition mentioned above is superposed on the previously absorbed adjacent dots of ink as indicated by 2003. Since the second pass forms a backward scan, the yellow is printed first and the cyan next (2002). When these two inks are left to be absorbed, they eventually assume a state in which they do not appear very conspicuously to the surface as indicated by 2003. In the printed image finally produced, therefore, the density of the first printed cyan is emphasized most strongly and the area of this print forms a green image having a chromatic taste preferentially of cyan. Conversely, in the area of print adjoining the aforementioned area of print which has used the first pass for the backward scan, the cyan and the yellow change their positions and produce a green image having a chromatic taste preferentially of yellow.

FIG. 56 depicts the manner in which the two areas of print mentioned above appear. It is clearly noted from this diagram that the lower half part of the head always determines the preferential color in each area and this preferential color is reversed in the forward and backward scan. Since these two areas are different in which preferential colors are alternately present, the phenomenon of uneven coloration still persists in the operation of split printing and impairs the produced image and renders the reciprocating printing virtually infeasible.

Further, the drawback caused by the bleeding of ink in the adjoining picture element is found not only the uneven coloration mentioned above but also in the reciprocating monochromic printing. Now, the trouble caused in this case will be described below. FIGS. 57A to 57D illustrate the conditions of ink absorption during a first and a second pass similarly to FIGS. 55A to 55C. Likewise in the diagrams, 2101 denotes the condition of ink which has landed on the paper surface by a first pass and 2102 and 2103 both denote cross sections of the paper which are assumed after the printing by a second pass. Here, 2102 represents the state in which the record by the second pass is formed immediately after the record produced by the first pass and 2103 the state in which the record by the second pass is formed after an interval of some length following the formation of the record by the first pass. These two states show a difference in the state of absorption in the paper surface of the ink recorded by the second pass. While the ink dots 2102 are absorbed fairly in the direction of depth of the paper, the ink dots 2103 produced by the second pass are spread out on the surface of the paper. These behaviors of ink dots are discerned on the reverse side of the paper and the ink dots 2103 permeate to the reverse side of the paper to a greater extent than the ink dots 2102. These states of ink dots are manifested as a difference in density of the two inks on the paper surface as shown in FIG. 57C (2104) and FIG. 57D (2105).

The time lag arising from the reciprocation of the carriage is ample as compared with the order of the time lag responsible for the difference in density between the two kinds of ink dots. This factor constitutes itself as a new drawback attendant on the operation of reciprocating printing. The situation of this drawback will be described below with reference to FIG. 58.

As shown in FIG. 58, first the head makes a forward pass from the position of 2201 in the direction of the arrow to effect a record of the first scan width. After the record of one full line has been completed, the paper is fed by one half of the scan width mentioned above and then the head makes a backward scan from the position of 2202 this time in the opposite direction. Again the paper is fed by the same width as mentioned above and the head then makes a forward scan from the position of 2203 to effect a record in the direction of the arrow. The recording intervals of the two passes will be compared below with respect to the parts (1) to (6) in the area of print completed in this case. In the parts (3) and (4), the record by the second pass is commenced immediately after the record by the first pass has been completed and then the paper has been fed by the one half width. In contrast, in the parts (1) and (6), the record by the second pass is commenced after the carriage, subsequent to the record by the first pass, has completed one reciprocating scan. The parts (2) and (5) are recorded with a time lag exactly one half of the duration intervening between the first and the second record. As a result, as shown in FIGS. 57A to 57D, the parts (1) and (6) acquire the highest density, followed by the parts (2) and (5), and the parts (3) and (4) absorb inks to a great depth in the paper and acquire a low surface density. Thus, the phenomenon of uneven image density appear in the left-hand area in which the passes (1) and (4) by one half width are repeated in the vertical direction and in the right-hand area in which the passes (3) and (6) are repeated. The uneven density impaired the produced image.

The bleeding of the ink of the print by the first pass into the non-printed picture elements is responsible for the fact that the density depends on the recording interval between the first and the second pass. This situation logically explains why the reciprocating printing has not been materialized. The explanation given thus far has assumed the case of applying the reciprocating printing to a monochromic system. The phenomenon in question manifests itself in conjunction with that of uneven coloration even in the case of multicolor recording as already pointed out. In this case, this phenomenon is recognized as prominence of uneven coloration on the left-hand and the right-hand areas or as difference in chromatic taste.

Also in the unidirectional recording, the following detrimental factors affect the time lag of recording. The carriage is temporarily suspended when the recording apparatus performs a head recovery scan for the sake of maintaining its own drive in the course of recording or it keeps itself waiting for arrival of record data being transmitted. Then, the suspension of this nature induces irregular occurrence of uneven image density on a still larger order than the inconstancy of time lag described above. To be specific, the carriage enters the phase of suspension as held in the state ensuing from the production of the record by the first pass and, with a certain time lag, the printed area of recording assumes a higher density than the other areas. This phenomenon of uneven image density induced by the factor mentioned above will be hereinafter referred to as "uneven density due to suspension" for the sake of distinction from the uneven density due to time lag described above.

In the ink jet recording apparatus which forms an image by driving the recording head in a direction different from the direction in which the nozzles in one head are arranged, an effort to realize the split recording and the reciprocating printing with a view to exalting the quality of image and expediting the printing operation still encounter such image drawbacks as uneven coloration, uneven density due to suspension, and uneven density due to time lag.

Further, the reciprocating printing has the possibility of causing positional deviation of ink dots on the paper surface in the forward and the backward printing owing to the accidental rise of the paper from its normal level as pointed out above.

When a 100% duty image is subjected to the reciprocating printing by use of the before-mentioned thinning masks incorporating therein ink dot arrays of the patterns of shepherd's check and inverted shepherd's check, the ink dots land on the paper surface in the manner illustrated in FIG. 58. FIG. 59 depicts the case of performing the split recording by the reciprocating printing using the conventional thinning mask of the pattern of a shepherd's check. The diagram shows the ink dots deviating from their normal positions by one quarter of the size of a picture element. The portions in which adjacent ink dots overlap excessively one another and the portions in which wide gaps intervene between adjacent ink dots are made to appear at different positions owing to the use of thinning masks. In the case of FIG. 59, since all the ink dots are printed in a reverse direction relative to the adjacent ink dots, a gap of the size of one ink dot occurs after each ink dot. Thus, the produced image assumes a low density throughout the entire area thereof.

The positional deviation of ink dots on the paper surface during the reciprocating printing is caused not only by partial rise or fall of the paper surface illustrated in FIGS. 52C and 52D but also by various factors such as, for example, the inconstancy of the speed at which the recording head ejects the ink and the inconstancy of the speed of motion of the carriage. It is not easy to control the timing for discharging the ink during the reciprocating printing because the factors mentioned above are not constant in magnitude relative to the direction of the advance of the carriage. Besides, since the distance from the head to the paper surface in the recording apparatus is dispersed appreciably among the individual apparatuses shipped from the production plant, the control of the landing positions of ink dots in the forward and the backward passes due to the adjustment of the timing for discharging the ink has its own limit.

In the conventional recording method which uses such a multi-head as described above, the timing (frequency) for continuous discharge of ink through the individual nozzles is determined by the density of picture elements in the recorded image and the speed of motion of the carriage. If this timing cannot be controlled with amply high accuracy, the ink dots for recording on the surface of the paper as the recording medium are incorrectly arrayed relative to the scanning direction of the carriage and the multi-heads, with the result that the recorded image will betray uneven density and inferior quality. As a result, the recording ink dots produced by the head are allowed to form an ideal image array only when the throughput is exalted to the fullest possible extent and the head is driven under conditions such that the limit of frequency of the head and the given density of picture elements may be simultaneously satisfied with high accuracy.

Incidentally, in the conventional test print, the method of printing vertical linear patterns perpendicular to the direction of scan as spaced at an interval of not less than several mm is generally adopted for the sake of the test print pattern itself intended to select the optimum conditions and for the purpose of enabling the operator to make his decision as to the selection. FIGS. 4A and 4B depict such vertical linear patterns.

One example of the conventional method for adjusting a reciprocating registration is illustrated in FIGS. 36A to 36F. FIGS. 36A (1) and 36A (2) respectively represent forward print data and backward print data for carrying out the reciprocating printing of the type allowing the feeding of a recording medium to intervene between the passes in the two directions. The vertical lines perpendicular to the direction of reciprocating scan which are illustrated in FIG. 36D constitute themselves the record pattern which is obtained by adjustment of normal registration based on the data mentioned above. Specifically, one vertical rectilinear test pattern is formed by printing vertical straight lines of 8 dots as spaced at a lateral interval of 4 dots in the forward and the backward passes. Heretofore, it has been customary that when the print timing in the two directions shows a deviation of 1 pixel or more in any of the vertical rectilinear test patterns, this deviation permits the operator to determine whether or not the particular test pattern is dispossessed of its rectilinearity and, after completion of the printing, select from among the plurality of test patterns one possessed of the best rectilinearity and insert the relevant numerical data of the choice test pattern somehow in the recording apparatus proper.

It has been also customary heretofore that the head is caused by a certain existent condition of itself to be moved along the longitudinal axis and, when this motion is made, the operator is enabled to insert the relevant numerical data of this motion into the recording apparatus proper and adjust the subsequent print timing during the reciprocating printing to the correction value.

The rectilinearity of the vertical rectilinear test patterns mentioned above, however, is such that any deviation exceeding 1 pixel can be visually discerned, while a deviation smaller than 1 pixel is not easily discerned visually. FIGS. 36B, 36C, 36E, and 36F represent the test patterns which aptly permit the visual determination of rectilinearity. They are record patterns for determining correction values for the compensation of positional deviation. They are obtained by successively varying the timing of backward print at an increment of 0.25 pixel from the record patterns of FIG. 36D as the median. Heretofore, it has been customary that the test patterns of FIGS. 36B, 36C, 36E, and 36F are rated as substantially equaling those of FIG. 36D. The criterion heretofore adopted for visually rating and adjusting the test print is the unit of at least 1 pixel.

Particularly when the reciprocating printing is performed by reciprocating the recording head relative to the recording width of the recording head while the recording medium is kept in a suspended state or when a plurality of color heads are parallelly driven, the maintenance of the optimum image quality by the control with a fixed drive parameter is likely to encounter an obstacle, such as by changes in the circumstance in which the printer is being used.

Specifically, the adversity in question will be briefed below with reference to FIGS. 60A, 60B and 61. FIGS. 60A and 60B illustrate the manner in which a head 901 fixed on a carriage 706 in motion at a speed S ejects an ink drop at an angle $\theta$ and a velocity V onto a paper surface placed at a distance P from the head respectively in the forward pass (FIG. 60A) and the backward pass (FIG. 60B). The carriage speed is S in the forward pass and −S conversely in the backward pass and the angle of ejecting is fixed constantly at $\theta$. Now, let $\Delta A$ and $\Delta B$ stand for the distance from the position at which the head ejects the ink drop to the position at which the ink drop lands on the paper surface in the forward and the backward pass, respectively, relative to the direction of scan, then they will be expressed by the following formulas.

$$\Delta F = P \times (V \sin \theta + S)/V \cos \theta$$

$$\Delta B = P \times (V \sin \theta - S)/V \cos \theta$$

Thus, the timing of ink discharge relative to a target picture element in the forward and the backward pass differs in terms of distance as follows.

$$(\Delta F - \Delta B) = P \times 2S/V \cos \theta$$

If this magnitude is invariably constant in all the recording apparatus and recording heads, the positions of ink dots in both directions will be kept duly corrected by driving the head constantly at a timing fit for ideal ink discharge. Actually, however, there exists the possibility that the thickness of a recording paper varies P, the uneven carriage speed varies S, and the inconstancy of craftsmanship among recording heads varies the speed of discharge V. Even one and the same head possibly imparts a variation to the speed of ejecting the ink owing to such factors as temperature and direction of scanning or eventually induces gradual variation in this speed owing to the effect of protracted of use.

FIG. 61 shows the magnitudes of the distances $\Delta F$ and $\Delta B$, the difference ($\Delta F - \Delta B$), and the amount of positional deviation of ink dots which are found when the distance P, the carriage speed S, the ejection speed V, and the discharge angle $\theta$ shown in FIGS. 60A and 60B are varied in the forward and the backward pass.

The data given in the uppermost row of the table of FIG. 61 represent the case of using the paper distance P=1.2 mm, the carriage speed S=4.318 m/sec (equal in forward and backward passes), and the ejection angle $\theta$=10° (equal in forward and backward passes) as conditions and reporting "0" as the magnitude of positional deviation of ink dots in the two directions on the assumption that the head is driven so as to satisfy the magnitudes of $\Delta F$ and $\Delta B$ and the optimum correction value ($\Delta F - \Delta B$)=84.18 $\mu$m.

In contrast, the data given in the second and following rows of the table show the fact that the proper correction value ($\Delta F - \Delta B$) is varied from one case to another because the magnitudes of various factors are varied little by little. Since the head is driven in these cases with the same timing as that used for the operation yielding the data of the uppermost row, varying amounts of positional deviation of dots inevitably arise. Thus, the magnitudes of deviation indicated in these rows represent differences of optimum correction value ($\Delta F - \Delta B$) respectively from the magnitude shown in the uppermost row.

In the table of FIG. 61, the individual factor values are varied within the ranges generally accepted for variation of such values. It is remarked from this table that the factor capable of affecting the deviation of dots in the two directions to the greatest extent is the paper distance P. From the table, it is noted that when the paper distance fixed at 1.2 mm is varied by a correction value of only ±0.2 mm, this variation gives rise to a deviation of 42.29 $\mu$m (not less than a half picture element at a picture element density of 360 dpi). The recording papers of an ordinary run have a staple thickness of about 100 $\mu$m. The variation of thickness of the order just mentioned is easily affected by the inconstancy of the paper distance among the recording apparatuses proper and the inconstancy of craftsmanship among the recording heads. Thus, the corrections must be made in accordance with the conditions of a particular recording apparatus.

The variation of the paper distance under discussion which is caused by the inconstancy of the recording apparatus itself can occur while the printing is in process. Ideally, the part of the recording paper engaging in the printing operation should be kept in a flat smooth state by paper retainers disposed one each before and after the site of printing. When the printing duty is high or when the split recording method which completes a print by dividing one and the same recording scan into a plurality of recording scans is adopted, however, the part of the recording paper already used for printing possibly entails shrinkage of fibers therein because of the absorption of the ink. Thus, this particular part is likely to be raised from the normal level. In this case, the paper distance P is apt to vary in the forward and the backward pass in each recording scan. This rise of the paper (hereinafter referred to as "cockling") varies the optimum correction value and consequently gives rise to a positional deviation of dots during the reciprocating printing.

As described above, the correction value can not be kept constant because of various factors. It has been ascertained that the correction of the positions of ink dots is desirable when the reciprocating printing is carried out or when the record is produced with a plurality of heads.

In the case of reciprocating printing or in the case of producing a record by use of a plurality of heads, since such dot positions are evaluated and corrected based on the rectilinearity of vertilines of a specific pattern as described above, the accuracy of determination is inevitably limited and the maintenance of ideal image quality is likewise limited. In short, the conventional method which relies for determination of dot positions on such vertical lines as described above does not easily permit correct determination for the sake of such fine adjustment as involves a microscopic size of several $\mu$m or not more than one picture element.

Besides, the recent exaction of the manufacture of printed images of improved quality at a great speed has reached a point where a novel method which allows correction of dot positions and, at the same time, permits compensation with such a minute unit as mentioned above serves as an indispensable tool. The conventional printer, on encountering a change in the material or thickness of the recording medium, requires a varying measure to counter the change and obtains an ideal image condition with difficulty. Thus, the desirability of infallibly and accurately accomplishing ideal recording characteristics without being affected by such factors of the recording medium as material and thickness has been gaining in significance.

A system which allows the operator of a printer to evaluate the test print image easily and accurately remains yet to be developed.

SUMMARY OF THE INVENTION

This invention has been produced in association with the aforementioned drawbacks of the prior art. Thus, it is an object of this invention to provide an improved ink jet recording method and apparatus.

A further object of this invention is to provide an ink jet recording method and apparatus capable of realizing manufacture of recording images of high quality at a high speed.

Another object of this invention is to provide an ink jet recording method and apparatus capable of rendering inconspicuous the drawbacks of positional deviation of recorded dots possibly posed during the reciprocating printing and imparting exalted quality to the recorded images.

Still another object of this invention is to provide an ink jet recording method and apparatus capable of simultaneously overcoming the defects of image due to the positional deviation of dots during the reciprocating printing and the defects of image such as uneven coloration, uneven recording due to suspension, and uneven recording due to time lag.

A further object of this invention is to provide an ink jet recording method and apparatus adapted to complete a record by performing a plurality of times of reciprocating recording and scanning on one and the same image area by use of a multi-head having a plurality of ink nozzles arrayed therein and, at the same time, successively feeding the recording paper relative to the multi-head, characterized in that picture element arrays of thinning patterns for use in each recording scan are in a complementary relation, the picture element arrays of at least those of the thinning patterns which are used in the unidirectional recording and scanning are allowed to adjoin one another in the direction of recording and scanning so as to render inconspicuous the drawbacks of positional deviation of dots in the two directions which are inevitably caused by the rise or fall of the paper surface, various drive defects, and changes in the speed of ink ejection and permit production of uniform and smooth images of high quality.

Another object of this invention is to provide an ink jet recording method and apparatus adapted to complete a record by performing a plurality of rounds of reciprocating recording and scanning on one and the same image area by use of a multi-head having a plurality of ink nozzles arrayed therein and, at the same time, successively feeding the recording paper relative to the multi-head, characterized in that picture element arrays of thinning patterns for use in each recording scan are in a complementary relation and the picture element arrays of the thinning patterns have arranged by a prescribed rule therein rectangular unit picture element groups each composed of m vertical picture elements and n (n>m) lateral picture elements.

Still another object of this invention is to provide an ink jet recording method which comprises causing the main scan in either of the forward and the backward pass of the reciprocation of a recording head to print a larger number of picture elements than the main scan in the other pass.

Yet another object of this invention is to provide a novel test print method and apparatus for enabling an operator or automatic reading means to evaluate a test print image easily and accurately.

A further object of this invention is to provide a test print method and apparatus for accomplishing ideal recording characteristics accurately without being affected by the material or thickness of a recording medium.

Still another object of this invention is to provide a test print method and apparatus capable of notably improving the accuracy of evaluation of a test print image by adopting as the criterion for evaluation the uniformity of the test print image such as the presence or absence of image or the change of color tone instead of the rectilinearity of a test pattern and accomplishing fine adjustment by the unit of several pm or not more than one picture element.

This invention is primarily characterized by being furnished with a test pattern print mode which effects formation of a test pattern within the range of a prescribed width of a recording medium (hereinafter referred to as a "fixed area") while the recording medium is in a suspended state by the printing operations performed in a forward and a backward pass provided severally with pertinent divisions of the data for forming the test pattern to be printed in the fixed area instead of putting the recording medium in motion between the forward and the backward pass. This mode is at an advantage in precluding the quality of image of the test print from being degraded by the motion of the recording medium and permitting exact determination of the mutual positional deviation of the divisions of data for the formation of the test pattern because the recording medium is kept from motion during the formation of the test pattern.

Further, this invention allows the determination of the positional deviation to be attained more stably with an exalted accuracy than the conventional technique owing to the adoption of the uniformity of a test print image such as the presence or absence of an image of the test pattern itself or the change in color tone as the criterion for determination.

Specifically, the determination based on the presence or absence of an image is accomplished by causing the test pattern owing to the printing operations in the forward and the backward pass based on the pertinent divisions of data to be realized in the form of a linear pattern produced in the direction of the reciprocating scan, desirably in the form of a pattern resulting from arranging a plurality of such linear patterns in the direction of the reciprocating scan as spaced at a minute gap relative to a direction perpendicular to the direction of the reciprocating scan, and more desirably in the form of a substantially zonal linear pattern in the direction of the reciprocating scan.

The term "linear pattern" as used herein implies that the divisions of data themselves have dot intervals of not more than 300 µm relative to the direction of the reciprocating scan or have these dot intervals of not more than 300 µm in the state of satisfying the actual normal registration so that the target normal registered print is enabled to discern visually a substantial line print. The term "minute gaps" in the direction intersecting the direction of the reciprocating scan implies that the determination by visual observation is facilitated by the plurality of linear patterns on the order of not more than 1 mm, preferably not more than 500 µm. Then, the term "linear pattern" implies that since the ordinary resolution by visual observation is about 150 µm at a distance of 25 cm from the image, substantially normal dots are made to form lateral straight lines such that the normal registration eventually formed by the divisions of data may have dot intervals of not more than 150 µm. Besides, the term "substantially zonal linear pattern" implies that the normal registration eventually formed by the divisions of data have dot intervals of not more than 150 µm (optimally the dots forming a continuous line) relative to the lateral direction and the dot intervals in the state of satisfying the actual normal registration are not more than 300 µm (preferably not more than 150 µm) and, therefore, those images which can be regarded as wholly filled images of a uniform density distribution as visually observed are invariably embraced by the term.

Particularly when the ink jet recording system is resorted to, such "patterns of uniformity" call for varied conditions on account of such defects as inconstancy of ink droplets and bleeding of ink on the recording medium. Specifically, this uniformity is only required to be such that when a uniform pattern of a prescribed area is test printed, the positional deviation of dots smaller than one picture element can be easily determined in the pattern in view of the occurrence of uneven density or the presence or absence of texture as the criterion.

To be more specific, the patterns formed by the forward and the backward pass in accordance with the pertinent divisions of data for the formation of a test pattern are desired severally to be arrayed consecutively over a fixed distance regularly in the vertical and the lateral direction as spaced at a pitch within several picture elements. The term "a pitch within several picture elements" may be construed as a size not exceeding 400 µm.

For this invention, the fact that the print by the forward pass and the print by the backward pass are produced by turns as in the linear pattern of the reciprocating scan which allows the print by at least either of the two opposite passes to intervene between the prints by the other pass is advantageous in providing a test print in which the phenomenon of "misregistration" of either of the prints is easily determined distinctly in the form of a clear increase of image or area or an increase of ratio of variation in the density distribution. Further, the linear pattern is desired to have the greatest possible length. The length is desired to be not less than 1 cm instead of not less than 5 mm. Practically, however, this length is desired to be in the range of 2 cm and 8 cm.

To adduce a condition favorable for this invention, the test pattern should be such that in an area pattern occupying a prescribed area, the portions in which dots recorded by the backward scan are present to the right of the dots recorded by the forward scan and the portions in which dots recorded by the backward scan are present to the left of the dots mentioned above arise under the condition that, in at least two portions, the dots recorded by the forward scan adjoin the dots recorded by the backward scan. This condition is desirable because the portions in which two dots are excessively overlapped and the portions in which two dots are excessively separated are simultaneously allowed to exist within the area pattern when the dots of the forward scan and those of the backward scan deviate. Such a change of density as is discerned in this case constitutes itself as a unit for clarifying the uneven density or permitting perception of texture for the sake of visual observation or automatic evaluation of density. Besides, the fact that the dots recorded by the forward pass and the dots recorded by the backward pass continue mutually at a plurality of points proves desirable in allowing changes of density to be discerned more readily (see working examples).

The ease with which the determination of uneven density or occurrence of texture is obtained can be exalted by increasing the frequency of the aforementioned points of adjoining dots. The exaltation is accomplished, for example, by complicating the thinning pattern or increasing the test print areas in the scanning direction or by increasing the length of the direction intersecting the direction of scan to the range in which the record dots produced by the recording head are wholly put to use. The increase of the area occupied by the area pattern is desirable because it not only enhances the sensitivity of uneven density and occurrence of texture but also permits adjustment of dot positions possibly associated with such various unstable factors as uneven scan of the carriage, uneven motion of the recording medium (as encountered in the repetition of test patterns of this invention), and cockling of the recording medium.

In order for the divisions of data of this invention to form a definite image of dots on the recording medium particularly by use of ink jets, the divisions of data are desired to comprise at least four kinds of data so that a plurality of kinds of data may be assigned each to the forward and the backward pass and a plurality of reciprocating passes may form the line pattern mentioned above. This arrangement enhances the fastness of the deposition of ink droplets on the paper surface and, at the same time, accomplishes the exaltation of accuracy.

The formation of a plurality of such test patterns in which the timing of the reciprocating scan registration is shifted at a pitch of not more than 1.00 pixel simplifies the evaluation mentioned above and facilitates the adjustment of registration as desired. A correction process or correction means which is provided for the sake of enabling the timing of reciprocating scan registration to be shifted at a pitch of not more than 1.00 pixel allows a desired correction to be accomplished infallibly. Further, the fact that the data used severally for the execution of the forward and the backward scan are divided so as to give rise to at least a plurality of dots continuing in the direction of scanning lends itself to further clarifying the characteristic of this invention.

This invention permits necessary designation of test patterns of the test pattern print mode by preparing a plurality of severally different fixed area test patterns as the test pattern print mode and properly designating the plurality of fixed area test patterns. This designation of test patterns enables the accuracy of the apparatus to be adjusted as required. The apparatus preparatorily to the shipment from the factory may be subjected to high-accuracy evaluation and, after arrival at the customer's office, left to be evaluated by the operator with advertence of the ordinary level. As a tool for this high-accuracy determination, the first test pattern which contains the central area of the recording medium and the areas located to the left and the right of the central area as test print areas may be cited. As a tool for the determination of the ordinary level, the second test pattern which contains fewer areas than in the first test pattern as test print areas may be used. The high-accuracy evaluation described above is desirable because it is capable of taking into account the whole condition in the direction of width of the recording medium.

The color test print contemplated by the present invention, though applicable to the aspect of this invention described above, is characterized by the adoption of a more developed change of image color as a criterion for determination. To be specific, the color test print under discussion is accomplished by the ink test print method adapted to execute a bidirectional mode for causing a plurality of color multidot heads to produce prints on the fixed area by the forward and the backward pass thereof, characterized by using a test pattern print mode for forming overlapped test patterns with a plurality of colors on the fixed area by use of the prints produced by the forward and the backward pass severally furnished with the divisions of color data for forming the overlapped test patterns of a plurality of colors to be printed on the fixed area.

In the aspect of apparatus, this invention is directed typically to an ink jet recording apparatus comprising a carriage carrying a multi-ink jet head and producing a reciprocating scan, transport means for transporting a recording medium in a direction intersecting the direction of scanning, a bidirectional mode for producing prints on a fixed area by both the forward and the backward pass of the multidot head, and memory means for memorizing test patterns adapted to display reciprocating registration, characterized in that the memory means mentioned above has stored therein data for the forward pass and data for the backward pass which are the divisions of data for forming test patterns to be printed on the fixed area while the recording medium mentioned above is in a suspended state.

BRIEF DESCRIPTION OF THE DRAWINGS

FIGS. 10A and 10B are diagrams for aiding in the description of a thinned printing relative to the Dither method.

FIGS. 11A and 11B are diagrams for aiding in the description of two kinds of Dither method.

FIG. 15 is a diagram for aiding in the description of a thinned printing relative to the Dither method.

FIGS. 22A to 22D are diagrams illustrating thinning masks used for varying colors in the Third Embodiment.

FIGS. 23A and 23B are diagrams illustrating other examples of the thinning mask for black.

FIG. 24 is a diagram illustrating a two pass printing by use of the thinning mask of FIGS. 22A to 22D.

FIG. 26 is a diagram for aiding in the description of a picture element array in a conventional four pass bidirectional printing.

FIGS. 27A to 27D are diagrams illustrating the printing mask of the Fourth Embodiment.

FIGS. 29A and 29B are diagrams for aiding in the description of picture element arrays used in a low duty image recording of the Fourth Embodiment.

FIGS. 31A and 31B are diagrams for aiding in the description of a printing motion in a Fifth Embodiment of this invention.

FIG. 32 is a diagram for aiding in the description of a printing mask and a recorded image in a Sixth Embodiment of this invention.

FIGS. 34A to 34O are diagrams illustrating correction samples of this invention.

FIGS. 36A to 36F are diagrams illustrating examples of conventional bidirectional dot correction patterns.

FIGS. 39A to 39F are diagrams illustrating correction patterns of Ninth Embodiment of this invention.

FIGS. 44A to 44O are diagrams showing data of density distribution in the Tenth Embodiment of this invention.

FIGS. 49A to 49C are diagrams illustrating the condition of a print of uneven density produced by use of an ink jet printer.

FIGS. 52A to 52D are diagrams for aiding in the description of positional deviation of dots deposited on a paper surface in a reciprocating printing.

FIGS. 55A to 55C are cross sections of a paper surface for aiding in the description of the condition of occurrence of uneven coloration.

FIGS. 57A to 57D are diagrams for aiding in the description of the condition of occurrence of uneven density due to a time lag.

FIGS. 60A and 60B are diagrams for aiding in the description of deviation of dots encountered in the bidirectional printing by use of an ink jet printer.

FIG. 61 is a tabular diagram showing the relation between the cause for dot deviation and the amount of dot deviation.

DETAILED DESCRIPTION OF THE PREFERRED EMBODIMENTS

Figure 45:
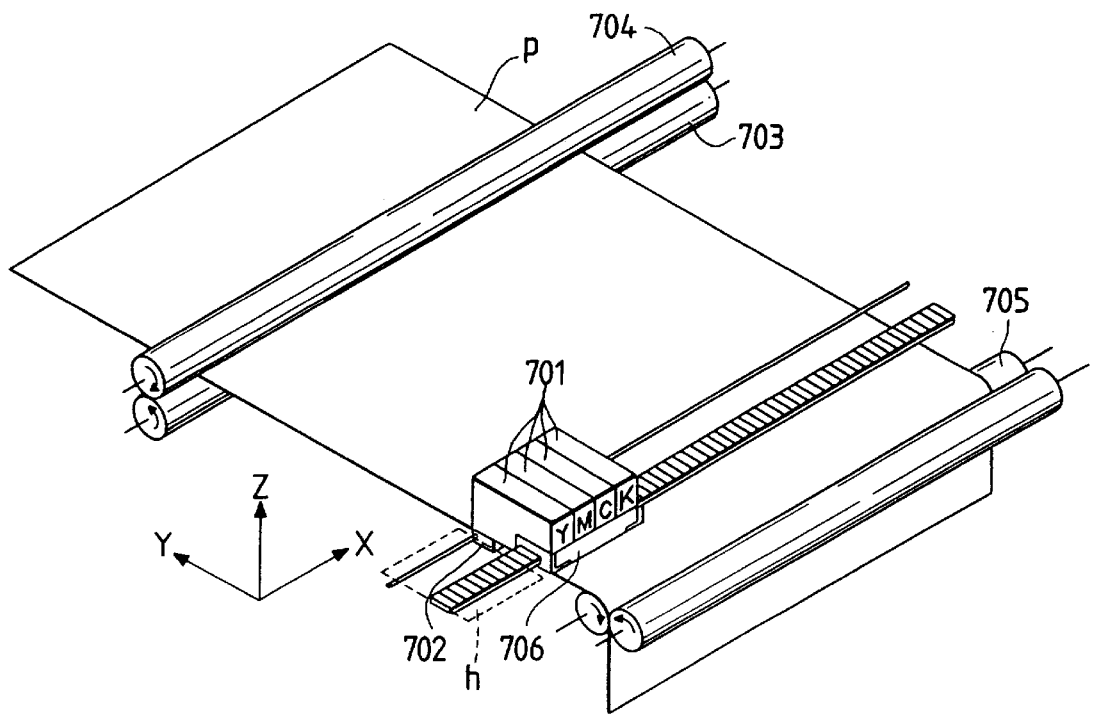
FIG. 45 is a diagram schematically illustrating the construction of an ink jet recording apparatus to which this invention is applicable.
Figure 46:
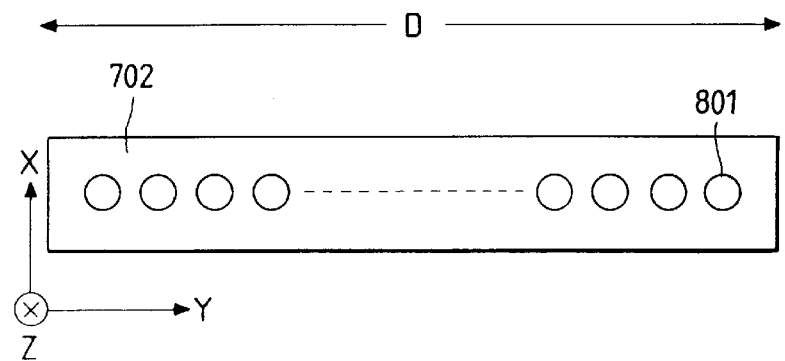
FIG. 46 is a diagram illustrating a multi-head.

Now, working embodiments of this invention will be described in detail below with reference to the drawings annexed hereto. FIG. 45 is a perspective view schematically illustrating the construction of an ink jet recording apparatus to which this invention is applicable. In the diagram, 701 stands for each ink cartridges disposed in array. These ink cartridges 701 comprise ink tanks severally packed with inks of the four colors, black (Bk), cyan (C), magenta (M), and yellow (Y), and multi-heads 702 corresponding to the colors. The appearance of multinozzles 801 disposed on the multi-head as viewed from the direction of Z is illustrated in FIG. 46. The multinozzles 801 are arrayed on the multi-head 702. While the multinozzles 801 are portrayed in this diagram as arrayed parallelly to the Y axis, they may be more or less inclined relative to the XY plane of the diagram. The multinozzles 801, when so inclined, continue their printing actions with their timings successively shifted, whereas the head continues advancing in the direction of advance X.

Again with reference to FIG. 45, 703 stands for a paper feed roller which rotates in the direction of the arrow shown in the diagram while keeping a printing paper 707 nipped in cooperation with an auxiliary roller 704 and sends the printing paper 707 in the direction of Y. Paper supply rollers 705 supply a printing paper and, at the same time, discharge the role of nipping the printing paper 707 like the rollers 703 and 704. A carriage 706 supports four ink cartridges and moves them as they continue their printing actions. The carriage 706 is adapted to stand by to await a command at its home position (h) indicated with a dotted line in the diagram while not engaged in the printing work or engaged in the work of restoring the multi-heads.

Incidentally, in this working example, the recording heads respectively of the ink jet cartridges are adapted to spout ink drops by causing a change in the state of aggregate of ink by virtue of thermal energy.

The four ink jet cartridges mounted on the carriage 706 are so arrayed that, during the forward motion of the carriage, the black ink, cyan ink, magenta ink, and yellow ink spouted through the respective multinozzles 801 may be superposed in the order mentioned. The intermediate colors can be realized by properly superposing the ink dots of the colors C, M, and Y. For example, red is obtained by superposing M and Y, blue C and M, and green C and Y.

Generally, black is obtained by superposing the three colors C, M, and Y. The black thus obtained is deficient in development of color. It forms a colored fringe because these colors are not easily superposed with high accuracy. The superposition entails unduly dense ejection of inks per unit time. Thus, the black is exclusively ejected independently.

Figure 47:
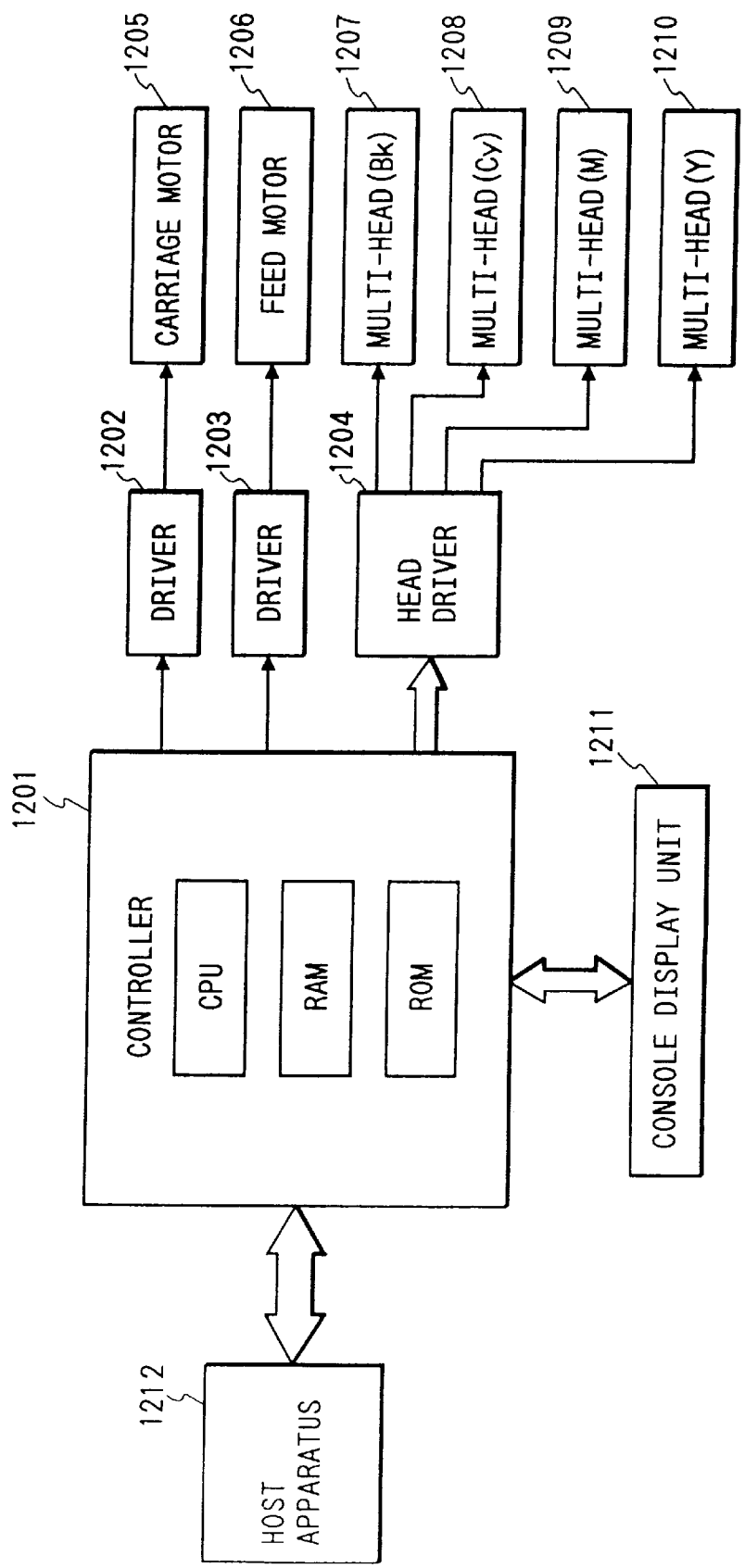
FIG. 47 is a block diagram illustrating a control part of the ink jet recording apparatus shown in FIG. 45.
Figure 48C:
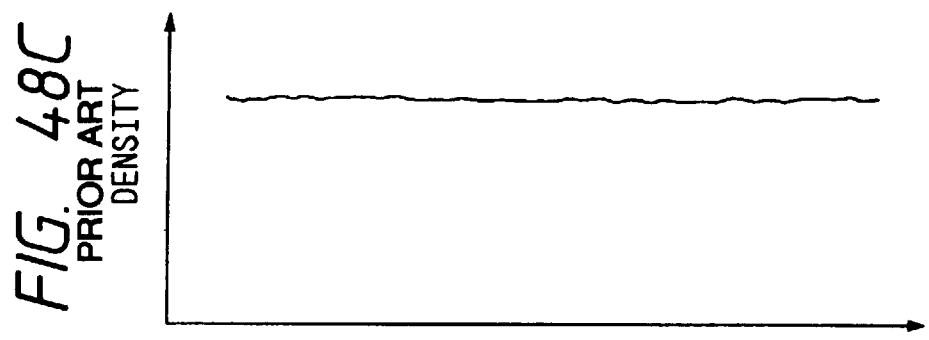
FIGS. 48A to 48C are diagrams illustrating the condition of ideal printing by use of an ink jet printer.
Figure 48B:
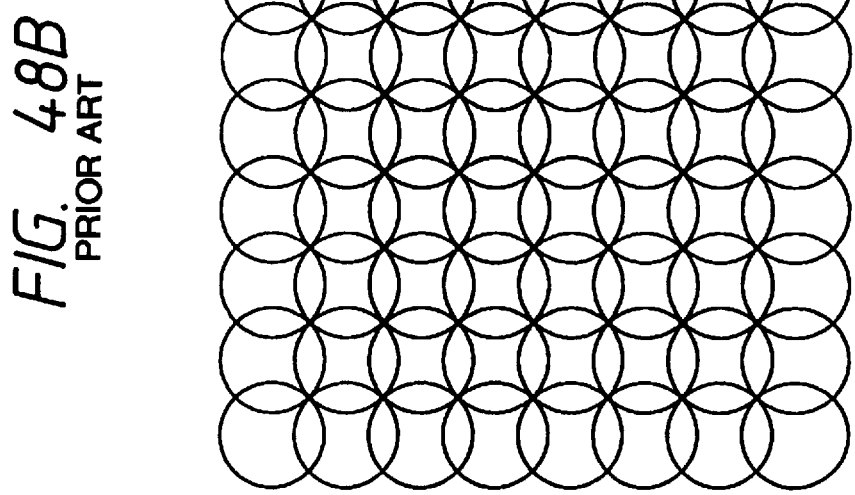
Figure 48A:
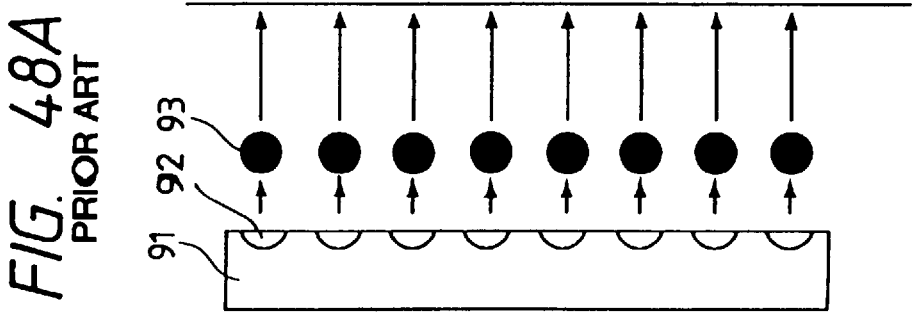
Figure 50C:
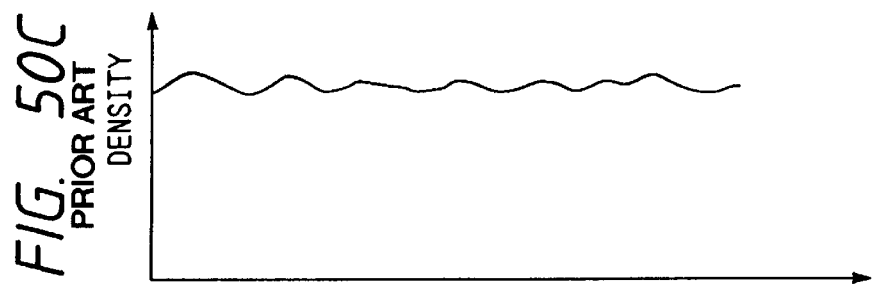
FIGS. 50A to 50C are diagrams illustrating a split printing.
Figure 50B:
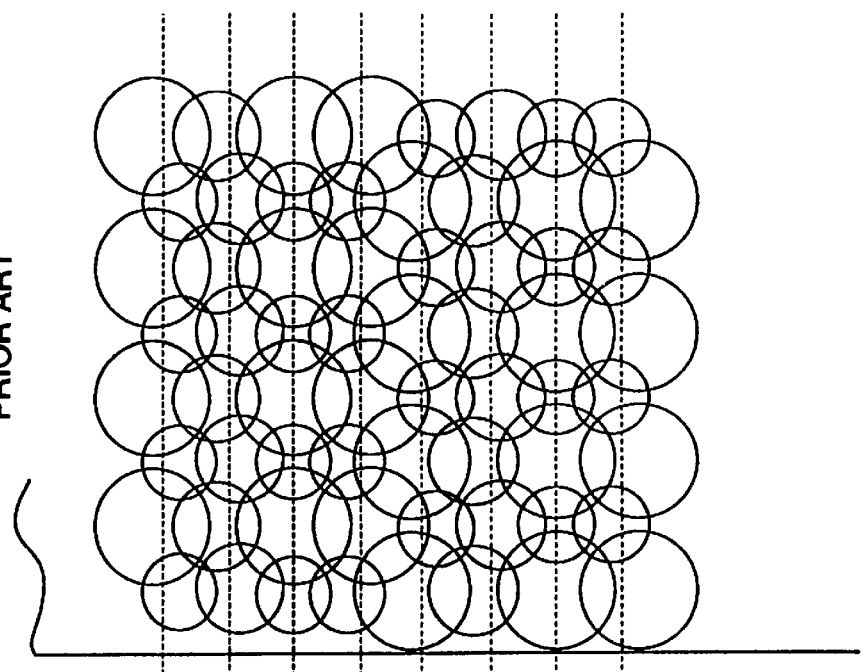
Figure 50A:
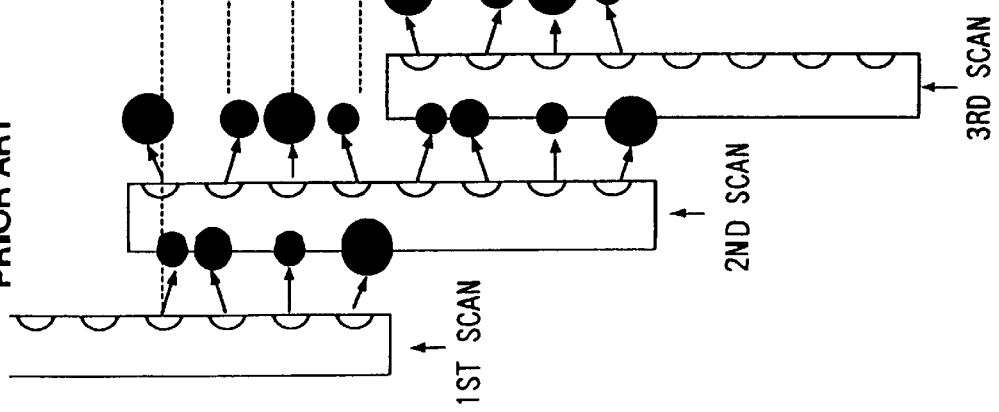
Figure 51A:
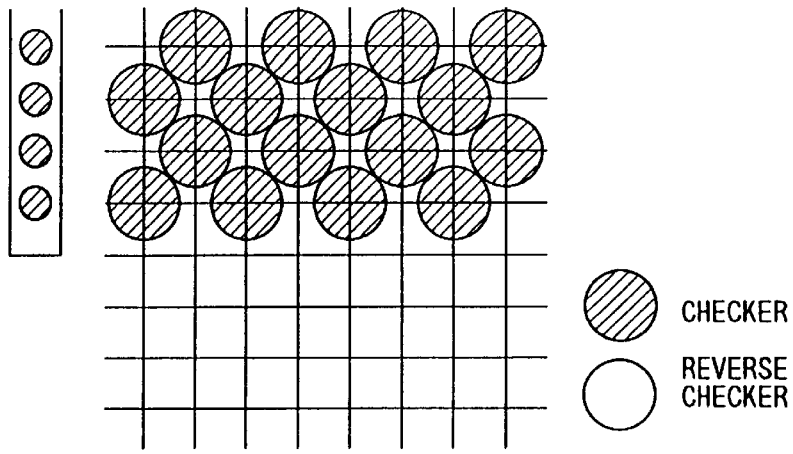
FIGS. 51A to 51C are diagrams illustrating a split printing.
Figure 51B:
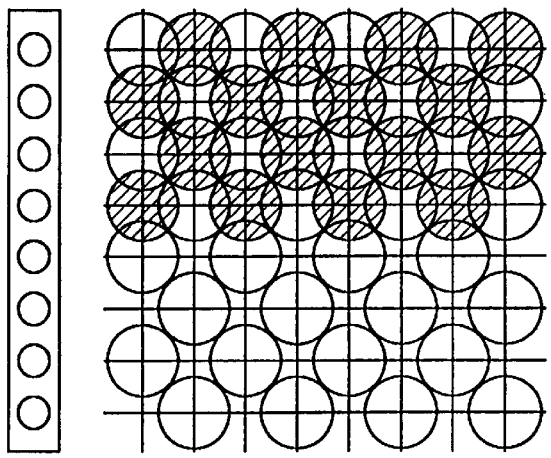
Figure 51C:
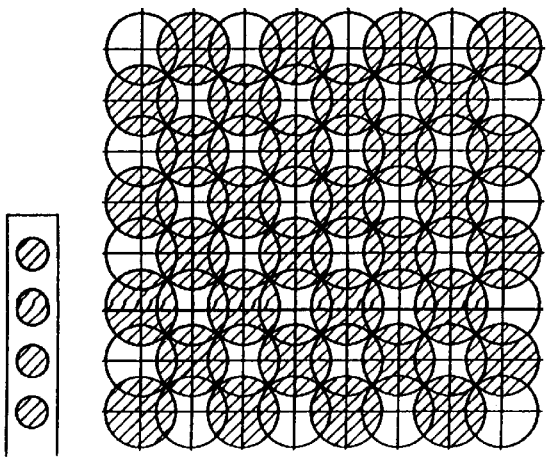
Figure 53:
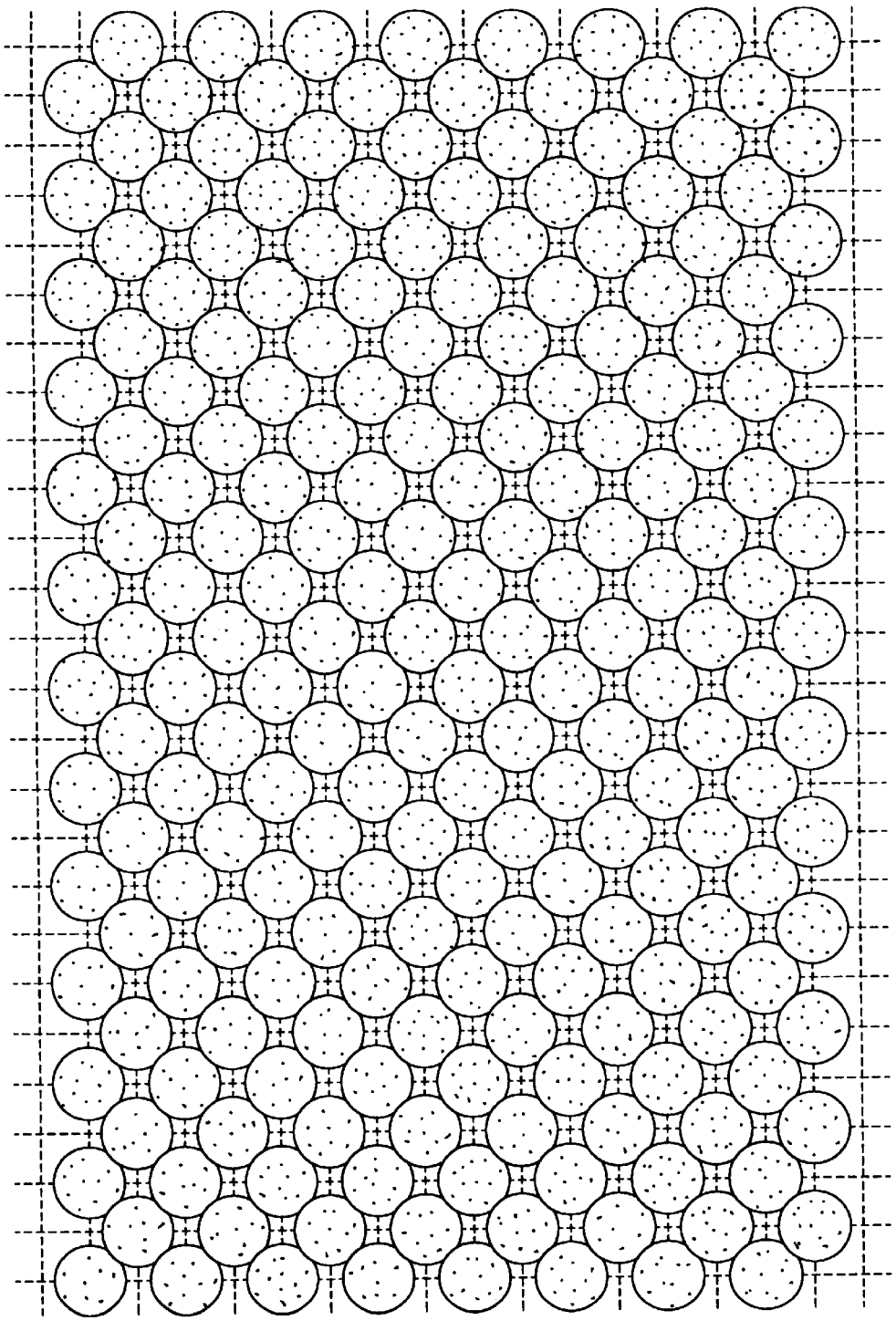
FIG. 53 is a diagram illustrating a thinned array of conventional split records.
Figure 54A:
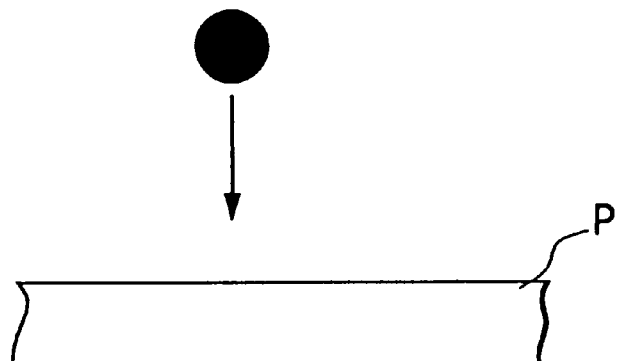
FIGS. 54A to 54D are diagrams illustrating the condition of ink dots in the process of being absorbed on a paper surface.
Figure 54B:
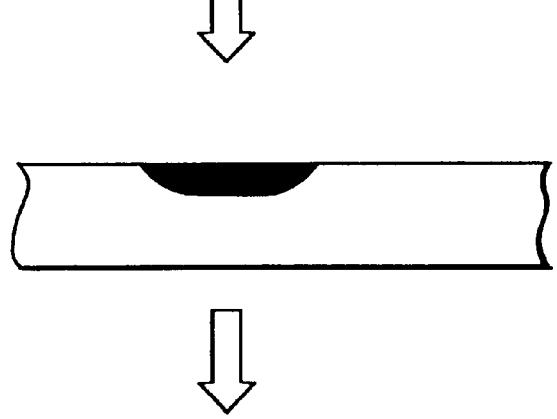
Figure 54C:
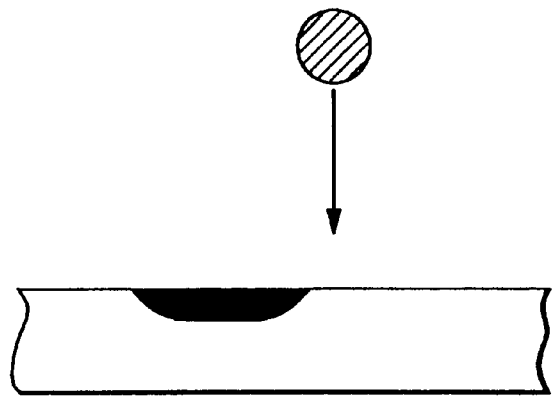
Figure 54D:
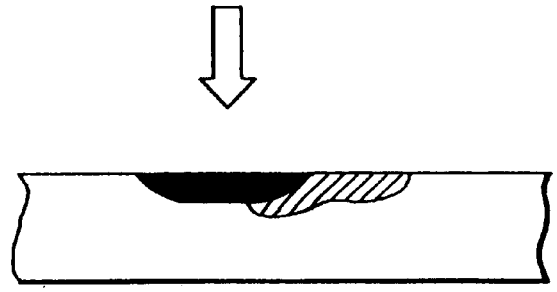

FIG. 47 is a block diagram illustrating a control part of the ink jet recording apparatus shown in FIG. 45. In the diagram, 1201 stands for the control part which is constructed as centered around CPU, ROM, RAM, etc. and is operated to control the component parts of the apparatus in accordance with programs stored in the ROM. Denoted by 1202 is a driver for driving a carriage motor 1205 serving the purpose of moving the carriage 706 in the direction X (for main scan) in compliance with a signal from the control part 1201, 1203 a driver for driving a transfer motor 1206 adapted to drive the paper supply roller 705 and the paper feed roller 703 and transfer a recording material in the direction of Y (for sub-scan) in compliance with a signal from the control part 1201, 1204 a driver for driving differently colored multi-heads 1207 to 1210 (corresponding to the component denoted by 702 in FIG. 9) in compliance with printing data issued from the control part 1201, 1211 an operation display part for displaying inputs from various keys and various data, and 1212 a host device for supplying printing data for the control part 1201.

The carriage 706 standing at the home position shown in the drawing and awaiting the start of the printing operation, on receiving an instruction to start the printing operation, moves in the direction X and simultaneously causes n multinozzles 801 on the multi-head 702 to produce a print exclusively within the width D on the paper surface. When the printing of data is terminated at the end part of the paper surface, the carriage returns to the home position and again starts printing data in the direction of X. When the apparatus happens to be in the reciprocating printing mode, the carriage moves in one direction-X and simultaneously continues engaging in the printing operation. Between the time the first round of printing is completed and the time the second round of printing is started, the paper feed roller 703 is rotated in the direction of the arrow to feed a paper in the direction Y in accordance with the width of the recording area. The printing of data on one paper surface is completed by the repetition of the unit cycle of printing and paper feed for each of the passes of the carriage as described above.

Now, a concrete example of the recording method to be carried out with such an ink jet recording apparatus as described above will be explained below.

(First Embodiment)

Figure 1A:
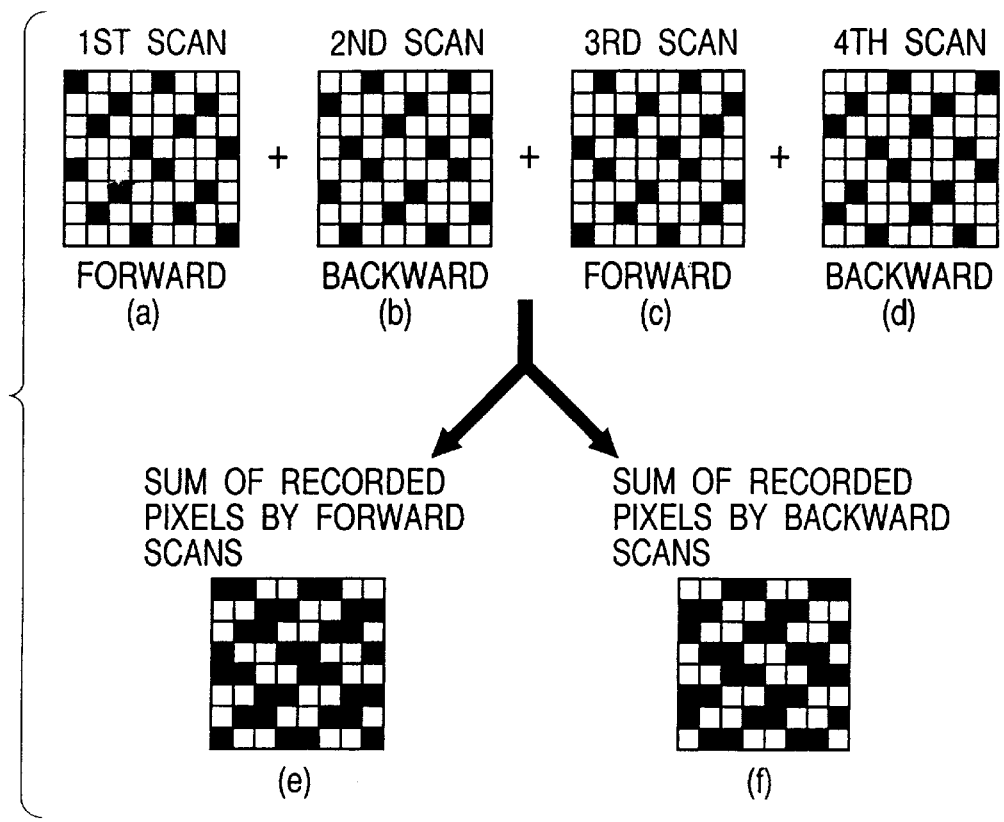
FIGS. 1A and 1B are diagrams for aiding in the description of recording picture elements forming each of the passes used in a the four pass printing in First Embodiment of this invention.
Figure 1B:
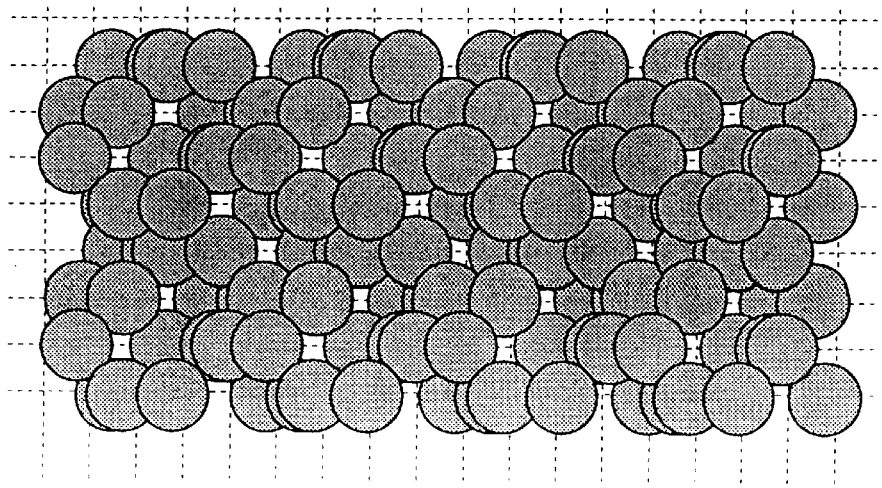

Now, a first embodiment will be described below. FIGS. 1A and 1B are diagrams for illustrating the present embodiment in comparison with the diagrams of FIGS. 2A and 2B. In FIGS. 1A to 2B, four rounds of recording and scanning are carried out on a fixed area of a recording paper. The recording of an image on this fixed area is attained by sequentially recording a thinned image in each round of recording and scanning with a thinning mask in which picture element arrays are kept in a mutually complementary relation as shown in (a) to (d). In the four rounds (or times) of recording and scanning, the odd number (first and third) rounds of recording and scanning are carried out in the forward pass of the reciprocating motion of the multi-head 702 and the even number (second and fourth) rounds of recording and scanning on the backward pass. The squares of (e) and (f) respectively represent the sum of picture elements recorded in the forward pass and the sum of picture elements recorded in the backward pass. FIG. 1B represents the condition of recording dots which have landed on a paper surface.

Figure 2A:
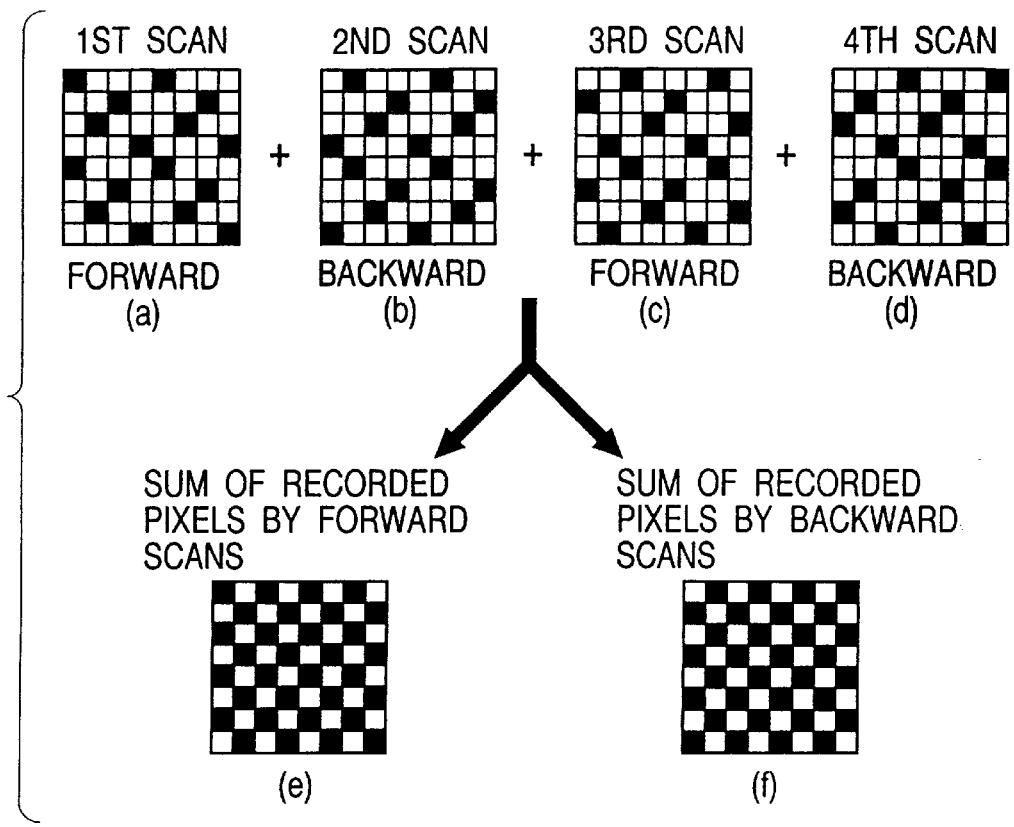
FIGS. 2A and 2B are diagrams for aiding in the description of recording picture elements forming each of the passes used in the conventional four pass printing.
Figure 2B:
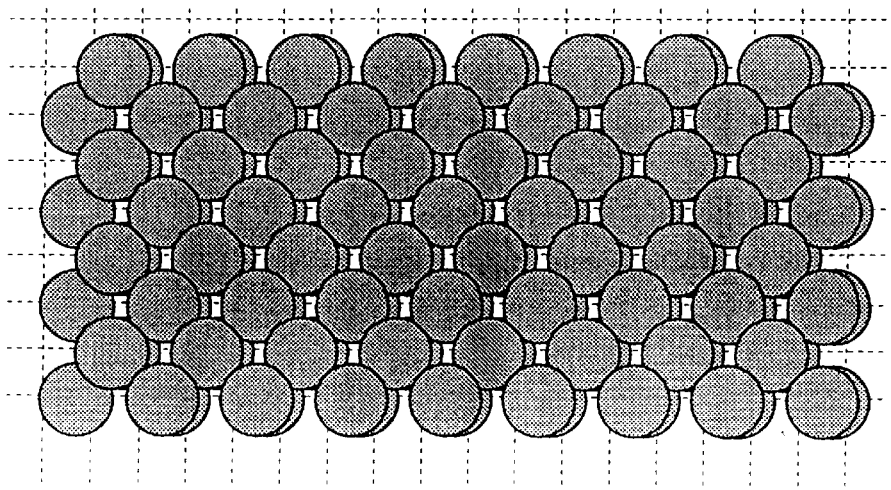

FIG. 1B like FIG. 2B illustrates the condition in which the reciprocating printing has given rise to positional deviation of dots in one quarter of the picture elements. As regards the condition of aggregate of dots which have landed on the paper surface, the print of FIG. 1B is found to have a smaller number of gaps than the print of FIG. 2B.

The difference between the present embodiment (FIGS. 1A and 1B) and the embodiment (FIGS. 2A and 2B) manifests itself in the sum of recording picture element arrays produced by two rounds of unidirectional printing. In the print of FIG. 2A, the sum of picture element arrays produced in the forward pass and that in the backward pass each form a shepherd's check pattern of one-dot units. In contract, in the print of FIG. 1A, the sum in the forward pass and the sum in the backward pass each has units each of two picture elements arranged in the direction of scanning without fail. Thus, the phenomenon of thin density is prevented because the picture element arrays resulting from two rounds of unidirectional scanning are formed in a mutually adjoining state.

The object of this invention resides in rendering inconspicuous to the fullest possible extent the drawback of positional deviation of the dots inevitably caused between the two directions of printing by rise and fall of the paper surface or uneven drive of the paper during the bidirectional printing or by change in the speed of ink ejection. Now, therefore, the question as to what kind of array is generally required for the thinning mask in realizing the object mentioned above will be discussed below.

During the bidirectional printing, the deviation occurs unexceptionally on any dots under equal conditions. Thus, the extent to which such gaps as are found in FIG. 2B are decreased determines the object and the effect of this invention.

The number of gaps coincides with the number of points at which the dots deposited on the paper surface in the forward pass and the dots so deposited in the backward pass adjoin each other. In FIG. 2B, the gaps are formed next to all the dots because the prints on the forward pass and those on the backward pass are caused to alternate as spaced at an interval of one dot. In contrast, in FIG. 1B, since the groups of dots printed in the fixed direction are in such a state as having two dots connected to each other in the lateral direction, no gap occurs between these two connected dots and the number of gaps can be reduced at a rate of one to two. Precisely, the number of gaps arising from the deviation of dots during the bidirectional printing is inevitably associated with the number of pairs of laterally connected dots in the sum of the individual picture element arrays formed in the unidirectional printing.

As described above, the present embodiment realizes the object of rendering inconspicuous the gaps which occur during the bidirectional printing because the picture element arrays as the sums of picture elements formed in the forward and the backward pass are aggregated as paired off in the direction of the advance of the head for scanning notwithstanding the picture element arrays to be used for each round of recording and scanning comprise one-picture element units which do not adjoin mutually. Besides, the method of the present example is equally effective in the case of monochromic black prints and in the case of prints of a plurality of colors. In the case of a color ink jet recording apparatus, for example, such thinning arrays as are shown in FIG. 1A may be used for black, cyan, magenta, and yellow in common or four picture element arrays of different colors may be circulated in each round of scanning. Further, the use of picture element arrays assuming entirely different complementary relations in each color may be expected to bring about the same effect as mentioned above so long as the picture element arrays for the unidirectional recording and scanning mutually adjoin as already described.

(Second Embodiment)

Now, a second embodiment of this invention will be cited below. The comparison between FIGS. 3A, 3B and FIGS. 5A, 5B on the one part and FIGS. 4A, 4B and FIGS. 6A, 6B on the other part makes the effect of this example stand out. Here, the picture element arrays of FIGS. 3A and 3B will be used with respect to cyan, magenta, and yellow and those of FIGS. 5A and 5B with respect to black.

The difference of this example from Example 1 resides in the fact that the picture element arrays in each round of recording are already formed with 1×4 dot groups and the portions of gaps are reduced in advance to one quarter irrespectively of the recording sequence of the individual picture element arrays.

Figure 3A:
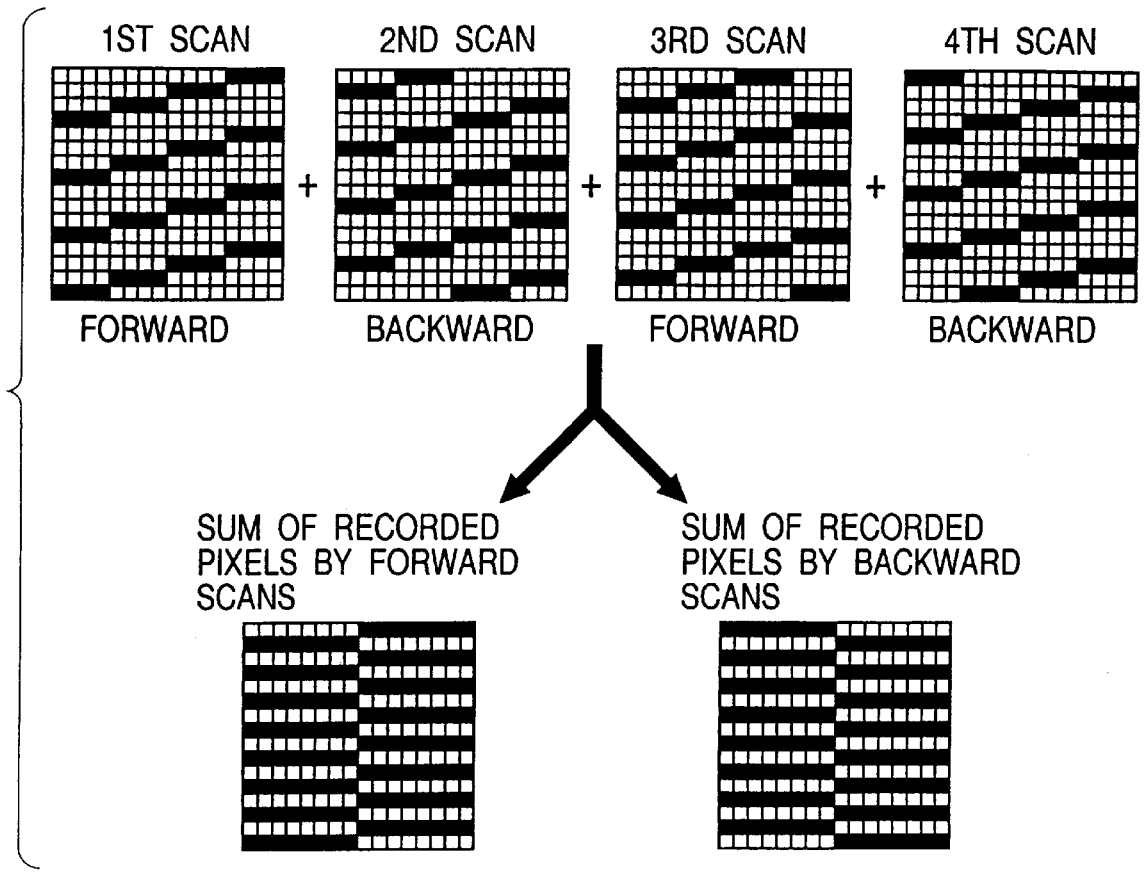
FIGS. 3A and 3B are diagrams for aiding in the description of Y, M, C recording picture element arrays forming each of the passes used in the four pass printing in a Second Embodiment of this invention.
Figure 3B:
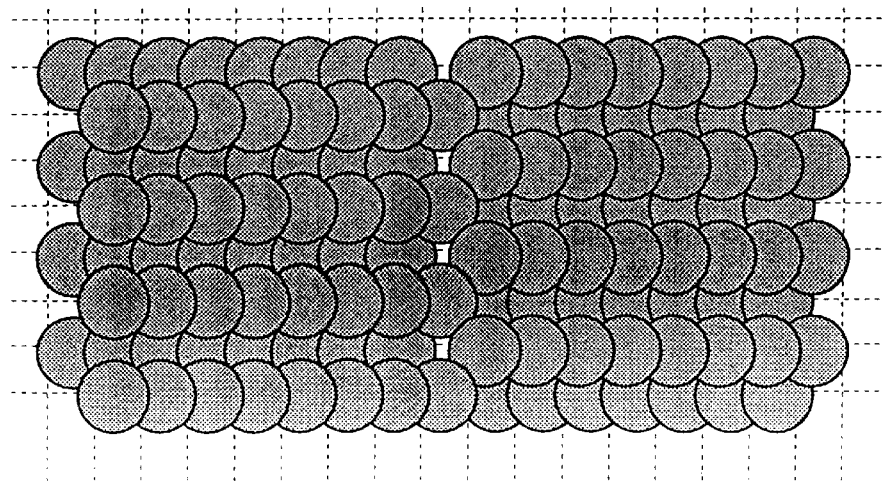
Figure 4A:
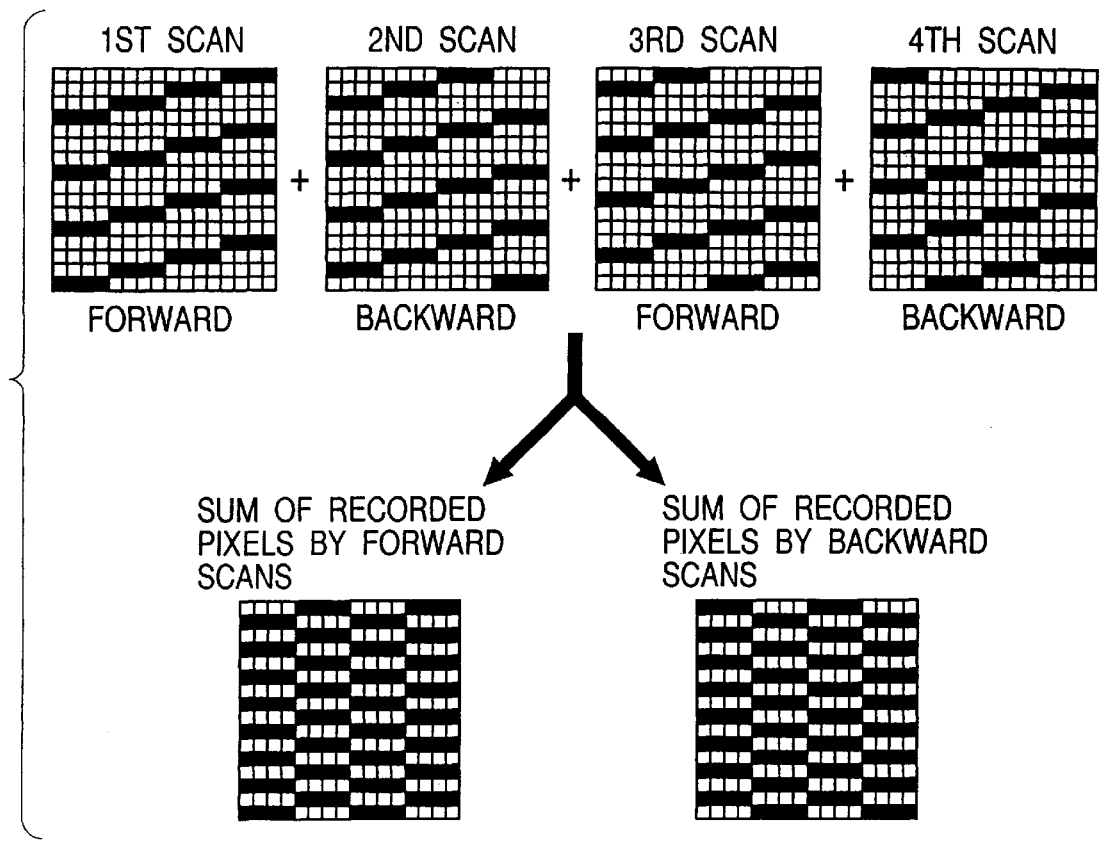
FIGS. 4A and 4B are diagrams for aiding in the description of recording picture element arrays forming each of the passes in the four pass printing which constitutes itself a precondition of this invention.
Figure 4B:
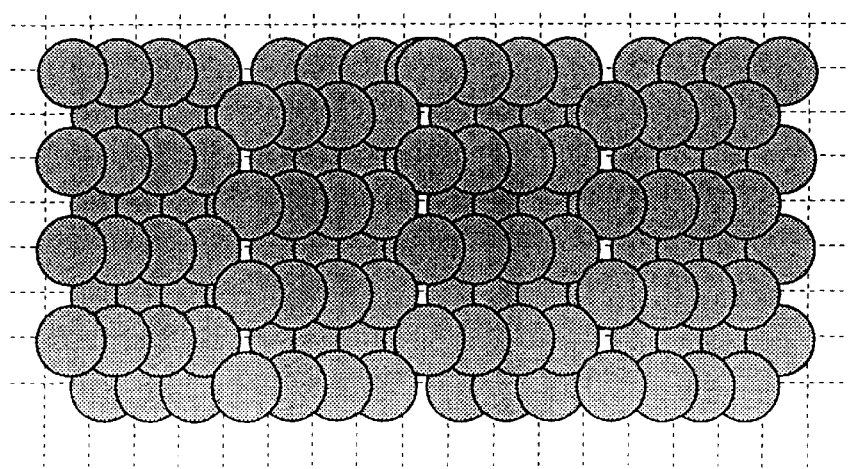

Likewise in the present embodiment, the effect of this invention manifests itself between FIGS. 3A and 3B on the one part and FIGS. 4A and 4B. In the case of FIGS. 4A and 4B, the portion in which adjacent dots are recorded by the reverse scanning occurs at a ratio of 1 to 4 picture elements, in the direction of main scan. In contrast, in the case of FIGS. 3A and 3B, one aggregate of sums of picture element arrays in the forward scan or sums of picture element arrays in the backward scan forms a chain of 8 picture elements. As a result, the portions allowing the appearance of a gap are reduced proportionately to a ratio of 1 to 8 picture elements.

Figure 5A:
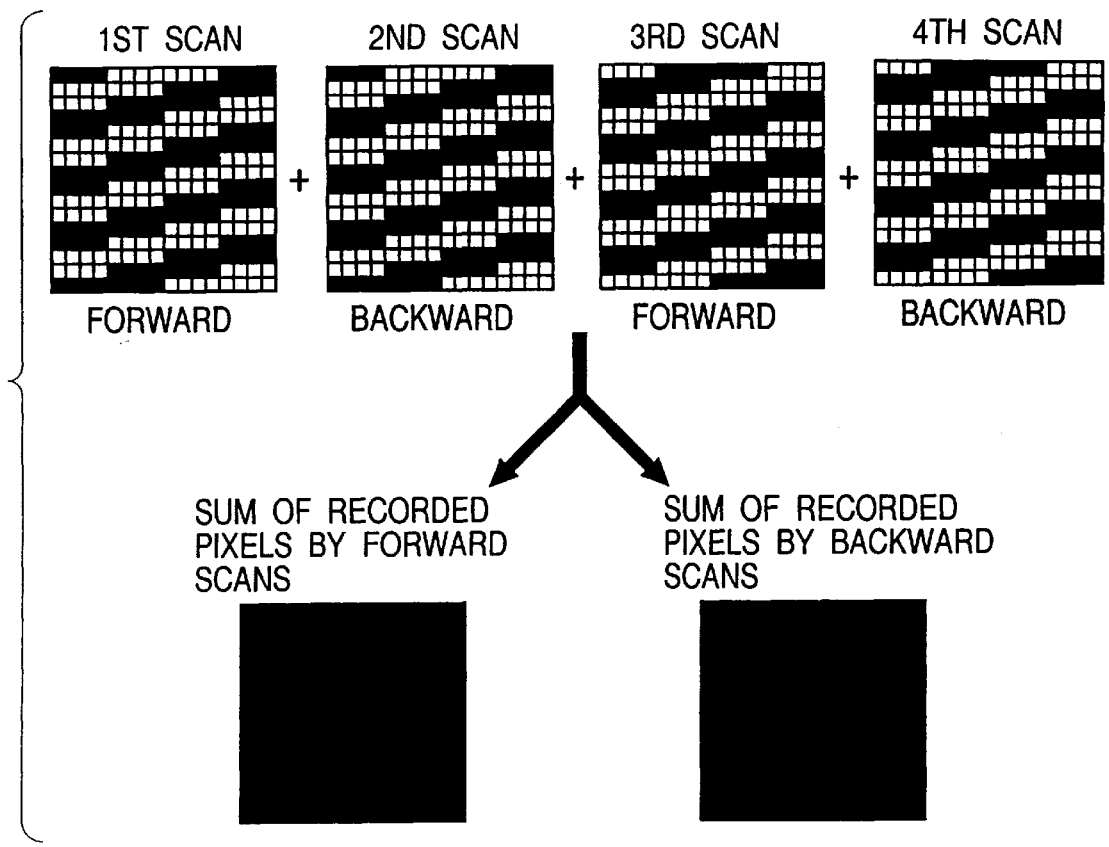
FIGS. 5A and 5B are diagrams for aiding in the description of K recording picture element arrays forming each of the passes used in the four pass printing in Example 2 of this invention.
Figure 6A:
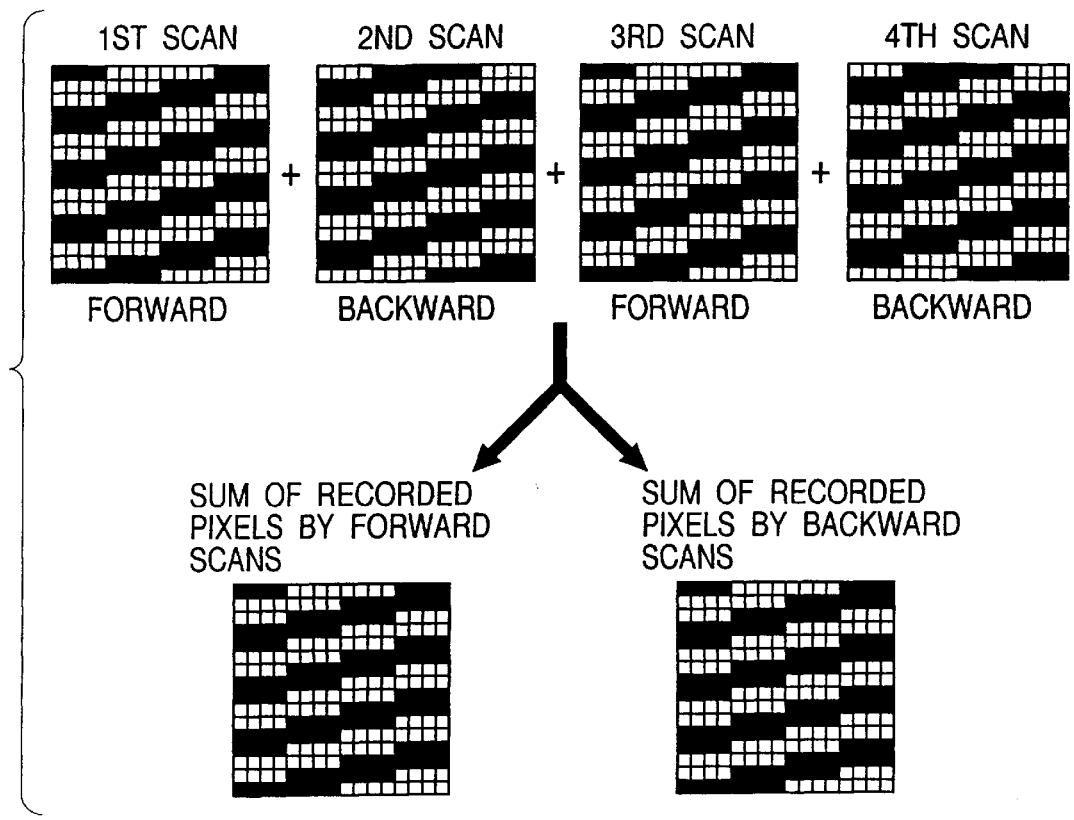
FIGS. 6A and 6B are diagrams for aiding in the description of recording picture element arrays used in the four pass printing which constitutes itself a precondition of this invention.
Figure 6B:
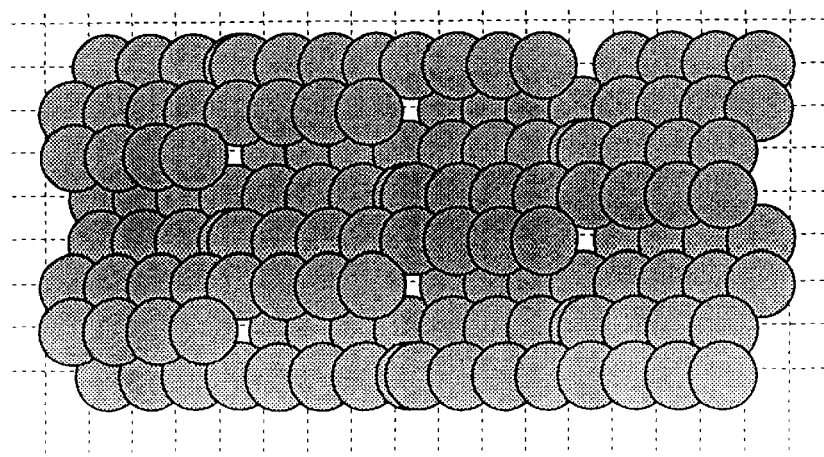
Figure 7A:
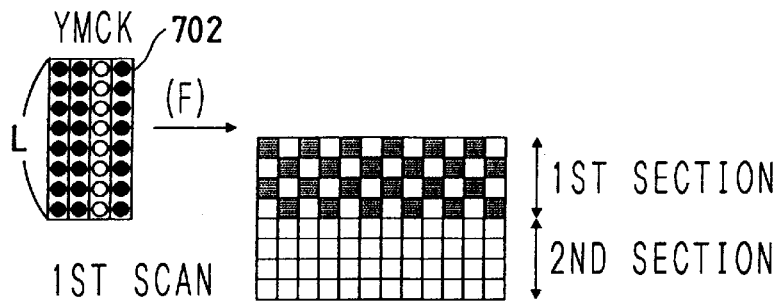
FIGS. 7A to 7D are diagrams for aiding in the description of C, M, Y unidirectional printing and K bidirectional printing.
Figure 7B:
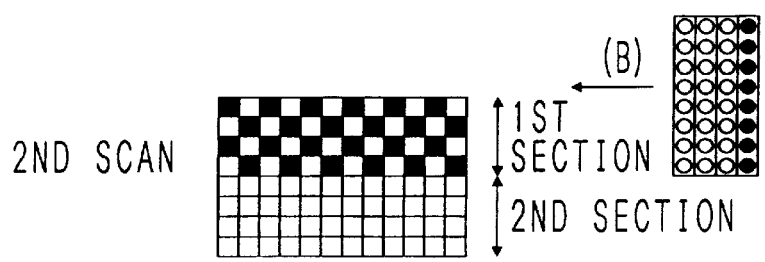
Figure 7C:
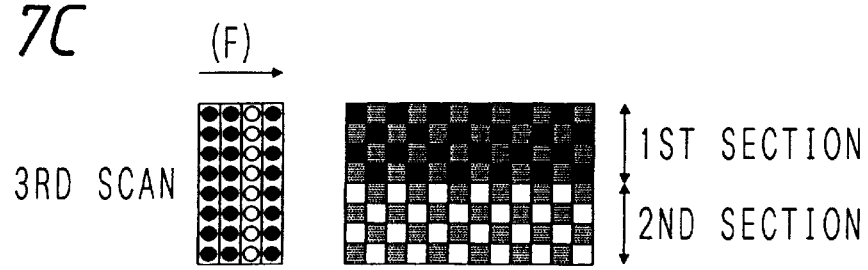
Figure 7D:
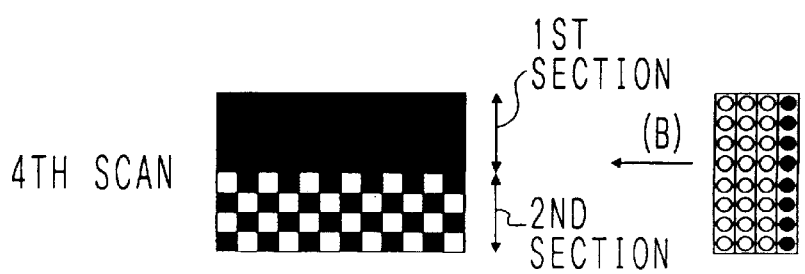

Further, since the present embodiment produces a print with emphasis exclusively on the black ink, it applies a picture element array different from that of another color as shown in FIG. 5A to black. In this case, four rounds of scanning print an equivalent to a total of 200% duty, the individual rounds of scanning are responsible for a print of 50% each. If, in this case, the first two rounds of scanning complete a print of 100% as shown in FIG. 6A, the sum of picture element arrays in the forward printing and the sum of picture element arrays in the backward printing will inevitably equal the picture element arrays in a single round of scanning. If the first two rounds of reciprocating scan produce a print overlapping equal picture elements and the two subsequent rounds of reciprocating scan produce an overlapping print with picture element arrays which are complementary to the first print as illustrated in FIG. 5A, the print in the forward pass and the print in the backward pass will severally complete a 100% image independently of each other and, therefore, absolutely no gap will occur where the dots of the forward and the backward pass mutually deviate.

The print of such a duty ratio as exceeds 200% produces the same effect as the present example with respect to the deviation of dots in both the opposite directions even when the picture element arrays in each round of recording and scanning have their component picture elements separated asunder as in the case of the first example, providing the sum of picture elements recorded in the forward pass and the sum of picture elements recorded in the backward pass are each so formed as to complete a 100% print.

FIGS. 7A to 7D represent the case of producing a unidirectional print with respect to color (C, M, Y) and a bidirectional print with respect to black.

In the present example, the multi-head 702 is provided with only eight nozzles and is adapted to produce a reciprocating print in concert with the paper feed which is carried out at a speed of L/2, wherein L stands for the length of the head. This operation of the multi-head 702 is portrayed as continued from the first through the fourth round of recording and scanning.

In the first round of recording and scanning, the multi-heads equivalent to four colors are reciprocated by the carriage 706 and, in the meantime, the four out of the total of eight nozzles in the lower half of the multi-head are used to eject inks of relevant colors, K, M, and Y in this particular case, onto the picture elements shown in gray in the first recording area on the recording paper. Then, in the second round of recording and scanning, the multi-head is reciprocated by the carriage 706 and, in the meantime, the nozzles in the lower half of the head are used to eject only the ink of K onto the picture elements recorded in the first round of recording and scanning. In the third round of recording and scanning which follows the paper feed made at the speed of L/2, the multi-head is reciprocated by the carriage 706 and, in the meantime, all the eight nozzles in the head are used to eject the inks of K, M, Y to the picture elements indicated in gray in the first and the second recording areas on the recording paper. Subsequently, in the fourth round of recording and scanning, the multi-head is again reciprocated by the carriage 706 and all the eight nozzles in the head are used to eject the ink of K to the picture elements recorded in the third recording area. The operation described above completes a record in the first recording area.

In the present embodiment, the record with black in the forward pass is made in the same picture elements as entirely the same head position as in the backward pass. Even for the emphasis of black effected basically in the unidirectional printing, the present invention operates effectively.

It should be remarked that the deviation of dots strictly is not a phenomenon which occurs exclusively during the bidirectional printing. When the printing duty is so high as is recognized today, the warp in the paper surface varies from one to another round of recording and scanning and uneven driving more or less arises among the rounds of recording and scanning. In short, these adverse factors manifest themselves in the form of deviation of dots also during the unidirectional printing.

It follows as a consequence that the use in the present example of 1×4 picture elements as a basic dot group may well be regarded as effective in countering such deviation of dots as is inevitably encountered even in the unidirectional printing.

In the print with color as well as in the print with black, the picture element array based on 1×4 picture elements used in the present example is effective in decreasing the number of gaps from the level attainable in the first example. Besides, it can be expected to bring about the following effect.

Basically, the split recording method does not fully manifest its effect until the recording picture elements within the unit area are recorded substantially equally among the divisions of scanning. The examples described thus far invariably represent cases of recording a 100% duty image. In any of the cases, therefore, an equal number of picture elements are recorded unexceptionally by four passes. Most image data which are actually transmitted in the form of signals are outcomes of a procedure which comprises binarizing multivalued data representing a certain intensity in accordance with a prescribed method of binarization and shaping the product of binarization in a predetermined pattern. This procedure is effective for the Dither method which finds extensive utility among other methods of the class.

Generally by such a method of binarization as the Dither method, picture element arrays corresponding to varying levels of duty are set in such a square matrix as 4×4. This matrix is intended to allow realization of an area intensity therein. Thus, the matrix, whenever equal duty values are injected, issue equal picture element layouts without fail. As a result, when equal duty values are injected into all the matrixes such as when uniform patterns are registered, all the 4×4 matrixes which are arrayed vertically and laterally on a recorded image record dots of equal picture element arrays and form uniform images.

When the 1×4 dot group contemplated by the present example is adopted as the basis for picture element arrays in this case, the direction of main scanning of the matrixes mentioned above is tuned to the 1×4 dot group and all the pairs of adjacent matrixes are no longer recorded simultaneously in each round of recording and scanning. As a result, the difference in number of dots between successive rounds of recording and scanning does not appear relative to the direction of main scanning. Thus, the recording can be invariably obtained with four kinds of nozzles.

The present embodiment realizes the object of rendering inconspicuous the gaps which occur during the bidirectional printing by using 1×4 basic picture element arrays in each round of recording and scanning and nevertheless causing the picture element arrays, i.e. the sum of picture elements in the forward pass and that in the backward pass, to be grouped into bound clusters each of eight picture elements in the direction of the advance of the head for scanning as described above.

In the present embodiment as in the first embodiment, the four kinds of picture element arrays with relevant colors of black, cyan, magenta, and yellow may be circulated as thinning arrays in each round of scanning.

Figure 5B:
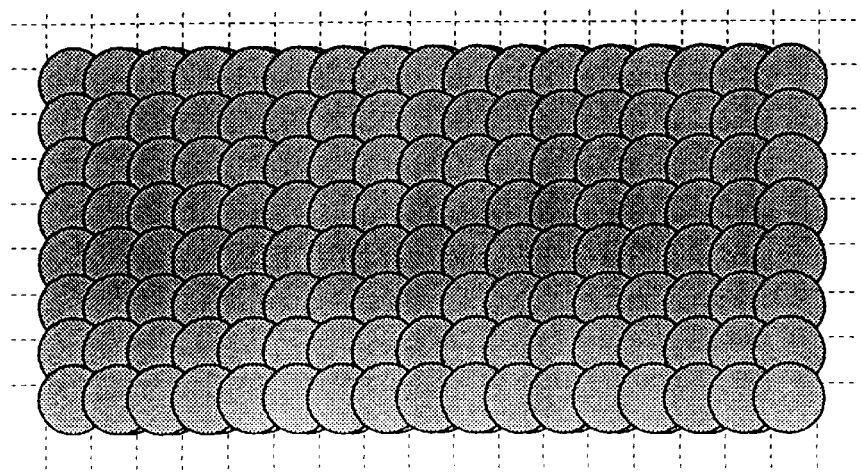
Figure 15:
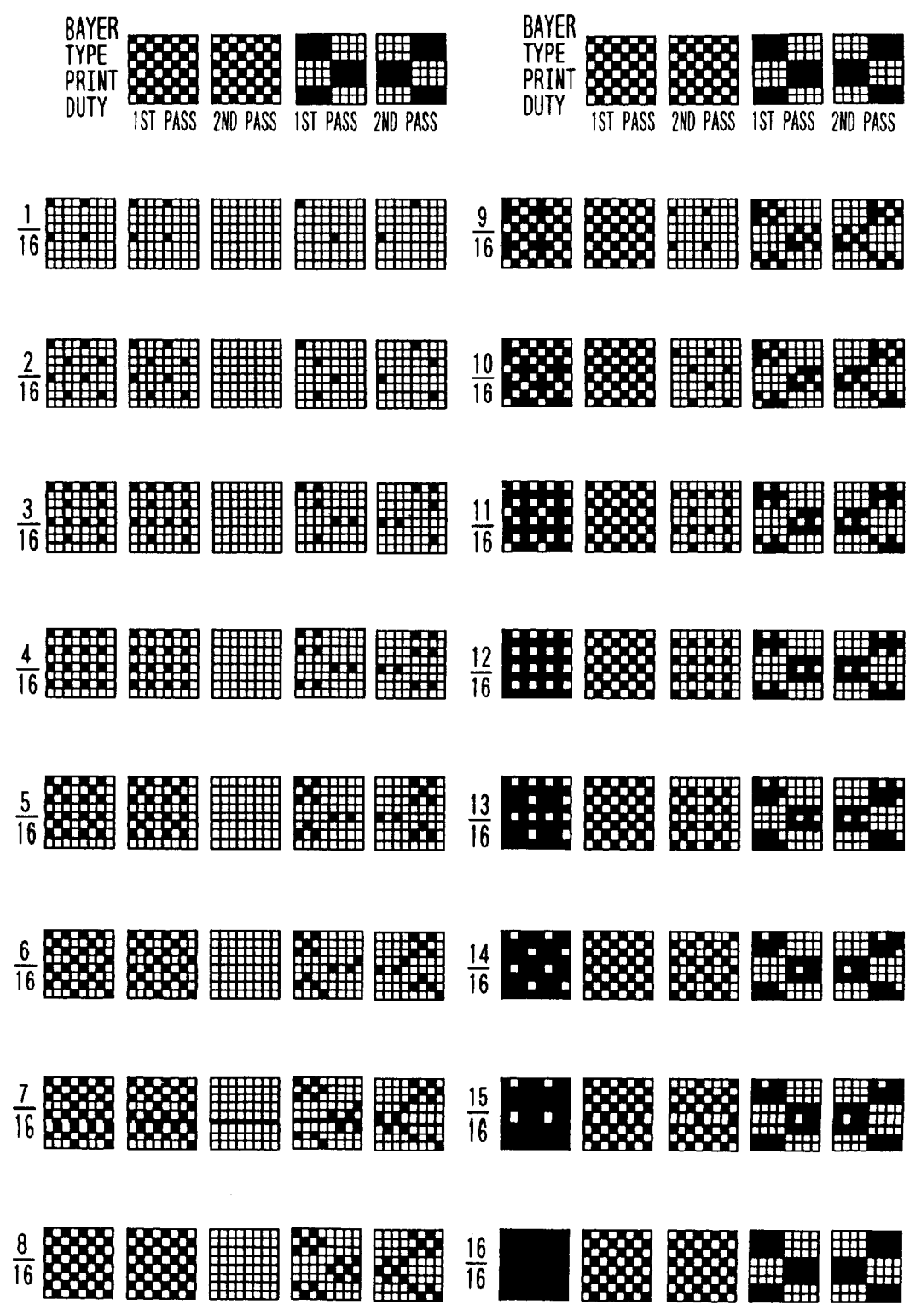

In the present embodiment, as a case of placing emphasis exclusively on black, the picture element arrays of black have been depicted as varied from those of color. The present example, however, is still effective even when prints of all the colors are recorded by the reciprocating printing as illustrated in FIGS. 5A and 5B and FIG. 15.

So far, the fact that the present invention is more effective than the first embodiment has been pointed out. The first example nevertheless proves more effective than the present example such as when the recording paper to be used happens to be an OHP paper which has a poor ability to absorb ink. The present example which is so constructed as to have different ink drops simultaneously recorded as mutually adjoined possibly entails the phenomenon that the adjacent ink dots attract one another and gather into larger ink drops and solidify on the recording medium. In cases of this sort, the first example which allows such ink drops to remain in a mutually independent state may well be rated as more effective than the present embodiment.

The two embodiments cited thus far have been both depicted as representing cases of performing the four division printing of an equal printing duty. The effect of this invention is not limited thereto. The printing in question may be effected in three divisions, eight divisions, and so on, for example. Even when the picture element arrays have no equally divided printing duty among the different rounds of recording and scanning, the effect of this invention can be manifested so long as the sums of picture element arrays in the forward and the backward pass are formed of mutually adjoining picture element arrays for use in each round of scanning.

Figure 8A:
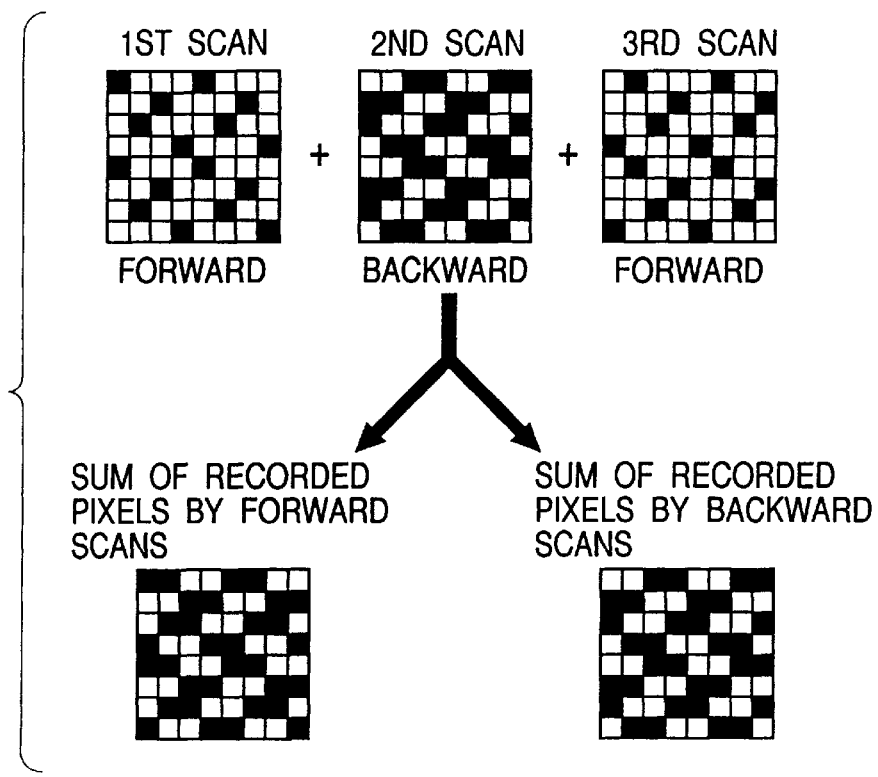
FIGS. 8A and 8B are diagrams for aiding in the description of an example of the three pass printing accomplished by synthesizing the second and the fourth recording scan of the four pass printing as shown in FIGS. 1A and 1B, as a second recording scan.
Figure 8B:
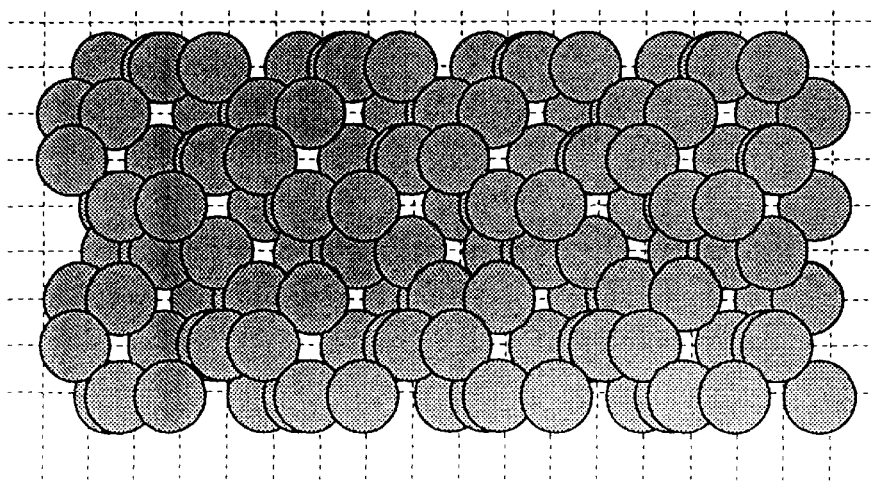

For example, FIGS. 8A and 8B represent cases of synthesizing the second and the fourth round of recording and scanning of FIGS. 1A and 1B into a second round of recording and scanning and completing prints as divided into three levels, 25%, 50%, and 25%. Even in this case, this particular example is as effective in countering the problem posed to this invention as the first example because the number of gaps between dots is not changed.

In the case of completing a record by preparing a multihead having a plurality of ink nozzles arranged therein, performing a plurality of rounds of bidirectional recording and scanning over a fixed image area by use of the multihead, and meanwhile successively feeding recording papers as described above, the object of rendering inconspicuous the drawback of positional deviation of dots in the opposite directions inevitably caused by such factors as rise and fall of the paper surface, various forms of uneven driving, and variation of the speed of ink ejection and the object of ensuring production of uniform and smooth images of high quality are accomplished because the picture element arrays to be used in different rounds of recording and scanning are in a complementary relation and because, of the aforementioned picture element arrays, the plurality of picture element arrays to be used at least in the unidirectional recording and scanning are mutually adjoined in the direction of recording and scanning.

(Third Embodiment)

Now, a third embodiment of this invention will be described below. This embodiment aims to prevent the positional deviation of dots caused in the bidirectional printing from deteriorating the quality of a recorded image by recording the image by use of a thinning mask which is obtained by arraying rectangular basic picture element groups each composed of m vertical picture elements (m>1) and n lateral picture elements (n>m) in a pattern of $P_J$ (m<P<n) in the vertical direction so as to be partially overlapped.

Before the present embodiment is further discussed, the thinning pattern for picture element arrays which constitutes itself the precondition of the present example will be described below.

Figure 9:
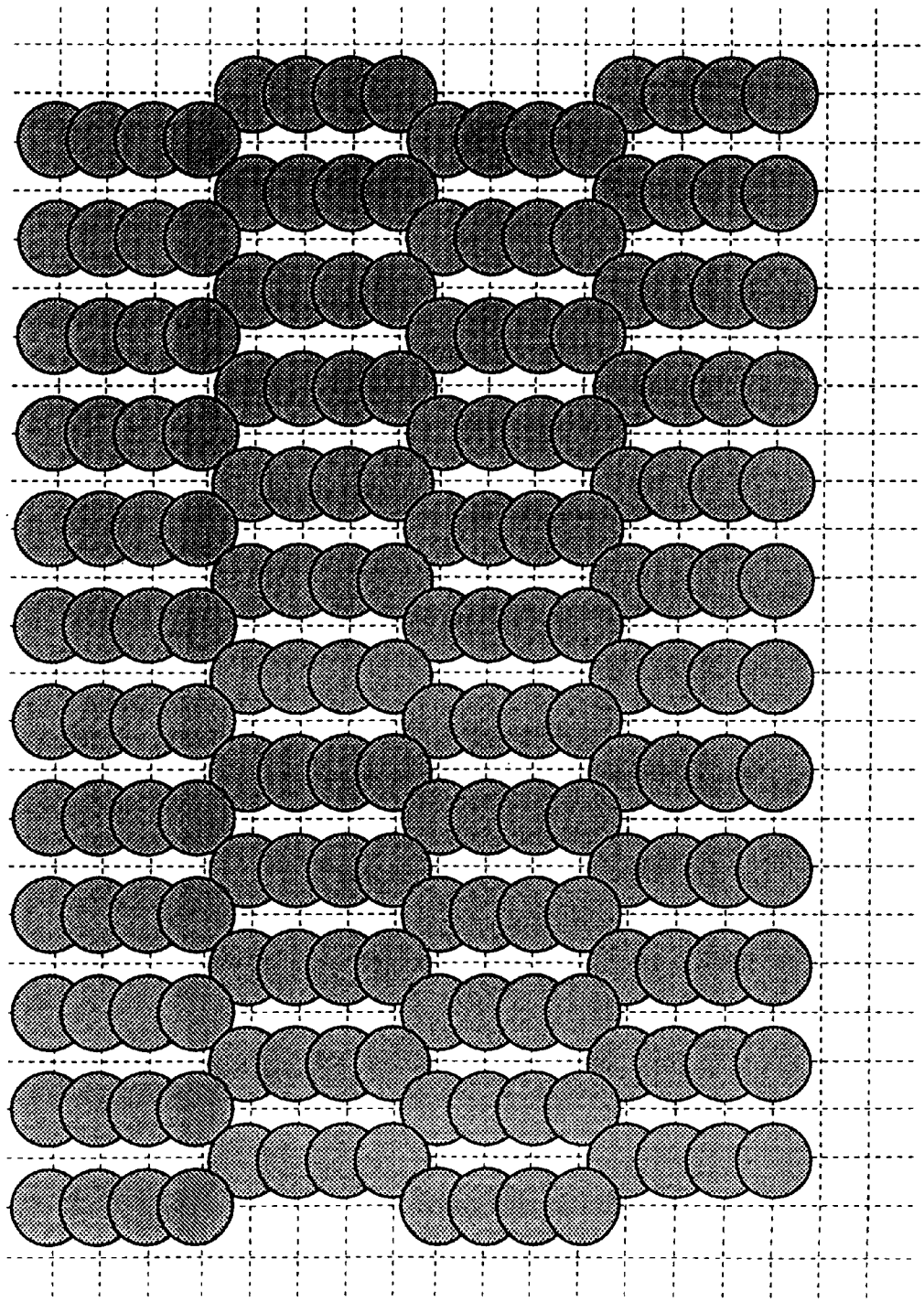
FIG. 9 is a diagram illustrating the condition of the dots which have landed on a paper surface in the printing by use of a thinning mask containing basic picture element groups each of 1×4 picture elements.

FIG. 9 represents the appearance of dots which have landed on a paper surface when rectangular 1×4 basic picture element groups are arrayed in a staggered manner such that they may not be mutually adjoined in one round of scanning.

Figure 59:
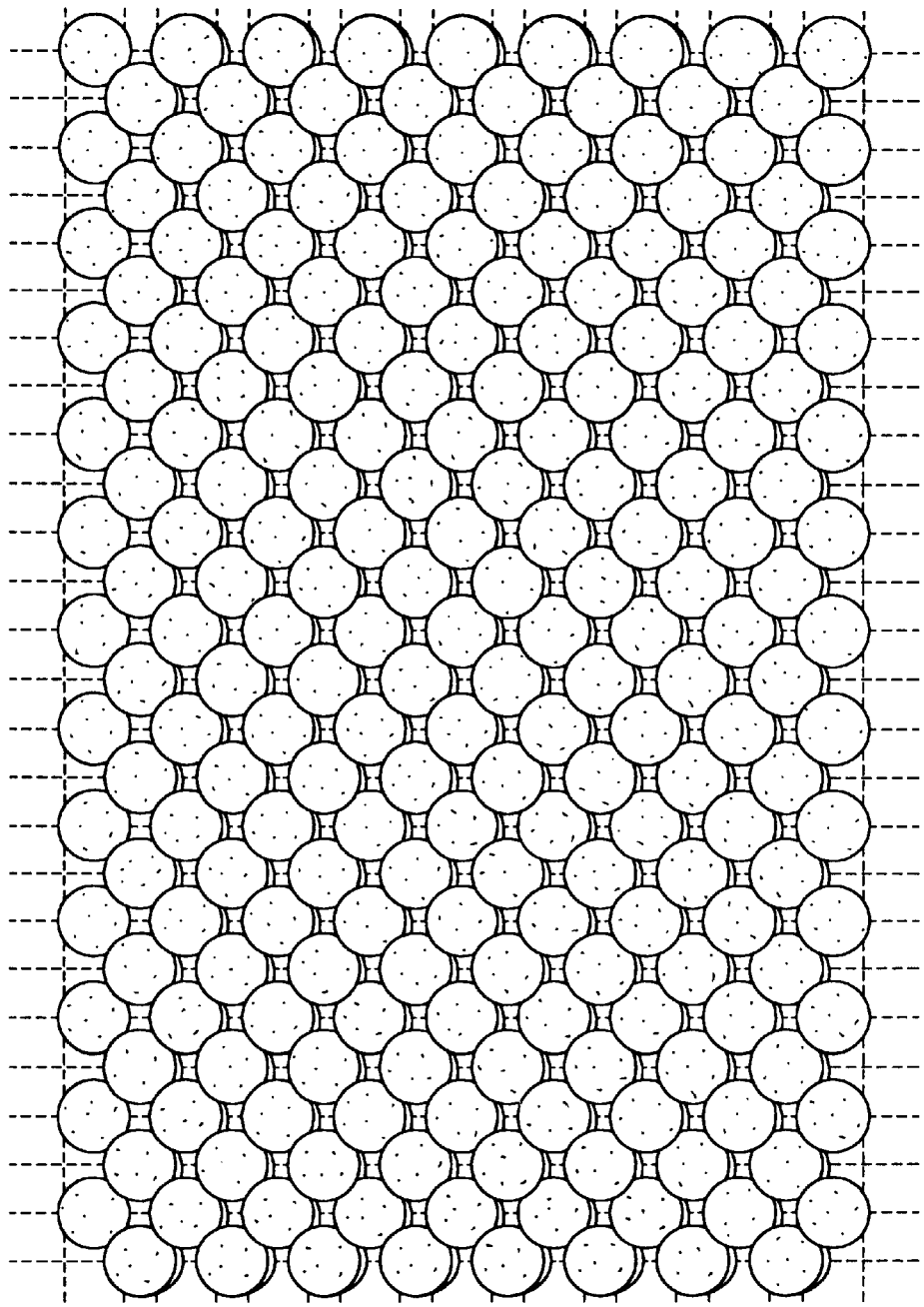
FIG. 59 is a diagram illustrating positional deviation of dots which have landed on a paper surface in a conventional split recording.

The number of gaps coincide with the number of portions in which the dots deposited in the forward and the backward pass are mutually adjoined. In FIG. 59, gaps are inevitably formed next to all the dots because the print in the forward pass and the print in the backward pass are alternately arrayed as spaced at an interval of one dot. When the groups each formed of a chain of four dots are simultaneously printed in the lateral direction as shown in FIG. 9 which depicts the present example, no gap occurs among the four dots and the number of gaps can be reduced to a rate of one to four. Precisely, the number of gaps due to the deviation of dots in the bidirectional printing is inevitably associated with the length of the basic dot group in the lateral direction thereof.

FIGS. 10A and 10B represent the results of the reciprocating printing performed by use of thinning arrays of the present invention resorting to two versions of the method of binarization (Dither method) for the purpose of showing how the deviation of dots affects the produced images. As a criterion for rating the quality of image, the sparseness of gaps in a 100% duty print has been chiefly cited. Actually, it is in a halftone having a duty level of about 50% that the deviation of dots in the opposite directions is most prominent. In the halftone, the density and the granular sensation of the image or the deterioration of the image caused by the deviation of dots in the bidirectional printing manifest themselves more or less differently, depending on the kind of Dither method. In the diagram, the dots in the bidirectional printing show a deviation of a size of one half of a picture element in one case and a deviation of a size of one full picture element in the other case, depending on the two versions, Dither A (FIG. 10A) and Dither B (FIG. 10B). It is noted from this diagram that the print associated with Dither A shows prominent vertical lines and that with Dither B shows relatively uniform dot density notwithstanding the dots deviate at an equal amount. When the 1×4 thinning arrays contemplated by the present example are used, therefore, the type of printing associated with Dither B produces an image which can be kept in a relatively desirable state. In FIGS. 11A and 11B, the two versions of Dither method shown respectively in FIGS. 10A and 10B are represented in terms of the threshold within 8×8 picture elements. In the present embodiment, it has been ascertained that the printing using Dither B produces an image stable at any duty level and uniform as compared with the printing using Dither A, though not supported particularly by illustration.

The desire to obtain a uniform and smooth image free from the adverse effect of the deviation of dots in the bidirectional printing is satisfied by having 1×4 basic picture element groups so arrayed as to avoid mutually adjoining as described above.

The print of the example just described, however, has only sole picture elements in the vertical direction despite the presence of chains each of four picture elements arrayed in the lateral direction. As regards such defects as uneven coloration and uneven density due to suspension which have been explained with reference to the conventional technique, the effect of the present example does not easily manifest because of heavy bleeding of ink in the non-print area when the dots have a large diameter. The construction under discussion fits such recording media as an OHP paper which absorbs ink rather slowly, entails uneven coloration to a lesser extent, and produces dots of a small diameter. There are times when the construction does not fit the recording media of this kind.

As a solution, an idea of using a thinning mask which is produced by preparing rectangular picture element groups enlarged in the vertical direction and arraying these groups in such a manner as to avoid mutually adjoining may be conceived. The use of a thinning mask of this nature results in decreasing the amount of ink suffered to bleed in the non-print area in one round of scanning and alleviating such defects as uneven density due to time lag between successive rounds of scanning or due to suspension uneven coloration ascribable to the recording sequence of color inks.

Now, a concrete embodiment of the use of this thinning mask will be discussed below with reference to drawings. The diagram of FIG. 12, in comparison with that of FIG. 13, exhibits the feature and the effect of this method to a better advantage by displaying the appearance of ink dots which have landed in a fixed area after the first round of scanning. In the case of the conventional technique, the dots recorded in a similar round of scanning land on picture elements which are not mutually adjoined (FIG. 13). In contrast, in the present example, all the picture elements are aggregated into 3×4 groups, dots are recorded within these picture element groups in one pass, and the individual groups are so arrayed that the dots recorded in one pass may land on the positions which are not mutually adjoined. In this arrangement, the area covered by the ink of the first recording color decreases in proportion as the area covered by the dots overlapping in the individual groups increases and, as a result, the area of blank surface on which dots of the second and subsequent recording colors are allowed to land increases. Even when the sequence of ink ejection is varied by the reciprocating scanning, therefore, the ratio of the area to be occupied by the prior color of the first scanning is decreased and the area to be occupied by the prior color of the second scanning is proportionately increased. Thus, the partiality between the two prior colors ceases to exist and the difference in color taste in the area in which the passes of scanning are repeated by the width of paper feed is decreased.

Figure 14:
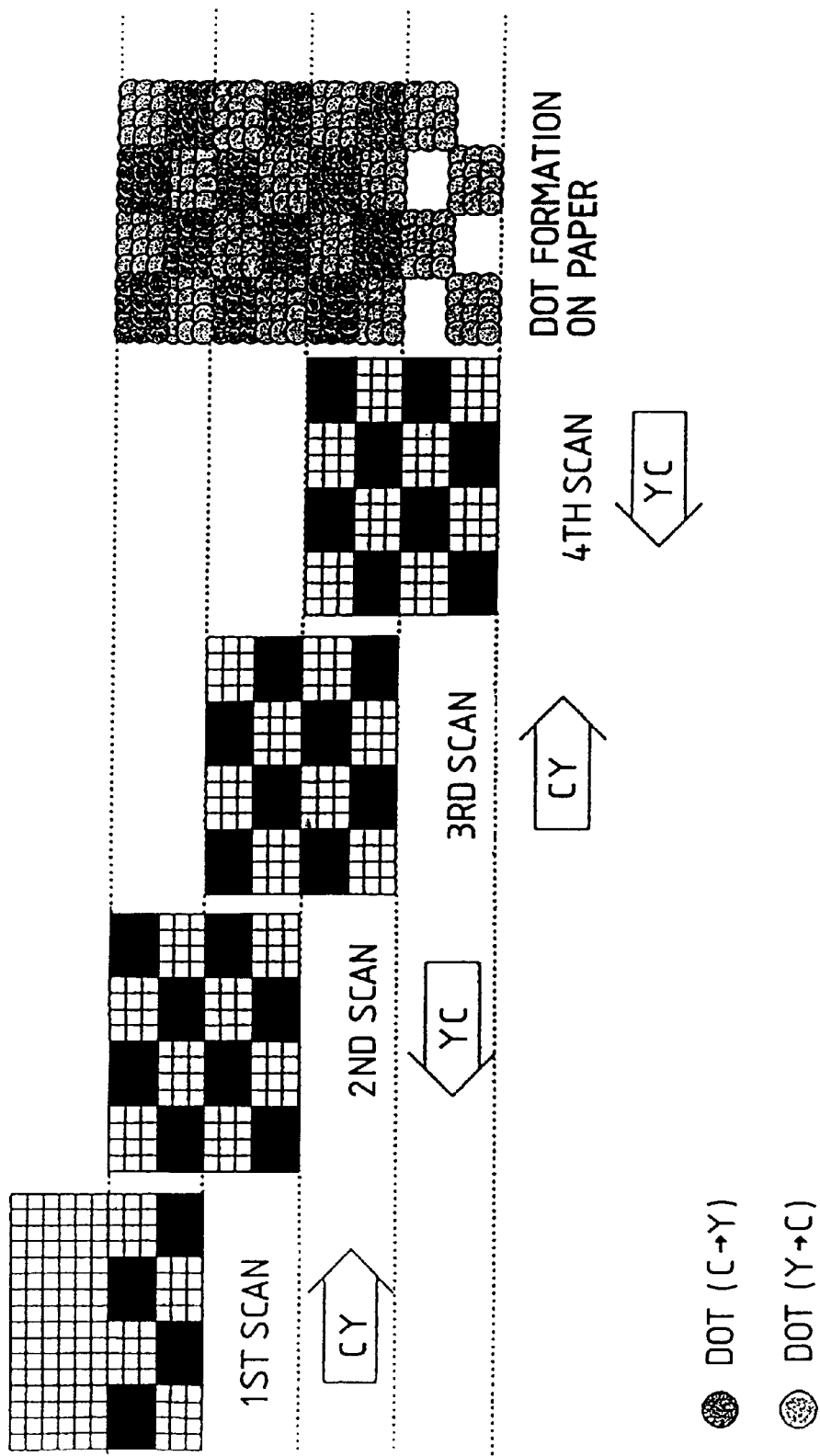
FIG. 14 is a diagram for aiding in the description of a two pass printing by use of a thinning mask containing basic picture element groups each of 3×4 picture elements.

Now, for the sake of illustration of the print by the present method, the method for recording with dot groups each of 3×4 picture elements shown in FIG. 12 will be described below. FIG. 14 is a diagram illustrating the manner of recording effected by the present method as compared with the conventional technique illustrated in FIG. 56. A head formed of 16 nozzles is used for bidirectional printing while the recording paper is fed by a unit width of 8 nozzles. The data being recorded in this case are intended to produce a 100% green image using inks of cyan and yellow. Incidentally, this diagram represents a case of recording dots 110 $\mu$m in diameter against a picture element density of 360 dpi.

Figure 56:
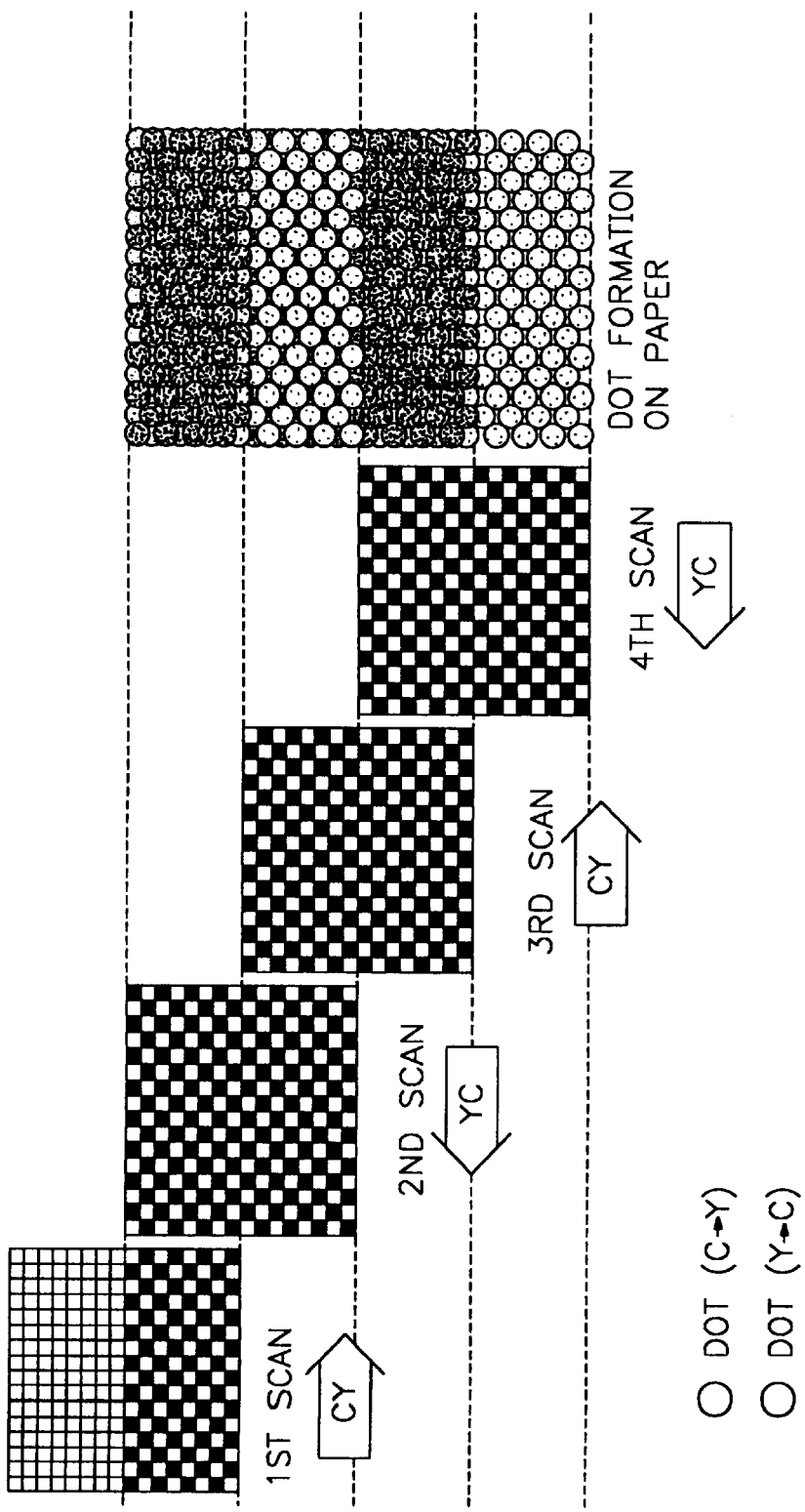
FIG. 56 is a diagram for aiding in the description of uneven coloration encountered in a conventional split recording.
Figure 58:
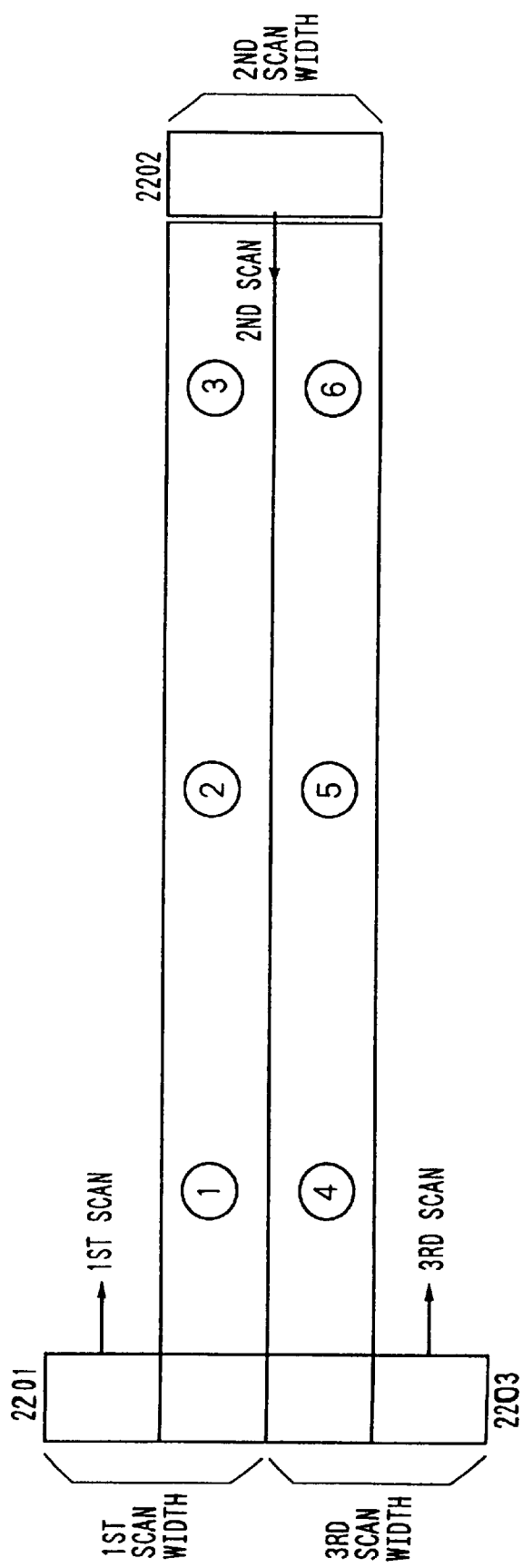
FIG. 58 is a diagram for aiding in the description of a cause for the uneven density due to the time lag.

In the print of FIG. 56, since the recording mask assumes a shepherd's check pattern in each round of scanning, the dots having a size larger than one picture element heavily bleed in the adjacent picture elements and inevitably entail the occurrence of uneven density revealing prior colors differing from one feed width to another. In contrast, in the print of the present method illustrated in FIG. 14, on account of the use of a 3×4 shepherd's check mask, the bleeding of ink in the extraneous area is curbed and the difference of prior colors in various areas is repressed to a fair extent as compared with the print of FIG. 56 because the inks mutually bleed in each dot group.

When the present method is adopted, the size of the make or the proper numerical value of m×n are varied by a given picture element density, the amount of ink to be ejected, the condition of the recording medium, and so on. The effect of this method is not obtained when the numerical values of m and n are unduly small under the foregoing conditions. In contrast, if the dot groups are so large as to be discerned by human eyes, then the difference of color taste between the adjacent groups becomes perceptible. Thus, the produced image inevitably glares and betrays coarseness of texture.

This method is also effective for uneven image caused by time difference or by resting which are confirmed even through monochrome. Further, as already mentioned in a conventional example, the uneven image caused by a time difference image is found in such a case that a second pass is recorded in an area where dots on a first pass bulge out and ooze out. Accordingly, as in this method, if dots on the first pass are adjacent to one another so that the build-out rate is small, the second pass recording can be made in a condition which is substantially identical with that of the first pass recording, thereby it is possible to eliminate any factor caused by overlapping of both of the two passes and affected by the time difference. FIG. 15 shows the overlapping part between a first scan and a second scan with emphasis so as to exhibit the above-mentioned effect, by way of comparison with FIG. 16. It is clear that a total area of overlapping with the recording area in this embodiment becomes smaller than that of the conventional example.

By the way, unless recording pixels in a unit area are recorded substantially equally through two scans, the split recording process cannot basically exhibits its effects. In the examples explained hereinbefore, it has been explained that an equal number of pixels are always recorded in each of two passes as shown in either FIG. 14 or FIG. 56 since these examples all fall in such a case that a 100% duty image is recorded. However, almost all image data actually transmitted are set in a predetermined pattern by binary-coding multivalued data indicating a gradation by use of a predetermined binary coding process. This method is effective for a dither process which is frequently used among others. FIG. 15 shows one example thereof. This method particularly uses a Bayer type process as a binary coding process among various dither processes. The example shown in FIG. 15 exhibits how image data are distributed between two passes while comparing a conventional split recording process and the split recording carried out in this method, in such a case that a duty image having $1/16$ ($1/64$) pitches is given in a 8×8 constant area. Recording pixels which can be allowed during the first and second scans by the split recording process in this example and by the conventional split recording process are indicated respectively by black color. Which pixels are respectively recorded by each scan in each of the processes when binary coded image data indicated on the right side are inputted, is shown on the right side. Accordingly, in the case of split printing, it is found that the printing has been already made up to $8/16$ or 50% duty only by one scan. Further, the inclination of the number of printing pixels is large on each path even though the duty exceeds 50%, and they are at last equal to each other when the duty comes to 100%. For example, with a low duty not more than 50%, data over one pixel width in a main scanning direction is all recorded by only one and the same nozzle, and accordingly the inherent purpose of the split recording process as mentioned above, that is, elimination of uneven image density caused by uneven nozzles cannot be attained. Further, ununiformness in recording pixels of the first and second passes are sustained even in a high duty area where the duty exceeds 50% ($8/16$), it is expected that the image quality is inferior in view of the above-mentioned uneven image, in comparison with this example in which the recording pixel is always uniformalized even with any duty. This problem occurs not only during bidirectional printing but also during unidirectional printing. Further, with the same factor such as a phenomenon in question caused by a non-uniform recording pixel during each scan, an uneven color image caused by the order of ink shots as already mentioned in the conventional example, also occurs, other than the above-mentioned uneven image, in such a case that recording with the use of two color inks having different duties. Even this problem is a phenomenon which also occurs during unidirectional printing, similar to the uniform image density caused by uneven nozzles, and accordingly, this problem can be solved by equally distributing the number of pixels to be recorded on the respective passes. With the use of the interlacing mask composed of a 3×4 dot group, according to this embodiment, the number of dots are always uniformly divided between both scans. Accordingly, no uneven color image as mentioned above occurs. Since the dots arranged in one and the same scanning direction are always recorded by two scans, that is, by two different kind of nozzles, this method is effective for uneven image caused by uneven nozzles.

As mentioned above, the 3×4 group is used as an interlacing mask, it is possible to obtain a high quality smooth image without an uneven color image, an uneven image caused by time difference, uneven image caused by resting and an uneven image caused by nozzles. The shape of the mask may be square, such as that of the 3×4 mask as mentioned hereinbefore. Further, a crosswise long mask can be used in order to prevent image deterioration caused by deviation of dots during bidirectional printing.

As stated heretofore, in the split recording process which have been heretofore proposed, and in the color ink jet recording apparatus disclosed in the above-mentioned laid-open patent, both bidirectional printing and unidirectional printing can be made even either with multicolors or with monocolor with no hindrance of uneven color image, uneven image by time difference, uneven image by resting and uneven image by nozzles.

In comparison with an example in which 1×4 pixel group is used as a basic pixel group, this example, the basic group has a size which is about three times as large, it is expected that the effects for uneven color image is relatively high. However, if a relative large basic pixel group is applied in order to attach great importance to an uneven color image, the boundary of each basic group becomes noticeable, and accordingly, there is a risk of a rough image. Further, even in this embodiment, since four pixels are recorded during one and the same scan, the number of gaps caused by deviation of the dots during bidirectional printing, is similar to the case in which the 1×4 pixel group is used as a basic pixel group (refer to FIG. 16), and accordingly, the number of gaps are decreased to ¼ in comparison with the conventional example (refer to FIG. 59). However, in this example, since the gaps are continued in the longitudinal direction, corresponding to three pixels, it is considered that they would become noticeable as textures if the size of the gaps becomes larger.

In view of the above-mentioned various factors, such as the number of crosswise pixels, the number of longitudinal pixels, and the number of all pixels in the mask and the shape of the mask, the interlacing mask for attaining the present invention can be realized with a pattern which is appropriate for each of the respective cases.

Figure 17:
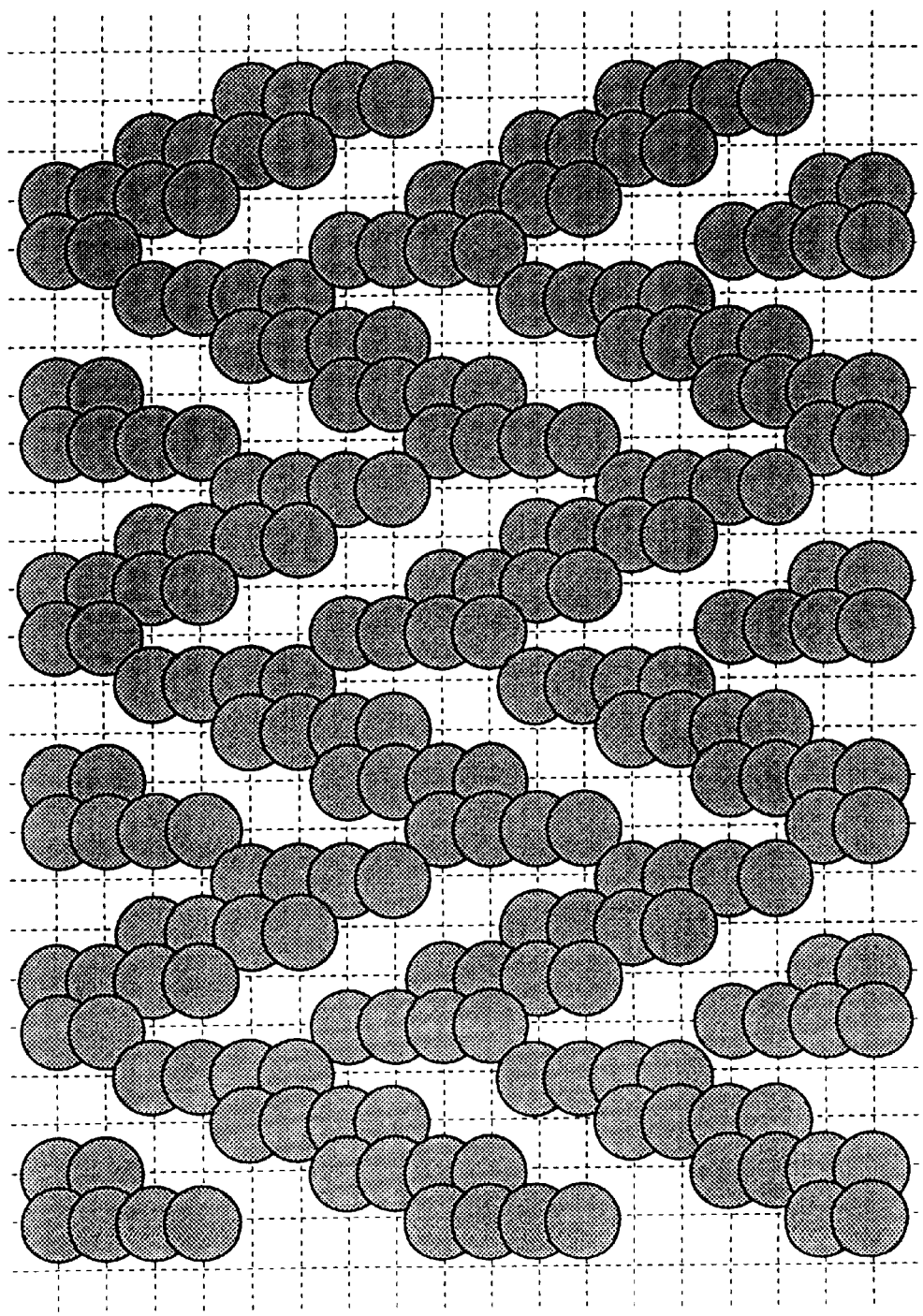
FIG. 17 is a diagram for aiding in the description of the condition of dots which have landed on a paper surface in the printing by use of a thinning mask in a Third Embodiment of this invention.

Explanation will be made of a third embodiment, FIG. 17 shows a dot shot condition of an interlacing mask which can be simultaneously applied to four color printing in this embodiment, in comparison with FIGS. 12 and 13. Similar to FIGS. 18, 14 and 56, there is shown such a condition that a green 100% image is formed when the above-mentioned mask is used.

Figure 18:
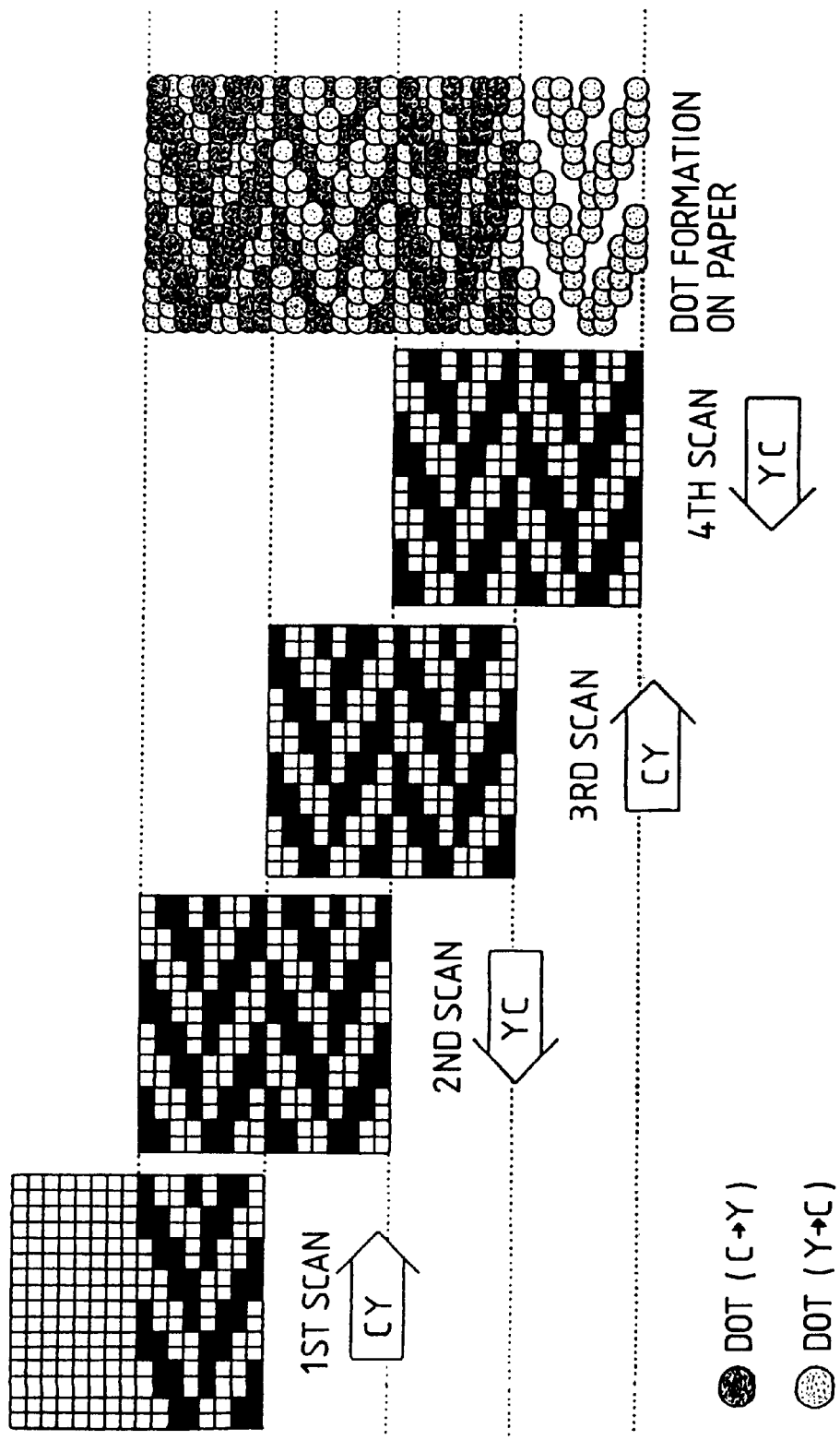
FIG. 18 is a diagram for aiding in the description of two pass printing by use of the thinning mask in the Third Embodiment.

FIGS. 13 and 56 show a conventional method in which dots recorded during one and the same scan are shot onto alternate pixels which are not adjacent to one another. FIGS. 12 and 14 show a second embodiment in which all pixels are bundled into a 3×4 pixel group within which recording is made by one and the same pass, the groups are recorded at positions which are not adjacent one another on one and the same pass. On the contrary, in this embodiment as shown in FIGS. 17 and 18, a mask having a 1×4 pixel group used as a basic group and shifted laterally by two pixels but longitudinally arranged adjacent to one another is used for recording.

Figure 12:
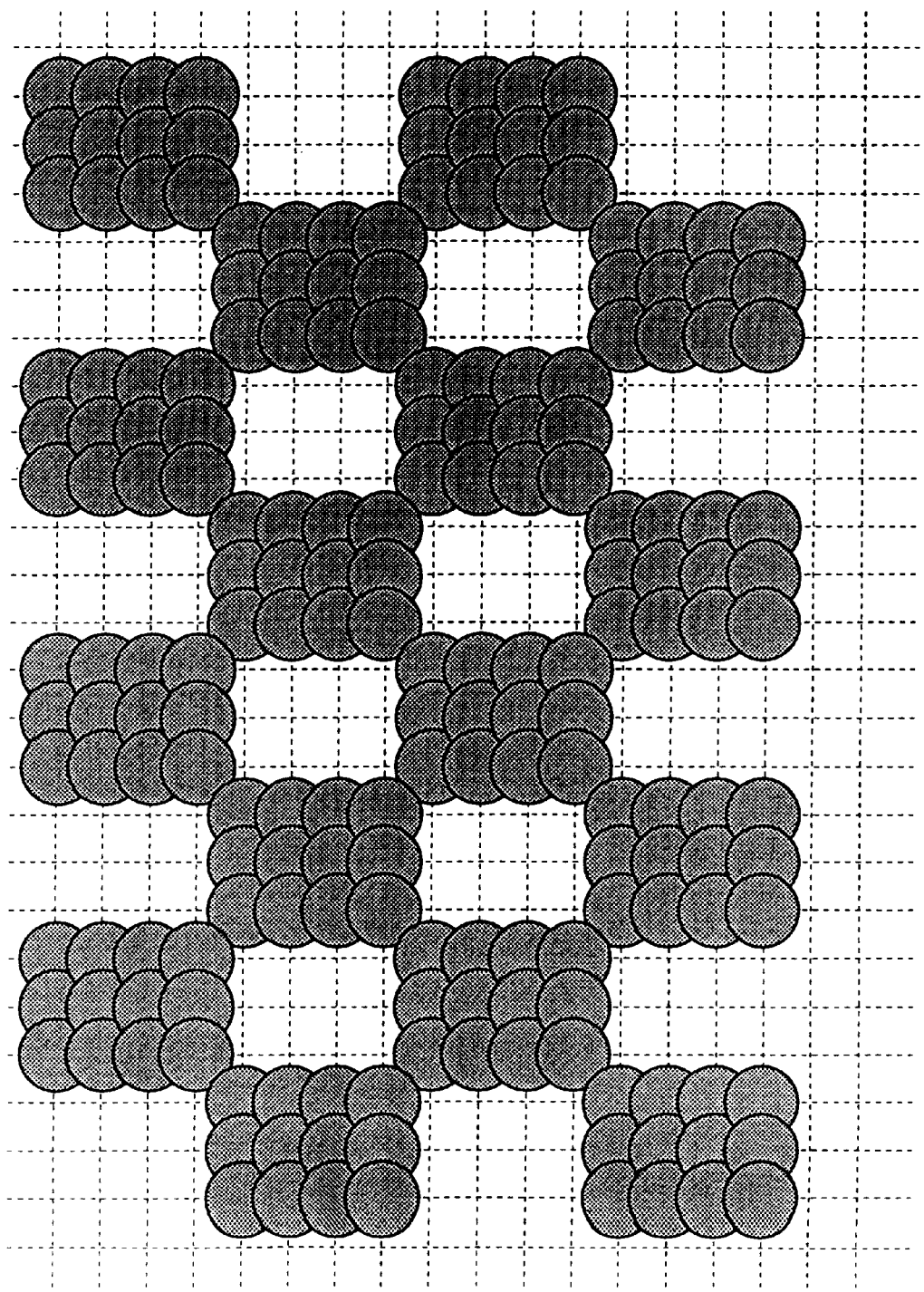
FIG. 12 is a diagram illustrating the condition of dots which have landed on a paper surface in the printing by use of a thinning mask containing basic picture element groups each of 3×4 picture elements.
Figure 13:
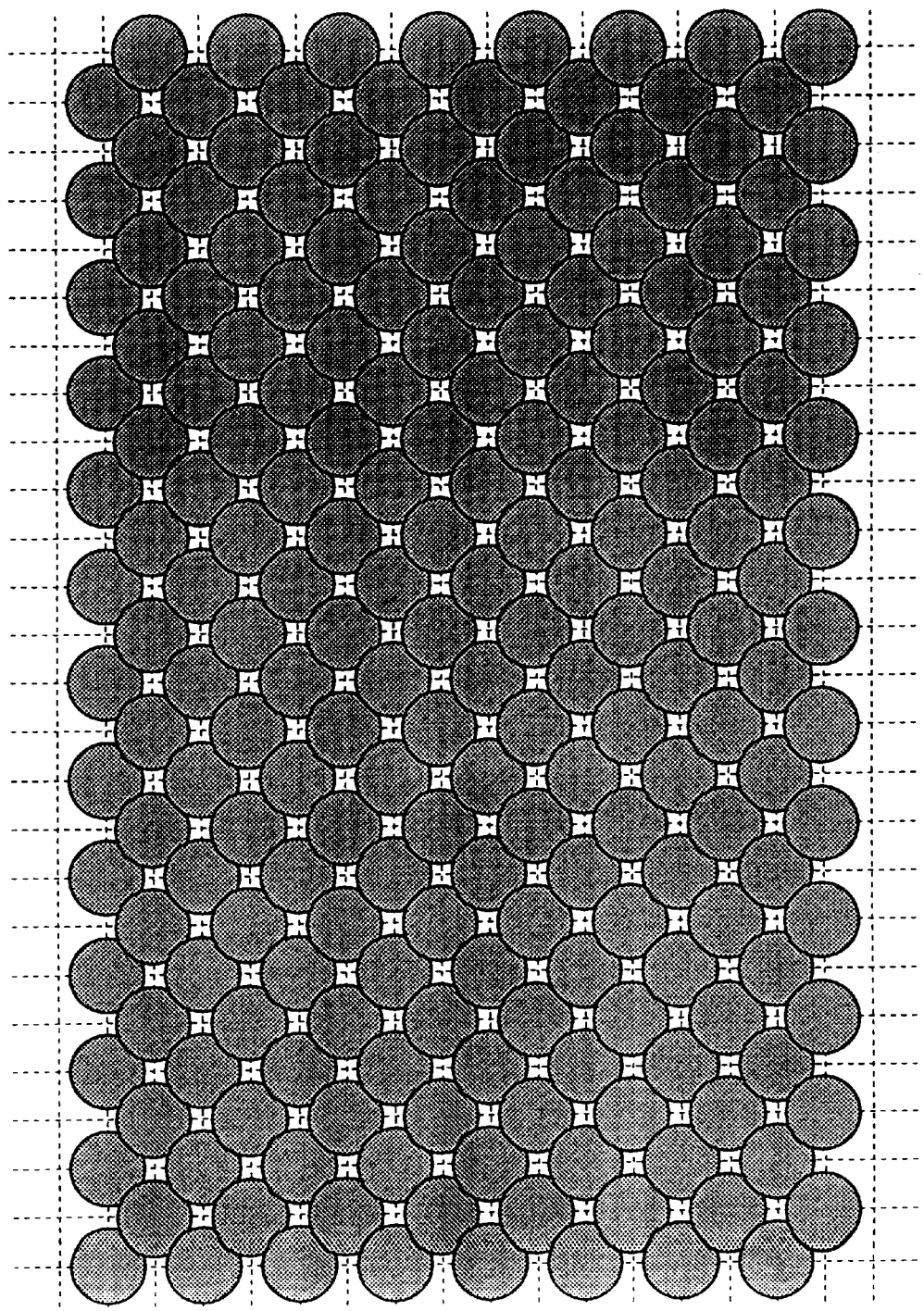
FIG. 13 is a diagram illustrating the condition of dots which have landed on a paper surface in the printing by use of a conventional thinning mask of one picture element unit.

In FIGS. 12 and 14, the overlapping area of the dots in each group is made to be larger so as to make the ink covering area of the first recording color as small as possible as the main purpose thereof, and accordingly, it has been already mentioned that this is a method which is mainly effective for preventing uneven color image during bidirectional printing. On the contrary, in FIG. 17, the number of longitudinal arrays is two, which is small, and accordingly, the overlapping areas of dots in each group more or less decreased. However, as understood by comparison with FIGS. 18, 14 and 56, the first recording color and the second recording color are substantially equally divided for the green image on a sheet, even in this embodiment, that is, an uneven color image does not become a hindrance.

Figure 19:
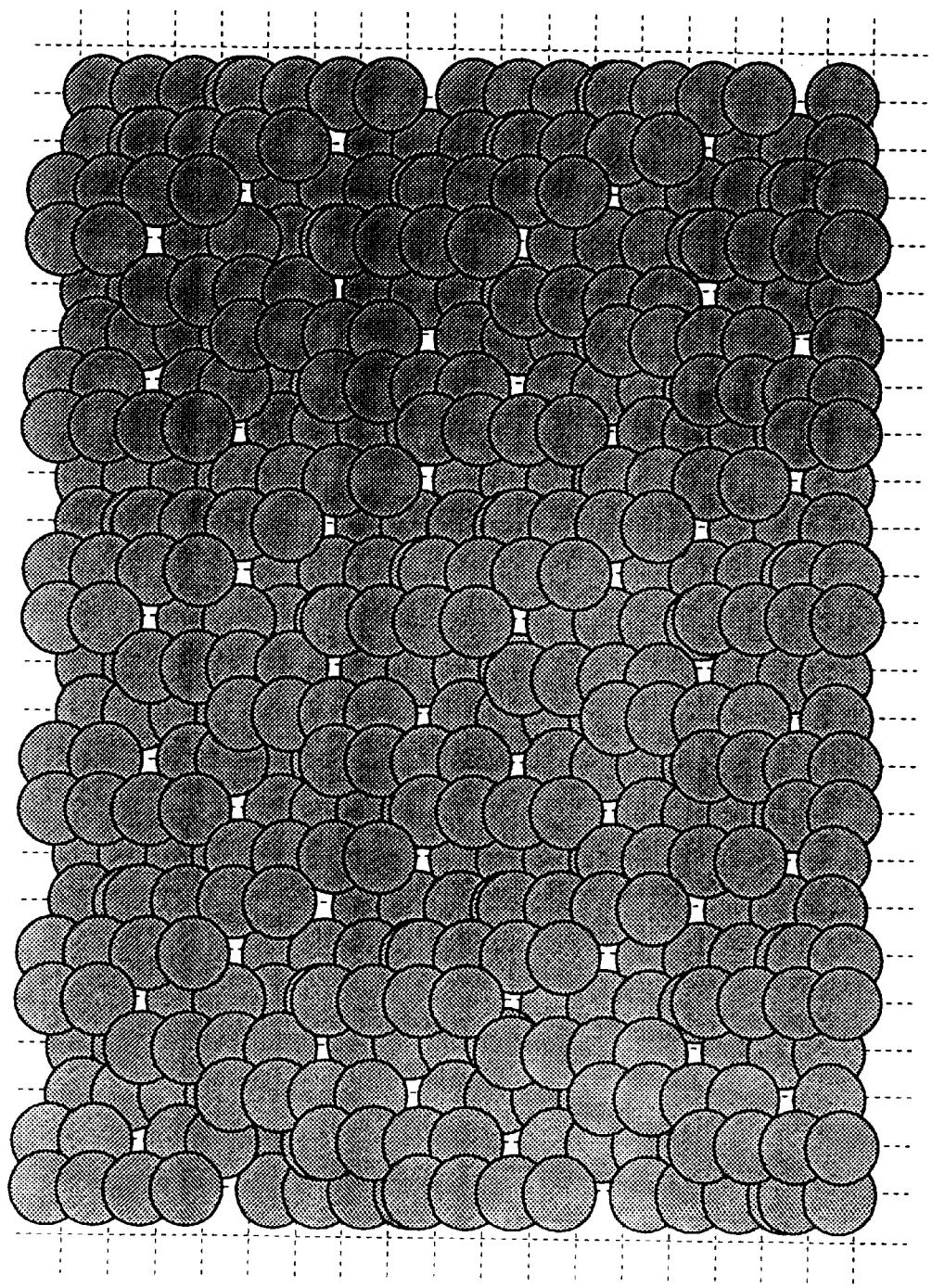
FIG. 19 is a diagram for aiding in the description of deviation of dots encountered in the printing by use of the thinning mask in the Third Embodiment.

FIG. 19 is a view from which the effect of the present invention can be best understood. Even in this figure, similar to FIGS. 16 and 59, such a condition that the positional shift of dots during bidirectional printing occurs, corresponding to ¼ pixel in both directions, as mentioned above. In comparison with the other two figures, since the number of gaps in this embodiment is less, that is, since the gaps are uniformly distributed, no thin density similar to FIG. 59 occurs, and no longitudinal textures similar to FIG. 16 become noticeable.

Then, explanation will be made of how a predetermined number of gaps are arrayed unnoticeably. In either of FIGS. 19 and 16, every four dots are printed, being crosswise bundled, and accordingly, the number of gaps over the entire image is uniform. However, in FIG. 16 in which a 3×4 pixel group is used as a basic pixel group, gaps corresponding to four dots are successively arranged in the longitudinal, the positions and the sizes thereof have to be clearly confirmed. On the contrary, in this embodiment shown in FIG. 19, since the 1×4 basic dot groups are longitudinally arranged while they are shifted by more than two pixels in the crosswise direction, the gaps are not adjacent to one another, that is, the gaps each having a small size corresponding to one pixel, are uniformly distributed over the image. Such small size gaps are unnoticeable, and are also often invisible depending upon the size of dots and the degree of shifting. Further, since they are uniformly distributed, no hindrance occurs on the image as a whole.

As mentioned above, in order to prevent the gaps from being successively arranged in the longitudinal direction in such a condition that the basic dot group is fixed, the basic dot groups which are arranged adjacent to one another in the longitudinal direction, have to be arranged at positions which are shifted crosswise by more than one pixel. In this embodiment, since the 1×4 basic dot group is used, the basic dot groups which are adjacent to one another in the longitudinal direction, have to be shifted, to either the right or the left, from one another by one pixels at the minimum but four pixels at the maximum.

In order to make shifts among dots unnoticeable, the following two conditions adapted to apply the array of the basic dot group can be enumerated:

(1) a number of dots in the crosswise direction is increased; and (2) longitudinally adjacent basic dot groups are shifted to either the left or the right by more than one pixel.

Figure 20:
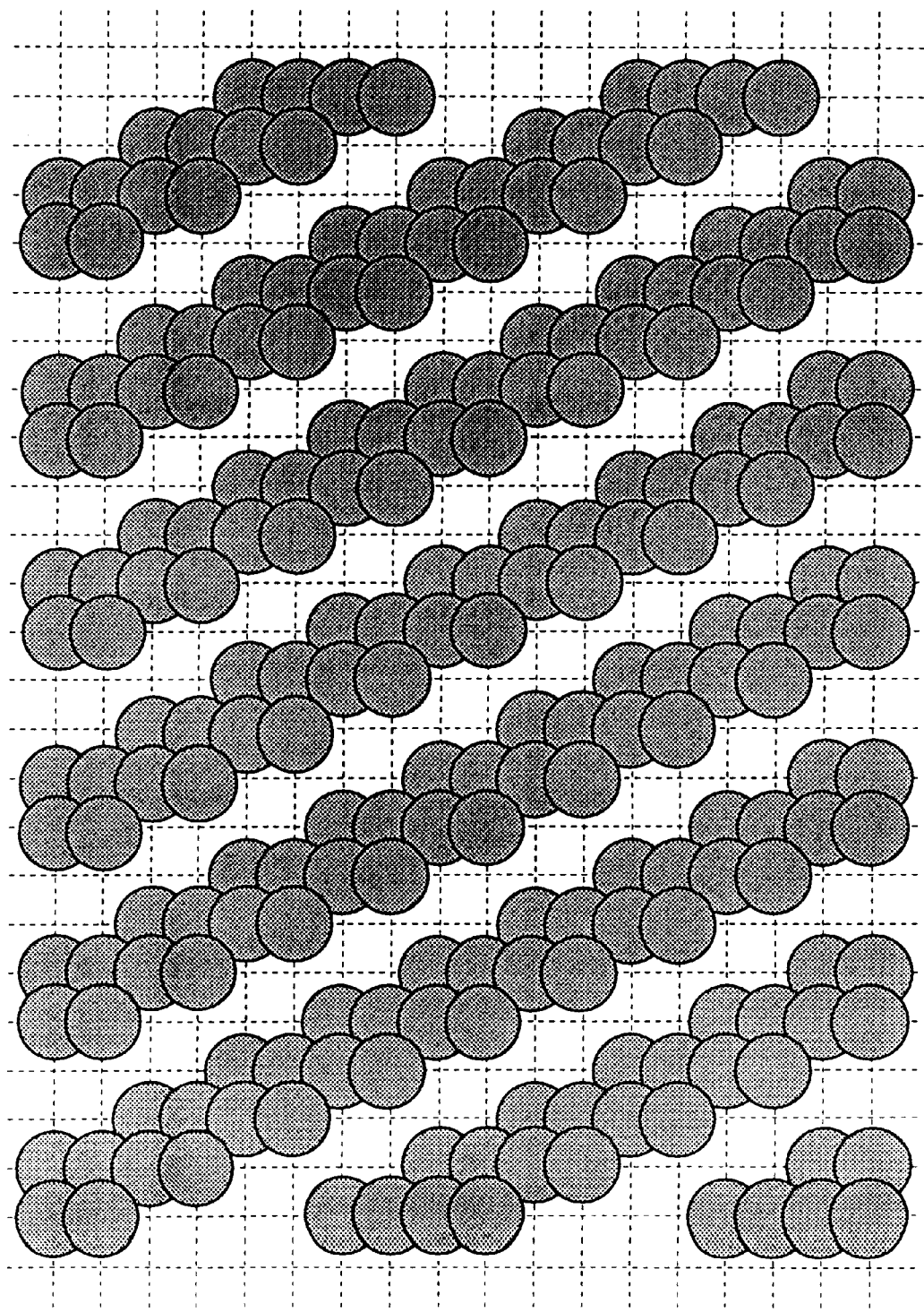
FIG. 20 is a diagram for aiding in the description of the condition of dots which have landed on a paper surface in the printing by use of a thinning mask having basic picture element groups arrayed as constantly shifted in one direction.

However, the above-mentioned two conditions are intended for only shifting of dots during bidirectional printing, and accordingly, even though these conditions are satisfied, conventional hindrance to an image such as uneven image by nozzles, uneven color image or uneven image by time difference can be not always overcome. For example, if the basic dot group is too laterally long in order to satisfy the condition (1), alleviation of uneven image by nozzles which has been conventionally inherent to the split recording process cannot be alleviated. If a 1×4 pixel group is used as a basic dot group as in this embodiment so that the lateral shifting in the condition is fixed to four pixels, the pattern shown in FIG. 9 is obtained. However, although no hindrance by the shifting of dots are present, uneven color image is likely to occur since the ink covering rate of the first recording color becomes higher if the size of dots are larger. Further, as shown in FIG. 20, if the basic dot groups are arranged while they are always shifted in one and the same direction, although no hindrance by uneven color image or shifting of dots is present, regular textures which are obliquely arrayed as shown, are possibly noticeable. On the contrary, as explained in this embodiment, the mask patterns in which basic groups are arranged longitudinally adjacent to one another while they are laterally shifted more than two but less than four pixels, can eliminate uneven image caused by shifting of dots which it can provide an image having unnoticeable textures and a low ink covering rate.

Figure 21:
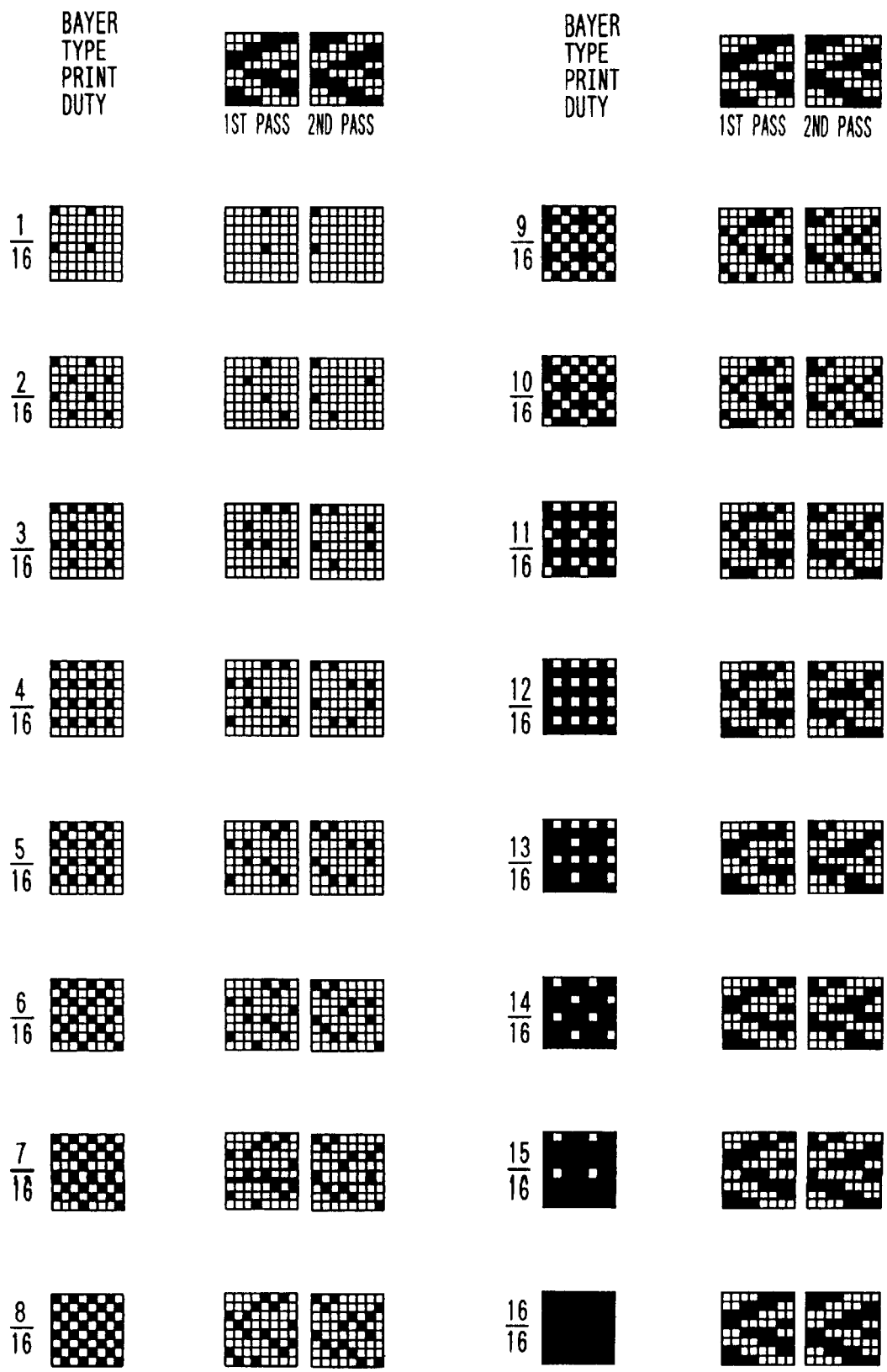
FIG. 21 is a diagram illustrating recording picture element arrays involved in the printing by use of the thinning mask of the Third Embodiment relative to the Dither method.

Further, in the case of the split recording by use of this mask, the positions of pixels in which the Bayer type dither pattern can be recorded by two scans, similar to FIG. 15, are shown in FIG. 21. Even in this figure, since the number of dots is always equally divided between the first and second scans, an effect similar to that obtained by the above-mentioned 4×4 mask can be obtained for an uneven color image caused by inclination to the number of recorded dots during each scan. Since the lateral four pixel mask is used, dots which are arrayed in one and the same direction are equally divided between two scans. Similar to the 4×4 mask, not only the bayer type dither process but also the most of the other dither processes are effective in view of this point.

As mentioned above, in this embodiment in which the basic dot groups having an m×n array where m=1 and n=4 are arranged step-likely, as shown in FIGS. 1A and 1B, the number of pixels which are successively arranged in the longitudinal direction, always satisfied such a condition as m<p<n, and accordingly, it is realized that the gaps as mentioned in the conventional example, can be made to be unnoticeable. Further, by using the interlacing arrays as shown in FIGS. 17 and 18, commonly for black, cyan, magenta and yellow, and by using the split recording system for bidirectional printing, a high quality and smooth image can be obtained while all hindrances such as uneven color image, uneven image by time difference are uneven image by resting and uneven image by nozzles can be eliminated.

Figure 16:
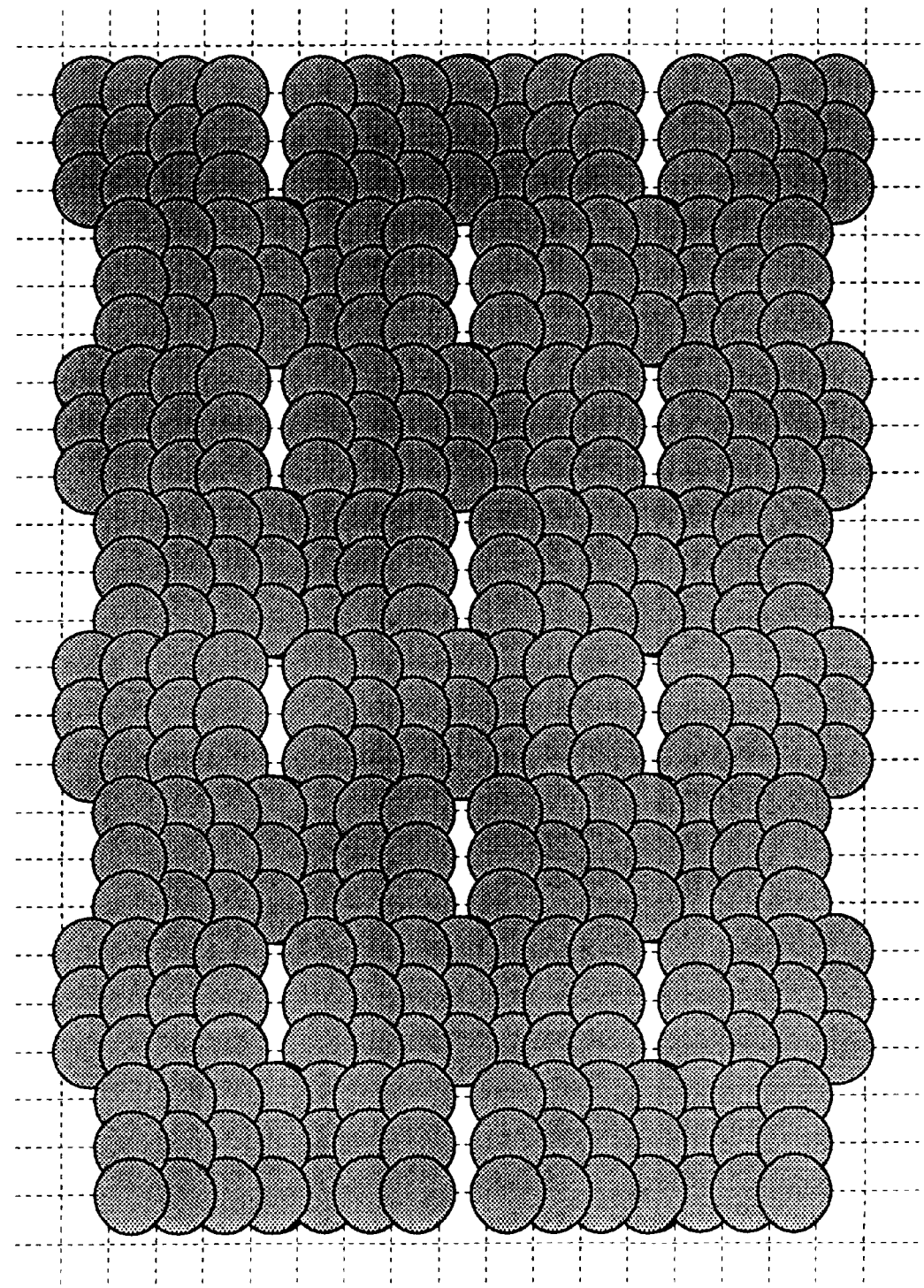
FIG. 16 is a diagram for aiding in the description of deviation of dots encountered in the printing by use of a thinning mask containing basic picture element groups each of 3×4 picture elements.

Further, in this embodiment, although it has been explained that the basic dot group (m×n) has an array of 1×4 pixels, the present invention should not be only limited to this array, even in either of the longitudinal or lateral direction. In the lateral direction (n), as already explained, the larger the number n within a range in which no hindrance by uneven image by nozzles occurs, the smaller the number of gaps among dots. In the longitudinal direction (m), m=1 has to be taken in order to completely avoid successive arrangement of gaps as shown in FIG. 16, but it is also possible set m to be equal to or larger than 2 if the resolution of an image, the discharge volume of ink and the condition of uneven color image can be made to be satisfactory. However, it is in general difficult to exhibit the effects of the present invention if such a condition as m<n cannot be satisfied.

Further, by developing this embodiment, such a case that different interlacing marks are used for respective colors and scans, as shown in FIGS. 22A to 22D can be also considered. In view of this point, interlacing masks similar to those explained in the first embodiment are used for cyan, magenta and yellow, but masks for cyan, which are complementary with those for the other colors are alternately used for the respective scans. A mask for black which is completely different from those for the other color is used.

The black always becomes a preferential color with a high possibility, irrespective of the order of color shots. Meanwhile, the positional shifting of dots during bidirectional printing is particular noticeable at 100% duty. Further, in order to make a longitudinal ruled line and a lateral ruled line smooth, large size masks are longitudinally and laterally arranged in an alternate manner as shown in FIG. 12. With the use of the masks shown in FIGS. 22A to 22D, the longitudinally arrayed pixels can give an excellent line having unnoticeable shifting of dots in both directions even with a longitudinal ruled line since on-going (or forward) printing dots and in-coming (backward) dots are alternately shot at every other pixel. Further, since printing is made by substantially one kind of nozzles in the lateral direction, disturbance in the lateral ruled line, which would be caused by uneven feed paper feed, does not occur. In this case, the effect for particularly not uneven color image but uneven image by nozzles, is decreased in comparison with those for the other colors, it is relatively improved in the linearity and the printing quality.

As to black in this case, uneven image by nozzles can be improved only at a rate of $1/16$ pixel. However, it is possible to take such a way that uneven image by nozzles can be eliminated although the number of gaps is increased, as shown in FIG. 23A (example 1) if the uneven image by nozzles and uneven gaps in both direction are satisfactory. Further, as shown in FIG. 23B (example 2), even though the number of gaps is equal to that of the back case in this embodiment, the positions of gaps may be made to be ununiform over the entire image.

This method takes an importance in particular to an uneven color image in the case of color inks, and positively overcomes this point. As a fundamental cause for uneven color image, it is said that color heads for four colors are arrayed in a direction identical with the scanning direction of a carriage. Since such an arrangement is used, difference indispensably occurs in recording order among respective colors during each scan. Accordingly, the prior example of the above-mentioned fourth embodiment is such that the recording order is alternately reversed, and during on-going (or forward) stroke and in-coming (or backward) stroke during which dots having hues different from each other are respectively formed, both can be recorded in the same condition as far as possible. The purpose of this method is to prevent occurrence of difference in preferential color among the colors during each scan, and accordingly, in order to realize the matter, the masks are reversed for two colors with which an uneven color image is noticeable in combination. FIG. 24 shows a condition such that recording is made in such a way that the interlacing masks shown in FIGS. 22A to 22D are used, and are replaced with each other during every scan with cyan and yellow. It is understood that the case of this method is also identical with that shown in FIG. 18, and no ununiformity is present in every area. If the different mask are used for these respective colors, before an ink (cyan during on-going scan and yellow during in-coming scan) with which first recording is made on a white paper sheet, is absorbed into the sheet, recording with another color ink (yellow during on-going scan (or forward scan) and cyan during incoming scan (or backward scan)) is made in the same scan, and accordingly, recording conditions for respective color in each scan can be uniformalized. Thus, difference in preferential color is hard to occur.

Naturally, in this method, since the recording has to be completed in only two carriage scans for each area, it is impossible to use masks with which all three colors do not overlap with each other. However, it is highly possible that only one or two color combinations which are recognized to offer hindrance by an uneven color image are actually present. In this case, it may be enough to set up such a process which uses two different masks for recording with these colors. Further, in the combination of respective colors, if an uneven color image is noticeable, substantially uniformly, masks which are shifted by several pixels for respective colors, may be used.

However, in this method, since the masks are set in such a way that recording is made for all pixel areas during the first scan for each area, hindrance by uneven image caused by time difference between the first and second scans is more or less enhanced. Accordingly, if an uneven image by time deference is relatively noticeable, the first embodiment is more effective, and on the contrary, this method is effective for such a case that uneven color image is noticeable in particular for specific two colors.

As mentioned hereinbefore, in an ink jet recording apparatus using a multi-head having a plurality of arrayed ink jet ports, in which reciprocating scans are carried out at several times for one and the same pixel area, and paper feed is made successively, relative to the multi-head so as to complete a printed image on a paper sheet, the split and interlacing pixel arrays during every scan have a complementary relationship, and is given by a split printing control means by which rectangular basic pixel groups having a number m of longitudinal pixels and a number n of lateral pixels, where m<n, are arranged in accordance with a predetermined arraying rule, thereby it is possible to improve hindrance by an image caused by positional shifting of dots during bidirectional printing, uneven color image, uneven image by resting and uneven image by time difference.

(Fourth Embodiment)

Next explanation will be made of a fourth embodiment according to the present invention. In this embodiment, a multi head 701 on which a plurality of ink jet nozzles 801 are arrayed, is reciprocated for one and the same area on a recording sheet, recording scan is carried out in each of the on-going stroke and the in-coming stroke of the head, interlaced images having pixel arrays which have complementary relationships are successively recorded by several recording scans, thereby an image in the abovementioned area can be completed. In this phase, the sum of the numbers of pixels which are recorded during one of the on-going scan and the in-coming scan is different from those which are recorded during the other one of the on-going scan and the in-coming scan. In addition, interlacing mask are set.

Figure 25:
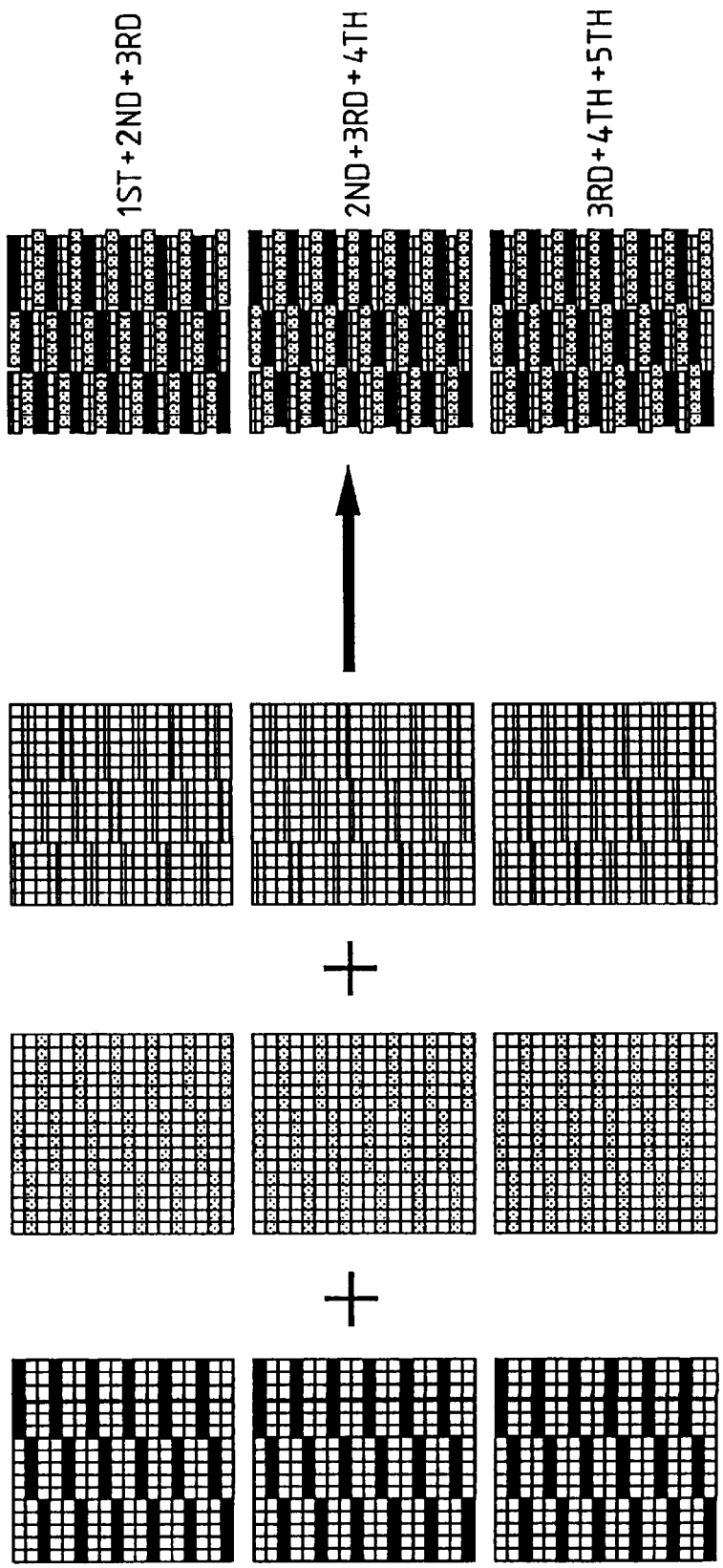
FIG. 25 is a diagram for aiding in the description of a picture element array in each of the passes used in the three pass printing in a Fourth Embodiment of this invention.

Accordingly, image deterioration caused by shifting of dots during bidirectional printing can be lowered so as to provide high image quality and high speed printing FIG. 25 shows this embodiment in comparison with FIG. 26. Even in this figure, such a condition that positional shifting of dots during bidirectional printing occurs, corresponding to $1/4$ pixel between the on-going scan and the in-coming scan. However, in the complicated dot shot condition, it is found that instability caused by gaps and shifting of dots in this embodiment (FIG. 25) becomes less than those shown in FIG. 26.

The difference between FIGS. 25 and 26 is exhibited through the sum of recorded pixel arrays during printing in one of two directions and the sum of the recorded pixel array during printing in the other of the directions. In this embodiment (FIG. 25) the sum of the recorded pixel array during the on-going scan is different from the sum of the recorded pixel array during in-coming scan while these scans are equal to each other in FIG. 26.

The larger the number of different dots in the recording and scanning direction, the more noticeable the shifting (if the image duty is very high, ink blurs so that the shifting cannot be sometimes found). Accordingly, in this embodiment, the numbers of pixels recorded in two reciprocating directions are not equal to each other, that is, the number of recorded pixels in one of the directions is made to be larger than that in the other of the directions so as to solve the above-mentioned direction.

Figures 28A, 28B:
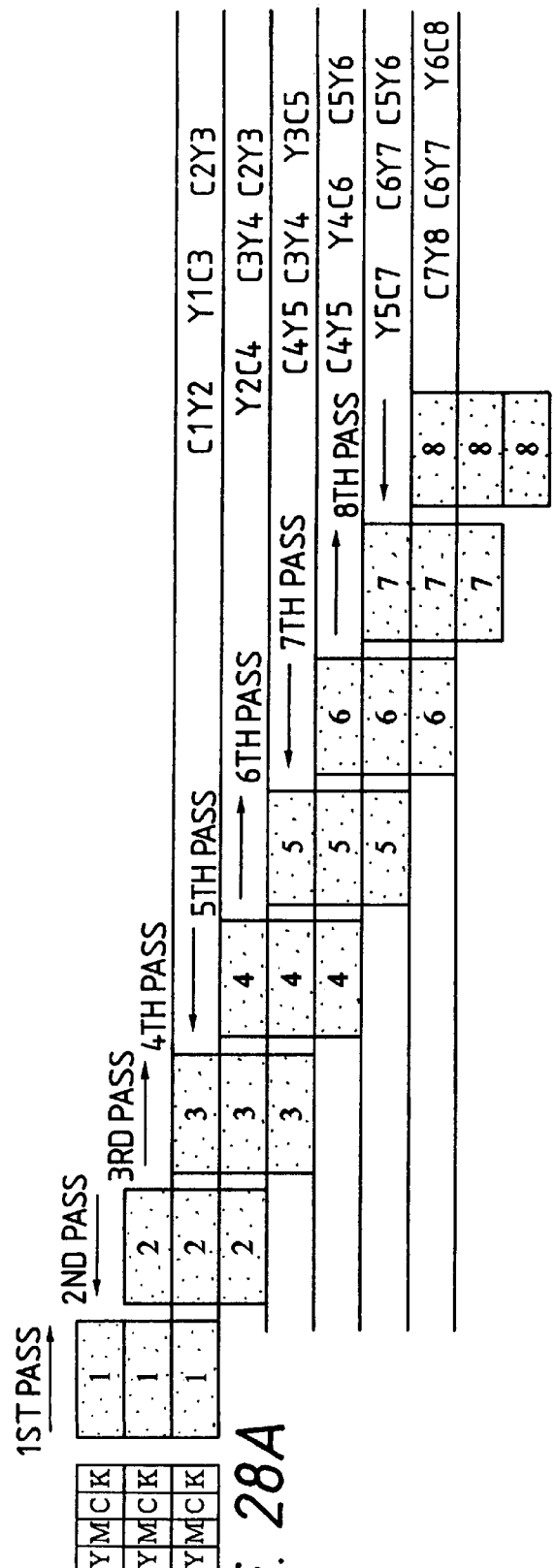
FIGS. 28A and 28B are diagrams for aiding in the description of the condition for forming a multi-color image of the Fourth Embodiment.

In FIG. 25, an image is completed by three time scanning recording (three pass printing) with the use of interlacing masks having complementary relationships with one another. FIGS. 27A to 27D show printing masks, in this embodiment, for four colors Bk, C, M, Y during respective recording scans. In this embodiment, the image is completed by three scans, and the printing masks are not synchronized with each other among C, M and Y, that is, C, M and Y are recorded without overlapping. The recording operation with the use of a mask C shown in FIG. 27B will be explained. The recording multi-head shown in this figure, has 54 nozzles in the longitudinal direction. Thus, the feed length of a recording sheet per one time corresponds to 18 nozzles which is ⅓ of the total number of nozzles since three pass printing is carried out. When three pass printing is carried out with the use of this recording head, an image shown in the right part of FIG. 25 is completed. In this right part, the numbers of recorded scans are also marked. That is, "the first +the second +the third" shows that the recording is made by three passes, that being the first to third passes. Since the number of recording scans is odd, the ratio between the sum of pixel arrays in one of two directions and the sum of pixel arrays in the other of the directions is 2:1, that is the sum of the pixel arrays in either one of the directions is larger. Thus, the rate of dots shot in one and the same directions can be increased as a whole, and therefore, affection by shifting in the bidirectional printing becomes less. Next, FIGS. 28A and 28B show the case of mixed color printing. The recording head, the number of recording scans, the printing masks are the same as those shown in FIG. 25, that is, these figures show an example of recording for a green contact image obtained by cyan and yellow. The cycle number of the recording scans is indicated as a pass cycle number, and a rectangle painted with grey indicates the recording head. The recording head comprises four color heads arranged in the scanning direction (FIG. 28A). During an on-going scan, the recording is made in the order of Bk, C, M and Y, and during an in-coming scan, the recording is made in the order of Y, M, C and Bk. FIG. 28B shows the order of shots for every sheet feed (partitioned by a lateral line) with the use of a recording color and a scanning number. As one example, the term "C 1Y 2" indicates such that C is recorded in the first pass and Y is shot thereonto in the second pass. In view of the order of the shots, "CnYm" gives cyanic green, and on the contrary, "YnCm" gives yellowish green. Even with printing with an odd number of passes as in this example, the masks are synchronously used for the respective colors, and accordingly, the hue for every feed period of the recording sheet (for every recording area) becomes CY:YC=2:1 so that no uneven color image caused by hue difference occurs. Accordingly, with the use of this embodiment, the mixed color printing can exhibit effects similar to those given by monochrome.

Further, although the explanation has been made in the case of 100% duty image, such a case as that in a low duty image will be considered. In the binary coding process such as the dither process, a pixel array corresponding to each duty is determined in a square matrix such as a 8×8 matrix. This matrix is used for realizing an area gradation therewith, and accordingly, if an equal duty value is inputted for all matrixes, dots in equal pixel arrays are recorded so as to form a uniform image. For example, in the case of a 25% duty image, a regular dot arrangement as shown in FIG. 29A as an example, is obtained. If this pattern is recorded with the use of this embodiment, a shot condition as shown in FIG. 29B can be obtained. Since the number of dots shot in one and the same direction is large, an image is formed without particularly noticeable textures or instability being exhibited.

Figure 30:
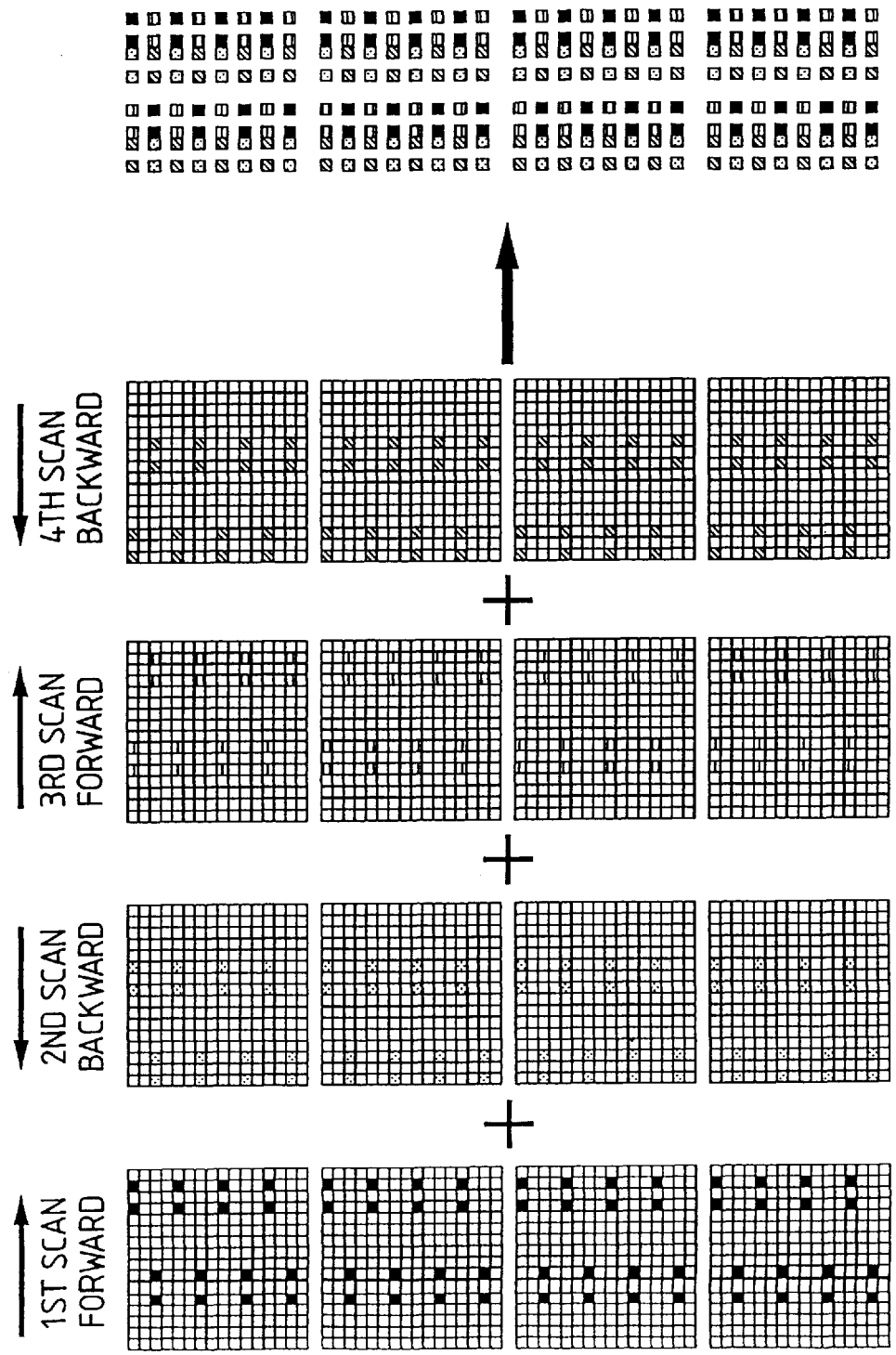
FIG. 30 is a diagram for aiding in the description of picture element arrays used in a low duty image recording by the conventional four pass bidirectional printing.
Figure 33A:
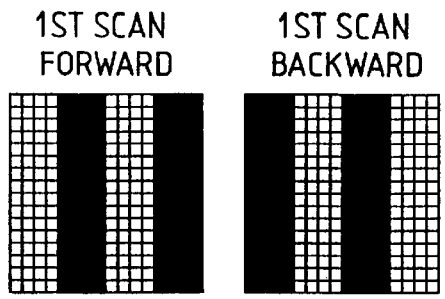
FIGS. 33A to 33F are diagrams illustrating correction patterns used in a Seventh Embodiment of this invention.
Figure 33B:
Figure 33C:
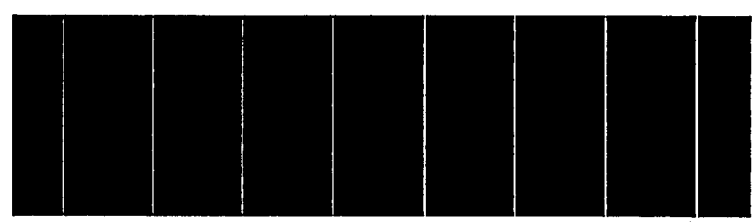
Figure 33D:
Figure 33E:
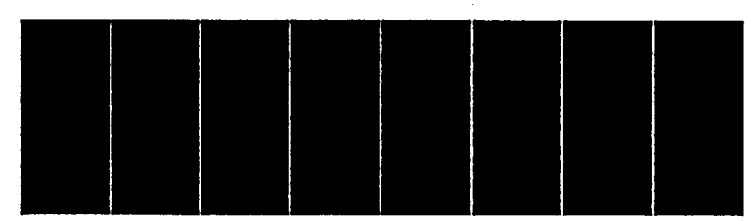
Figure 33F:
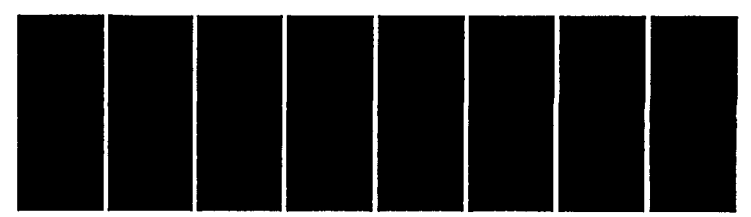

On the contrary, if conventional bidirectional printing with four passes is carried out, dots coming to or going away from near-by dots in the lateral direction are inevitably produced, as shown in FIG. 30. In such a shot condition, periodical textures such as an aggregation of longitudinal lines in which high density parts and parts having a color the same as that of a recording sheet are alternately exhibited and are unpreferably produced. Thus, it is understood that this embodiment is greatly effective for shifting of shots during bidirectional printing even in the gradation exhibition with a low duty.

(Fifth Embodiment)

As a fifth embodiment, FIGS. 31A and 31B show an example in which four color heads for Bk, C, M and Y are longitudinally laid in the sheet feed direction. As an example, a recording head having 24 nozzles for Y and M, 64 nozzles for Bk, and 8 nozzles for color intervals (white parts) is shown (one of rectangular in FIG. 31A, has 8 nozzles in a longitudinal direction). In the case of using this recording head, during three pass reciprocating printing, the feed length of a recording sheet corresponds to 8 nozzles, between the printing passes (which is ⅓ of the width of the C, M and Y heads). In this figure, a cyan image is completed by the respective printing passes. FIG. 31B shows which printing passes are used for dots which are formed during every feed of the recording sheet. For example, "1 2 3" indicates that an image is formed by passes 1, 2, 3. In this embodiment, since a longitudinal arrangement system is used, successive color recording is carried out for each area on the recording sheet, and accordingly, the image is always formed in the order of Bk, C, M and Y. Accordingly, it is not required to synchronously circulate the masks in one and the same printing pass, as explained in the first embodiment, in order to prevent the masks from overlapping with each other, and therefore, it is possible to eliminate the necessity of possession of masks for respective colors, and accordingly, memories of a recording medium can be eliminated.

As mentioned above, the sum of recorded pixels in the on-going direction is made to be not equal to but different from that in the in-coming direction, gaps which are produced during bidirectional printing can be made to be unnoticeable.

(Sixth Embodiment)

This embodiment carries out image recording by bidirectional printing with two passes, which has a recording speed higher than the above-mentioned three pass printing, in a successive color printing system using longitudinally arranged recording heads as shown in FIGS. 31A and 31B. In this case, explanation will be made of a mask which is hardly affected by shifting during bidirectional printing.

The allocation of dots during reciprocating scanning is made to be different in between scanning directions even during odd number scanning cycle. That is, with the use of the mask, ⅔ of all pixels are printed during a recording scan in a first pass, and then, the remaining ⅓ of the pixels are printed in the remaining second pass. FIG. 32 shows a printing mask and a recorded image for each pass. Since the order of colors to be recorded is always fixed in the successive color recording process, the order of ink injections are not changed even though the pixels are uniformly arrayed among several scans. Thus, the above-mentioned mask arrangement is possible. With the use of this system, a dot arrangement similar to the fourth embodiment which is hardly affected by shifting in bidirectional printing can be practically provided, and further, the image forming time can be made to be shorter than using three pass printing, thereby it is possible to realize the recording having a high recording speed.

It is noted that three pass printing has been mainly explained in the above-mentioned embodiment. However, the dot allocation in the reciprocating scans are made to be different between different directions, the effects of this embodiment can be exhibited if the cycle number of scanning exceeds two passes. Further, the printing mask used for explanation may have a dot arrangement other than that explained above.

Next, explanation will be made of a method of adjusting the recording timing of the recording apparatus for carrying out bidirectional printing. The following example can prevent occurrence of erroneous determination caused by the linearity of a longitudinal ruled line as is in a conventional example, and can perform fine adjustment up to a value smaller than one pixel, that is, several $\mu$m, overcoming the conventional determination limit.

Specifically, by printing in an on-going scan process and an in-coming scan process to which segments of data consisting of a test pattern to be printed for one and the same area are respectively given, the test pattern is formed in one and the same area. A line-like pattern in the reciprocating scanning directions is preferable as the test pattern.

Accordingly, with the use of the degree of superiority (or difference in hue) for uniformity of the pattern, it is possible to simply and precisely determine and store in memory an appropriate value of bidirectional recording timing (or appropriate value of recording timing of different color multi-heads).

Explanation will be hereinbelow made of the seventh embodiment with reference to FIGS. 33A to 33F. This embodiment, as shown in FIGS. 33A to 33F, creates a complete band-like area pattern (the area-patternization of a substantially band-like pattern can be substantially and equally visualized). An interlacing pattern for data segments for reciprocating scans is shown in the upper part of FIG. 33A. That is, a pattern (±0.25 pixel, ±0.50 pixel) in which the discharge drive timing during bidirectional printing is deflected by 1.4 pixel around ±0.00 pixel as a center is also shown (FIGS. 33B to 33F).

In this embodiment, the on-going recording scan and the in-coming recording scan are carried out by the block of the nozzle number of the longitudinal head×lateral four pixels so as to carry out the printing 50% by 50% in a complementary relationship so as to obtain a 100% of a solid image. In this embodiment, since the multi-head having longitudinal nozzles for 16 pixels is taken into a consideration, FIGS. 31A to 33F show a pattern having longitudinal 16 pixels. However, event with a head having more nozzles, the effects given by this embodiment can be obtained if those which are successively laid, among all nozzles, are partially used.

Conventionally, the linearity of a ruled-lined has been used for determining an appropriate value. However, in this embodiment it is determined in view of the uniformity of the entire image. As clearly understood from FIGS. 33A to 33F, if the dot compensation is insufficient, the complement by the on-going and in-coming printing is insufficient, gaps between blocks are visible in the form of streaks. By close observation, it is found that these streaks are longitudinal fine textures, that is, the uniformity of the image is not deteriorated.

Figure 38:
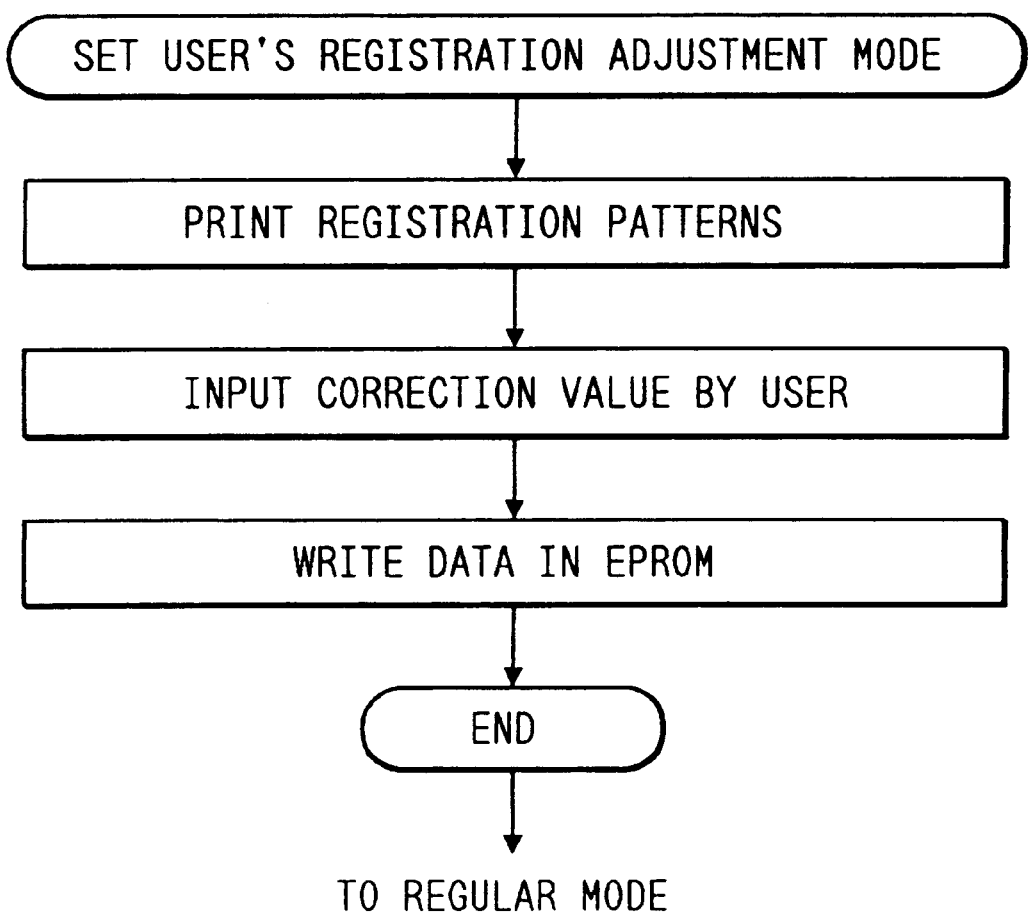
FIG. 38 is a flow chart of the process of correction in the Seventh and the Eighth Embodiments.

Explanation will be made of a process by which the user actually adjusts reciprocal registration, with reference to FIG. 38.

At first, the user designates an adjusting mode by a switch (SW) on the apparatus body, and accordingly, the body comes into a user's adjusting mode. The activation of this mode can be indicated to the user by LEDs or the like.

After the user confirms the activation of the adjusting mode, he starts registration pattern printing. FIGS. 34A to 34O show examples of pattern configurations, that is, these figures show patterns which are recorded through 15 steps in the paper feed direction while the positions of dots are shifted 10 $\mu$m by 10 $\mu$m during reciprocating scans, and accordingly, the user selects the most excellent one among these patterns. Since the pattern printing is carried out at three positions on the sheet surface for each of the steps, the user can make determination, totally taking into consideration with uneven carriage speed and floating of paper which occur more or less in the left and right parts of the sheet surface.

Model configurations each indicating a turn-on condition of four LEDs are shown between the left end pattern and the center patterns, and are adapted to be used when the user inputs his selected registration pattern into the apparatus body. The user sets the LED' by means of the input switch so as to allow their condition to be coincident with a turn-on condition of LEDs indicated at one side of a most uniform pattern.

For example, as shown in FIGS. 34A to 34O, if it is determined that a pattern located beside ●○○○ is most uniform, the depression of the input switch is repeated several times until the LEDs indicates ●○○○, and then a memory switch is depressed while the above-mentioned condition is maintained. Accordingly, the body stores in memory the timing of jetting in both directions with which the uniform 100% image has been obtained. Subsequently, the jetting of the heads is carried out by the above-mentioned timing for printing.

After completion of storage of new compensating values in ROM (EPROM in the body), the user's registration adjustment mode is ended, and accordingly, the body is returned into a normal printing mode.

FIGS. 34A to 34O show variation of the timing of ink jetting in both directions through 15 steps for every 10 $\mu$m, it is preferable to set the pitches and the number of steps so as to obtain more two times as large as the distance between each adjacent pixels on the one and the same sheet surface. In this embodiment, since a condition of 360 dpi, that is, about 70 $\mu$m of the distance between each adjacent pixel, is considered, a condition in which dots are shifted back and forth from the center value, in extent of two pixels or 140 $\mu$m, can be obtained.

Further, all patterns are always printed at 10 $\mu$m of equal intervals in a range of −70 $\mu$m to +70 $\mu$m. However, by increasing the degree of shifting at both end parts as follows, patterns whose uniformities are clearly deteriorated may be formed on both sides of all patterns.

In each of 3 patterns on both sides from the center pattern ○●●●, shifting is made by +20 $\mu$m. Thereafter, in each of 2 patterns, shifting is made by +30 $\mu$m and in the last two patterns, shifting is made by +40 μm. Then, even though the number of these compensated patterns are 15 in total, control can be made over a range of ±200 μm with respect to the center value. Thus, of these 15 patterns in total, patterns in which dots are completely shifted in both directions so that their uniformity is clearly deteriorated are exhibited on both sides, and accordingly, even if the determination for the uniformity around the appropriate value is difficult, the appropriate value can be easily determined by use of a distance (step number) from both side patterns in which white streaks can be clearly confirmed.

It is noted that the printing patterns have been explained in this embodiment with a lateral four block unit, but the shape and size of this block should not be limited thereto. If a laterally long block is used, the periods by which white streaks are exhibited becomes longer, and therefore rough textures can be found. Further, if the on-going printing pattern and the in-coming printing patterns are reversed at every certain number of longitudinal pixels, short and fine white streaks are sporadically exhibited. Anyway, it is preferable to use a block unit having textures which clearly exhibit a difference between a satisfactory uniformity and an unsatisfactory uniformity.

As mentioned above, according to this embodiment, with the use of patterns in which a block unit is recorded so that the on-going recording scan and the in-coming recording scan have a complementary relationship, the appropriate value of the printing timing is determined from the uniformity thereof, and then this appropriate value is inputted to the body so as to compensate the positional shifting of the shots in bidirectional printing with a high degree of accuracy.

Explanation will be hereinbelow made of an eighth embodiment of the present invention. FIGS. 35A to 35F show an embodiment in which essential band-like line patterns are formed as test patterns, and are given by a plurality of kinds to the above-mentioned on-going and in-coming scanning processes, respectively, as more than four kinds of divided data, so as to form the above-mentioned line patterns by a plurality of reciprocating scans. In this example, the effects of the present invention can be shown in comparison with FIGS. 36A to 36F, similar to FIGS. 33A to 33F. In this example, four cycle recording scans and the paper feed by ¼ of the head length (four pixels) are made for one and the same image area so as to perform split recording when one pattern is printed.

Figure 35A:
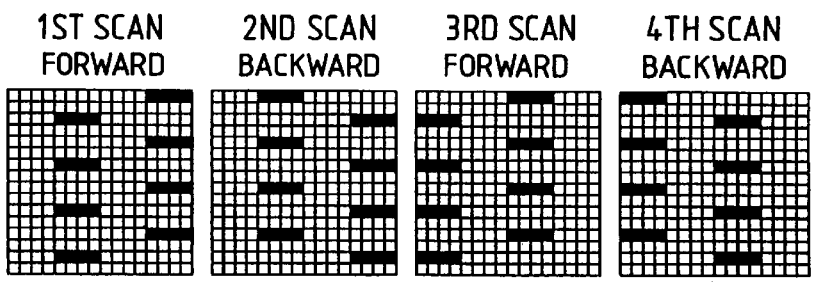
FIGS. 35A to 35F are diagrams illustrating correction patterns of an Eighth Embodiment of this invention.
Figure 35B:
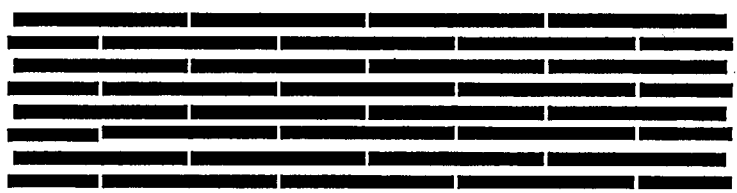
Figure 35C:
Figure 35D:
Figure 35E:
Figure 35F:
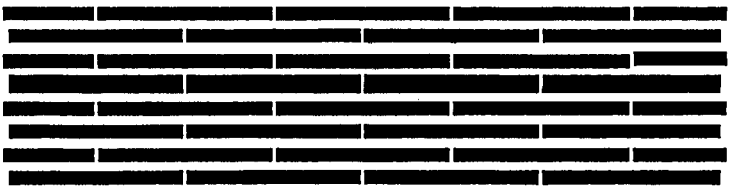

Patterns which are printed by the first to fourth recording scans are shown in FIG. 35A. The pattern which is finally formed in this embodiment is a group of lateral ruled lines which are longitudinally arrayed at periods of every one pixel, and therefore a 50% duty image can be obtained as shown in the figure. That is, the pattern configuration is such that the uniformity can be determined from longitudinal white streaks as is similar to the first embodiment.

In this embodiment, the first recording scan and the third recording scan can be obtained by on-going printing while the second recording scan and the fourth recording scan can be obtained by in-coming printing. Thus, when one of images is formed by every two recording scans, more or less of positional shifting of dots which occurs every recording scan is alleviated to ½. Further, since split recording is carried out by paper feed of ¼ head width during each recording scan, lateral ruled lines extending the main scanning direction are recorded by four kinds of nozzles so that slippage inherent and uneven discharge volumes, inherent to nozzles, can be alleviated. Thus, in this embodiment, several kinds of uneven images caused by the above-mentioned factors can be made to be relatively unnoticeable, and accordingly, shifting of dots between on-going printing and in-coming printing alone is clearly seen while the uniformity is enhanced whenever no shifting of dots occurs, thereby a satisfactory one can be easily selected from the pattern array shown in FIGS. 34A to 34O.

Figure 37A:
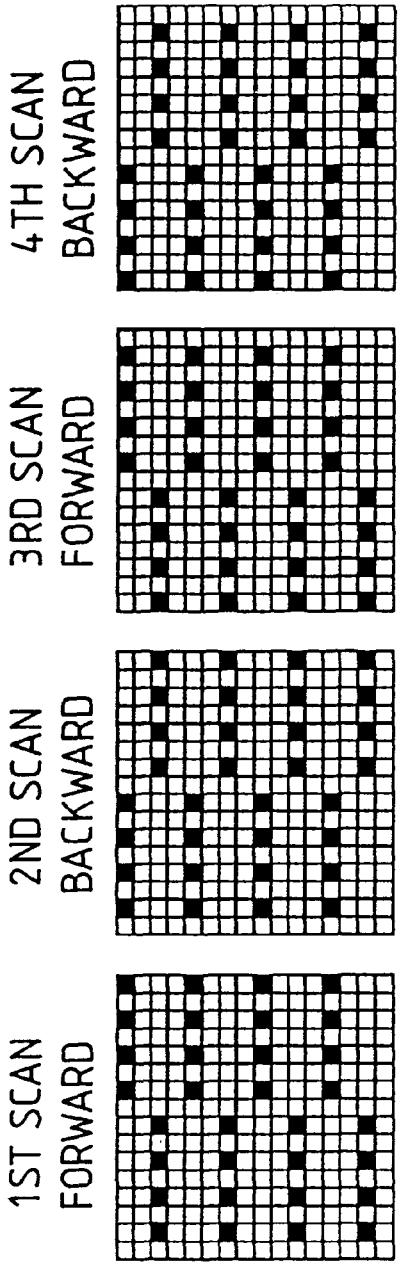
FIGS. 37A and 37B are diagrams illustrating variation of the pattern printing of the Eighth Embodiment of this invention.
Figure 37B:
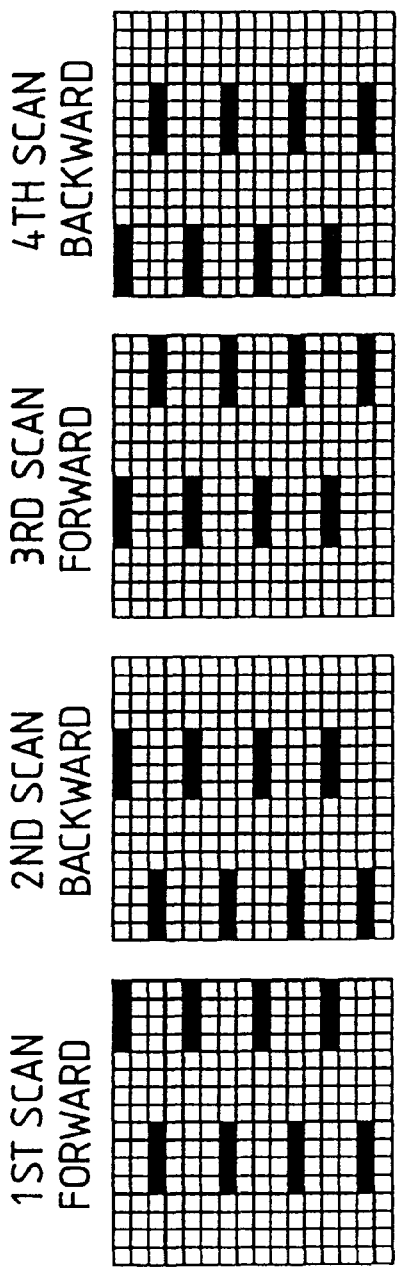

Further, as variations of the printing patterns for respective recording scans, two examples are shown in FIGS. 37A and 37B. From FIG. 37A in which textures caused by shifting of dots during bidirectional printing are similar to that shown in FIGS. 35A to 35F, since the first and third recording scans, and the second and fourth recording scans alternately shoot inks for every pixel, the above-mentioned slippage and uneven discharge volumes inherent to nozzles can be made to be further unnoticeable. Further, FIG. 37B shows such that the second and third recording scans in the printing method shown in FIGS. 35A to 35F are reversed, and accordingly, white lines due to shifting of dots in both directions are exhibited at every four pixels in the lateral direction so that textures can be made to be noticeable when the shifting is further made. Also in this embodiment, the procedure made by the user for adjusting reciprocal registration is the same as shown in FIG. 38, and after completion of the adjustment, the timing of subsequent jetting is controlled by the inputted data.

As mentioned above, according to this embodiment, a plurality of patterns with the discharge timing with which is changed stepwise are formed while the split recording is carried out by two cycles of the on-going scans and two cycles of in-coming scans, and accordingly, an appropriate value of the timing of jetting is determined in view of the uniformity thereof, and is inputted into the body, thereby it is possible to compensate the positional shifting of shots during bidirectional printing with a high degree of accuracy.

It is noted that although the compensation for the shifting of dots by a monocolor (single) head has been explained in the above-mentioned seventh and eighth embodiment, both embodiments are also effective for color inks. In this case, in the patterns of FIGS. 34A to 34O, different color patterns may be printed as reference values and further, compensating values may be inputted independently for the respective colors. However, in the later case, the shifting of dots among colors has to be simultaneously compensated.

Explanation will be hereinbelow made of a method of compensating shifting of dots in each color in a four color ink jet recording apparatus shown in FIG. 45 as a ninth embodiment. In this case, magenta and black are exemplified.

FIGS. 39A to 39B show a printing pattern of four cycle recording scans used in this embodiment, and an image condition in which the timing of jetting for magenta is carried out by shifting of a unit of ¼ pixel with respect to that for black. In this embodiment, estimation is made such that a pattern is formed by four cycles of split recording scans, similar to the second embodiment. Accordingly, factors causing slippage of dots and uneven discharge volumes due to uneven nozzles can be also eliminated beforehand also in this embodiment.

Different from the embodiments as mentioned hereinabove, textures as shown in FIGS. 33A to 33F, and FIGS. 35A to 35F are not visible. In the case of this embodiment, it is exhibited as a difference in hue. In such a case black and magenta dots are shot being overlapped with each other. The magenta is disappeared by the hue of black, and substantially no color is developed. Pixels in this condition are shown by grey color in FIGS. 39A to 39F. However, if the magenta dots are shifted little by little with respect to black dots, the hue of magenta is thickened in the areas corresponding to the shifting, and accordingly, the image bearing a red hue is formed as a whole in accordance with the degree of shifting. FIGS. 39A to 39F show these bulge-out parts with black color.

If the patterns are traced from an area shifted in the negative direction to an area shifted in the positive direction, the red hue in the pattern is gradually decreased as a whole, and then the red hue born by the patterns is increased from the pattern having a greatest black hue as a boundary.

The user selects the part having a least red hue, and inputs the same, similar to the embodiments explained hereinabove.

Although the compensating method for magenta and black has been explained hereinbefore, such a compensating method has to be made for every color, every head, as already mentioned. Accordingly, three patterns concerning black and cyan, black and magenta, black and yellow are outputted, and data respective for three colors, that is, cyan, magenta and yellow, are inputted in order to be adjusted to black.

Figure 40:
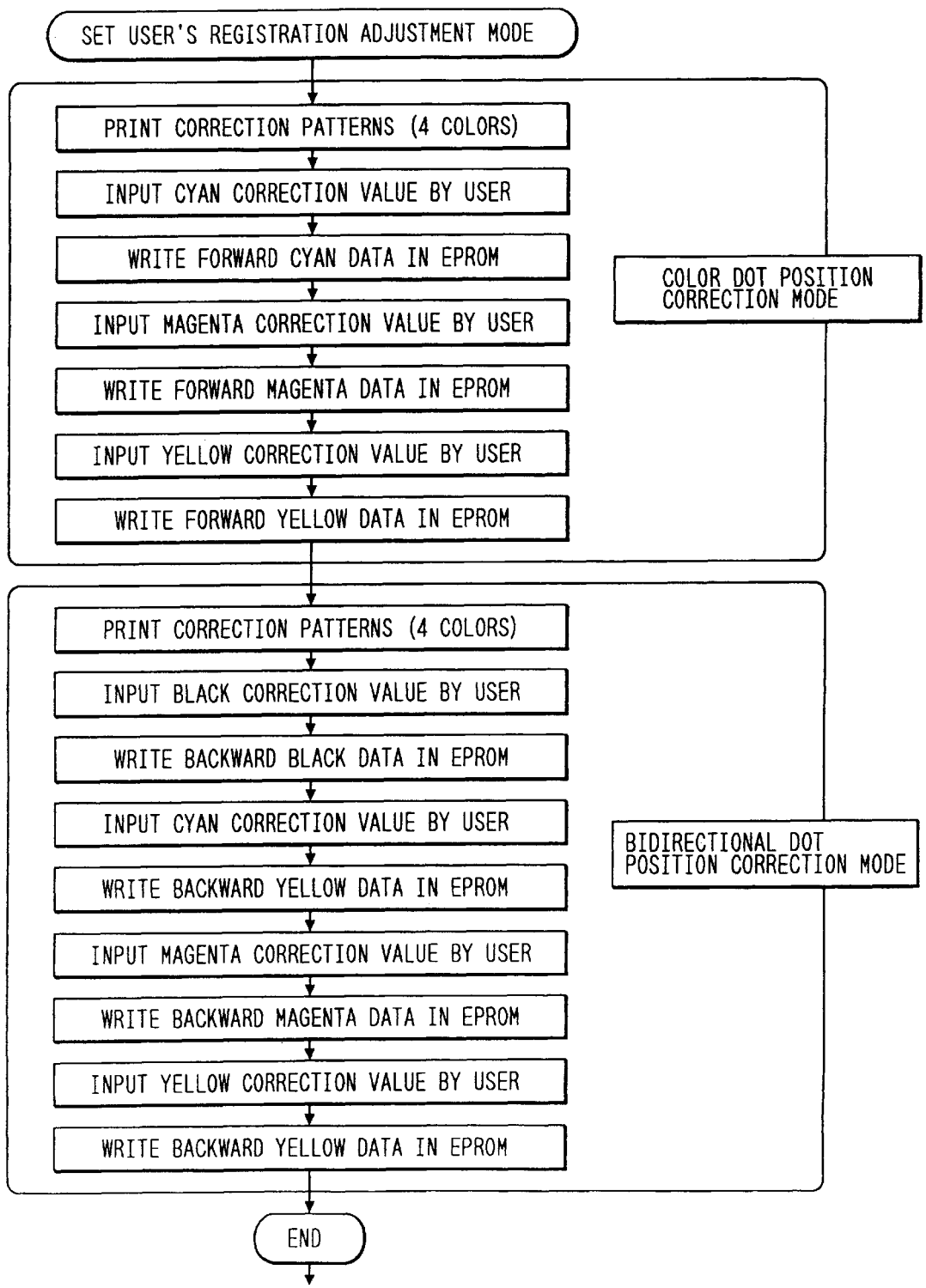
FIG. 40 is a flow chart of the process of correction in Ninth Embodiment.

Further, ink jet used in this embodiment is considered such that the color heads carry out bidirectional printing, and accordingly, it is considered that the user carries out both compensation for shifting of dots among colors and compensation for shifting of dots during bidirectional printing for each color are carried. FIG. 40 is a flow-chart which shows these compensating processes.

When the user designates the restoration adjusting mode, the apparatus body comes at first into a dot shifting compensating mode for respective colors.

The user confirms that the compensating mode is activated from a LED turn-on condition or the like, and then he presses a start switch so that the apparatus body initiates the printing of dot shifting compensating patterns for respective colors with the use of four color heads. Samples outputted at this time, are those which are obtained by arraying the patterns shown in FIGS. 39A to 39F in such a manner as shown in FIGS. 34A to 34O, and the patterns are printed for three combinations, that is, black and cyan, black and magenta, and black and yellow. Also in this case, the timing of jetting is change by 15 steps for every 10 $\mu$m, and LED configurations corresponding respectively to these patterns are also printed, similar to shown in FIGS. 34A to 34O.

Among the outputted samples, the user selects a pattern which is nearest to black for each of three colors, and sets an LED condition at a position where selection is made for cyan so that the timing of jetting in the on-going direction for cyan is stored in memory by a memory switch.

Similarly, the inputting and storing operation are carried out for magenta and yellow.

After completion of storage of yellow dot compensation, the apparatus body comes into a bidirectional dot position compensating mode. The user confirms that the printing of samples is again possible, and then depresses the start switch. Accordingly, the printing of patterns for bidirectional dot position compensation is initiated with the use of the four color heads. The thus printed patterns are shown in FIGS. 35A to 35F, in which the timing of jetting are changed also by 15 steps for every 10 $\mu$m, and LED configurations corresponding respectively thereto are also printed.

The user selects a pattern having the most satisfactory uniformity for each of the colors, and compensating values are inputted in the order of black, cyan, magenta and yellow with the use of the LEDs.

At the time of completion of storage of the compensating value for yellow which is the final one, the dot position compensating mode are completed, and accordingly, the apparatus body comes into a normal printing mode.

In this embodiment, the timing of jetting for each of the colors is adjusted to that for a black head in printing in one of the directions, and thereafter, the timing of jetting for each color in the in-coming direction is adjusted to that in the on-going direction. Accordingly, it is required to previously have such an arrangement that the on-going printing and the in-coming printing for respective colors can be compensated, independent from one another.

However, even though no above-mentioned arrangement is provided, if such an arrangement that by carrying out the dot position compensation only for black after the respective colors are compensated being adjusted to black, the compensation having a degree identical with that for black can be made, is provided for the respective colors, it is deemed that shifting of dots in bidirectional color printing can be sufficiently compensated.

As mentioned above, according to this embodiment, in the case of split recording for patterns, as shown in FIGS. 39A to 39F, by four cycles of scans in one of the directions, a plurality of patterns are formed by changing the timing of jetting stepwise so as to determine the appropriate values for the timing of jetting for the respective color heads, from the uniformities thereof, and then they are inputted into the apparatus body, thereby it is possible to compensate the positional shifting of shots during bidirectional printing with a high degree of accuracy.

Although the explanation has been made such that the user himself carries out the compensation, upon delivery of the apparatus body, the compensation is carried out so that each of the compensating values is set to the center value of the user's registration adjusting pattern, and accordingly, the subsequent adjustment range can be narrowed. Indeed, most of factors causing the shifting of dots, are possibly inherent to the recording apparatus body itself as mentioned before, and accordingly, it is preferable to carry out absolute compensation upon delivery.

Figure 41:
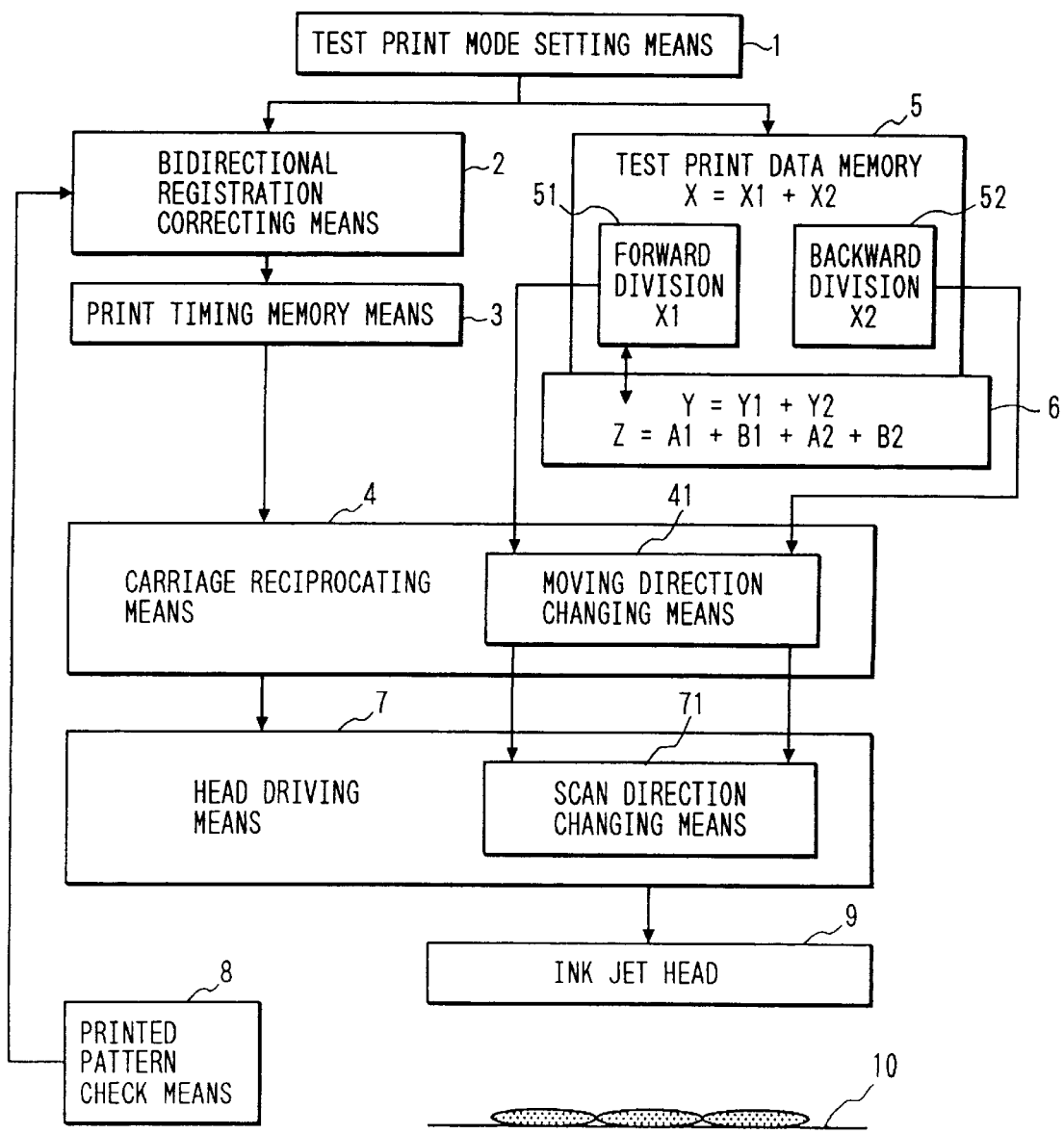
FIG. 41 is a block diagram illustrating the outline of test print and print timing correction.

FIG. 41 shows a block diagram showing a printing apparatus according to the present invention. In this figure, there is shown a means 1 for designating a test printing mode, which is satisfied by the one serving as an operational mechanism for carrying out a test printing mode for a normal recording mode. However, in this embodiment, this means also has a function for designating a test pattern in the test pattern printing mode by designating one of a plurality of above-mentioned different test patterns for one and the same area, a function for selecting one of a first pattern including, as a test pattern area, the center part area of a recording medium and areas on the left and right sides of the center part area, and a second pattern including, as a test pattern, areas having a number smaller than the first pattern. Further, there are shown a reciprocating registration compensating means 2 in the reciprocating scans for printing, which does not effect any function when no new compensating function is present, but activates a memory means 3 for storing the timing of printing which enables predetermined rewrite including the reciprocating registration upon reciprocating scans. The memory means 3 uses the reciprocating restoration upon reciprocating scans stored in memory, as a reciprocating registration in reciprocating recording scans in a normal recording mode. Reference numeral 8 denotes means (which will be explained, such as automatically determining means or the like) of determining a condition of a test pattern on a memory medium 10 or a printing determining means as a means manipulated by the user, which actuates the reciprocating registration compensating means 2 so as to carry out a compensation inputted into the printing determining means 8 so as to rewrite the reciprocating registration in the memory means 3.

Meanwhile, reference numeral 5 denotes a data memory means for storing, in memory, test printing data and area data which determines a printing area, having a storage means 6 for storing on-going scan data 51, in-coming scan data 52, other data and area data. In this embodiment, the adjustment can be made in accordance with a required degree of an apparatus, and accordingly, there can be enumerated, for example, the first test pattern for determination with a high degree of accuracy, including, as a printing area, the center part area of a recording medium and areas on the left and right side of the center part area, so that, for example, determination with a high degree of accuracy can be made upon delivery, and thereafter, the user can carry out the normal level determination. Further, the second test pattern having a number of areas less than that of the first pattern is used for the normal level determination. Further, only one kind of data is sufficient for data stored in memory, but in this embodiment, stored data X (=on-going scan data X1+in-coming data X2), Y and Z are divided for respective reciprocating scans as indicated by formulae shown in the figure (the above-mentioned embodiments and the contents explained in the summary of the invention can all be applied). Of these divided data, the on-going data is shown being attached with "1", and the incoming data is shown being attached with "2". In particular, since this embodiment employs an ink jet recording system, the recording data Z is often normally used or fixedly used. The recording data Z is applied as more than four kinds of different divided data (A1, B1, A2, B2) to the above-mentioned on-going scanning process (A1, B1) and the above-mentioned in-coming scanning process (A2, B2), respectively, by plural kinds for each scanning process, and accordingly, with a plurality of reciprocating scans, the above-mentioned test patterns are printed as explained in the embodiments hereinabove.

A well-known carriage reciprocating means 4 incorporates a motor as a reciprocating drive changeover means 41, and a positional detecting mechanism such as an encoder. A well-known head drive means 7 is a thermal jet type ink jet head drive means which has been proposed by Canon Co., using a membrane boiling, in this embodiment, and incorporates a means 71 for changing over reciprocating printing with the timing corresponding to the above-mentioned reciprocating registration. In the print test mode, similar to FIGS. 34A to 34O, the head drive means 7 forms a plurality of the above-mentioned testing patterns in which the timing of reciprocating scan registration patterns for the above-mentioned divided patterns, is made to be different by a range smaller than 1.00 pixel with the use of the multi-heads 9 incorporating several heating element for forming air bubbles.

With such an apparatus arrangement shown in FIG. 41, the above-mentioned embodiments can be, of course, carried out, and moreover, the inventions explained in the summary of the invention can be also carried out. In particular, in such a case that, as shown in FIGS. 42 and 45, the ink jet head has a head structure in which a plurality of color heads are incorporated after adjustment to the relative positions is completed, the adjustment to registration for each of the heads can be determined by ink tests for only one head part of them, and accordingly, it can be understood that the block diagram in this embodiment can be applied for any one of a monocolor head and a head in which a plurality of color heads are integrally incorporated.

Nextly, the tenth embodiment will be explained. In this embodiment, a pointed pattern is read by a ready device attached to the main body and then processes from the check of uniformity up to the input of a determined appropriate valve are automatically conducted.

Figure 42:
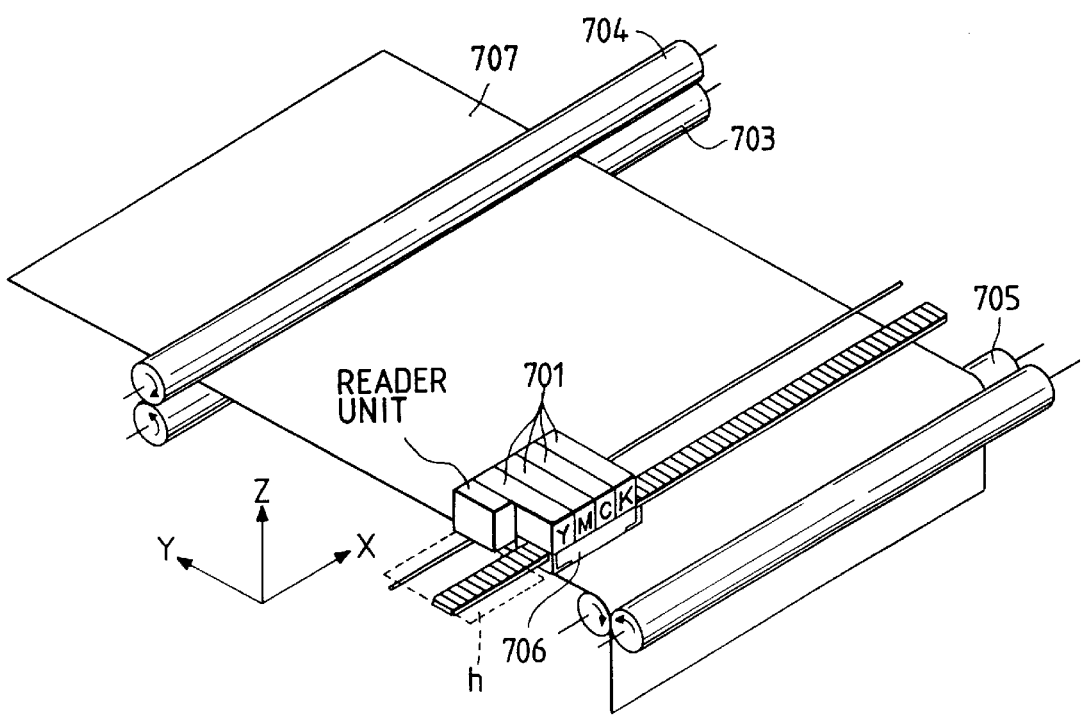
FIG. 42 is a diagram illustrating a printing part and a reading part as components of a recording apparatus used in a Tenth Embodiment of this invention.
Figure 43A:
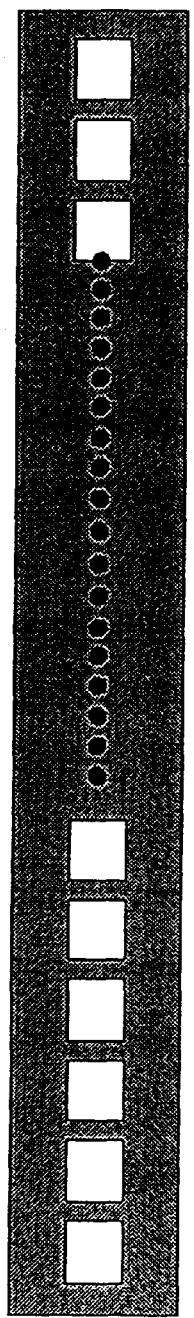
FIGS. 43A and 43B are diagrams illustrating on a magnified scale a reading part used in the Tenth Embodiment of this invention.

FIG. 42 is a perspective view illustrating an ink jet recording apparatus used in this embodiment, a CCD camera is attached as the reading device, beside a carriage. FIG. 43A shows a reading part of the CCD camera as viewed from the sheet surface side, in which CCDs are arranged, in one row, in the nozzle laying direction, having a pixel density equal to nozzle pitches.

Similar to the above-mentioned embodiment, when the recording apparatus completes the recording of one of the patterns, the carriage carries out an additional one scan during which a density distribution in the scanning direction can be read by CCDs.

FIGS. 44A to 44O show patterns similar to those shown in FIGS. 34A to 34O and the density distributions thereof. By scanning the carriage once for each of a plurality of patterns shown on the left sides of these figures, the density distributions in the pattern scanning directions can be obtained as shown on the right sides of the figures. In these figures, the abscissa gives addresses in the scanning direction, and the ordinate gives the density. As clearly understood from the figures, a large density amplitude is obtained at a position where the degree of shifting of dots during bidirectional printing is large, and accordingly, the amplitude becomes substantially zero at a position where no shifting of dots occurs.

In this embodiment, a plurality of CCD cameras are used so that the averaged value of data read thereby is used as the density distribution, individual uneven characteristics of the CCD cameras and uneven characteristics during scans can be compensated. Accordingly, the uniformity of the density distribution can be determined with high resolution, and therefore, an appropriate value can be precisely determined among a plurality of patterns. Thereafter, the apparatus body automatically stores in memory the thus determined appropriate value so as to use the value for subsequent recording.

As mentioned above, in this embodiment, the apparatus body automatically carries out all of reading, determination and storage in memory, and accordingly, only one time designation for the adjusting mode is required for the user, and other complicated manipulations are not required. Further, with the provision of high resolution cameras the compensation itself is also accurate.

Although explanation has been made of the compensation for shifting of dots during bidirectional printing, this embodiment can carry out the compensation of shifting of dots for respective color multi-heads explained in the third embodiment. In this case, the differences among the patterns are not exhibited by differences among amplitudes but exhibited by differences among hues, and accordingly, the CCD cameras have to detected differences among hues for every pattern.

Figure 43B:
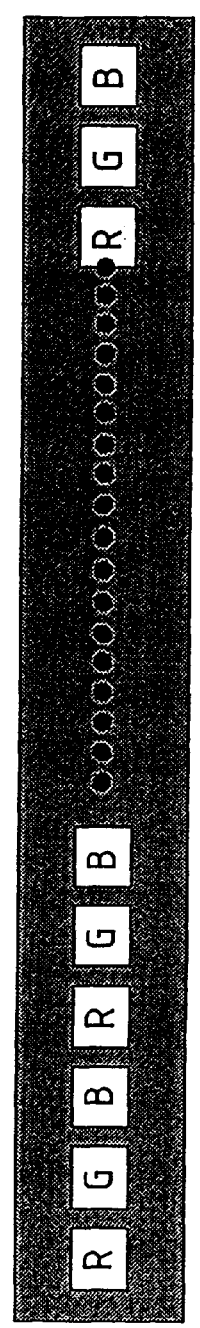

In FIG. 43B, CCD cameras incorporating different color filters for red (R), green (G) and yellow (Y) are alternately arranged. In this example, a reading scan is carried out for each of the patterns, and the respective CCD cameras read their density distributions. In this case, since no node distribution is required, averaged values in the scanning directions are obtained and further, averaged values for the same color filters are obtained so as to be used as densities for the respective colors. That is, the average value for the red filters gives the density of cyan, that for the green filters give the density of magenta, and that for the blue filters gives the density of yellow.

If explanation is made with reference to FIGS. 39A to 39F which have used in the third embodiment, of read data for the respective patterns, if a pattern having the density of magenta which is lowest, and the density of black which is highest is selected, this pattern gives appropriate values for magenta and black heads.

As mentioned above, according to this embodiment, the plurality of patterns are read by the reading device of the apparatus body, and appropriate values for the timing of jetting during bidirectional printing or for the respective heads are determined in accordance with the uniformities thereof, and are automatically inputted and stored in the apparatus body, thereby it is possible to precisely compensate positional shifting of shots.

Explanation has made of the embodiments of the present invention in order to assist in understanding the present invention, it should be noted that the present invention can be applied also for any of combinations of the summary of the invention and the embodiments as mentioned above, and further it can also be applied to even thermal transfer type thermal printers.

According to the present invention, even though the multi-head in which a plurality of ink jet ports are arrayed is used, in an ink jet recording method in which bidirectional recording scans and relative and successive paper feed are carried out so as to complete recording, the recording of a uniform pattern is completed by carrying out split recording (or respective color multi-heads) by the on-going scan and the in-coming scan for one and the same printing area, the appropriate value for the timing of recording for bidirectional recording (or the appropriate value for the timing of recording for each of the color multi-heads) is determined from the degree of excellency of the uniformities of the above-mentioned patterns (or differences among hues), and is stored in memory, thereby it is possible to carry out the compensation for shifting of dots with a high degree of accuracy which cannot be obtained before, and further it is possible to obtain a high quality image.

As mentioned above, the limitation to the conventional determination using the linearity of ruled lines can be overcome, and accordingly, the image can be held to be satisfactory so that fine adjustment less than one pixel, that is, several $\mu$m can be made. Further, even though the quality or thickness of recording medium varies, a satisfactory image condition having a satisfactory recording characteristic and a high degree of accuracy can be provided. In particular, in the case of bidirectional printing or in the case of recording with the use of plural color heads, the level of appropriating dot positions can be remarkably enhanced, thereby it is possible to enhance the recording speed for color printing and the quality of image.

It is noted that the above-mentioned embodiments have been explained using an ink jet type recording apparatus which utilizes a thermal energy so as to form trajectory liquid drops for printing, as an example among other ink jet recording apparatuses. The typical structure and the principle of the apparatus are preferably those which are disclosed in, for example, U.S. Pat. No. 4,723,129 specification or U.S. Pat. No. 4,740,796 specification. This system is applicable for either of the so-called on-demand type and continuous type, and in particular, the on-demand type is more effective since membrane boiling is effected at the thermally acting surface of a recording head with the use of thermal energy which is produced from electrothermally energy converting media that are held opposing a sheet or a liquid passage for holding liquid (ink) when at least one drive signal for rapidly increasing a temperature exceeding a nuclei boiling point is applied to the electrothermally energy converting media in accordance with recording data, and as a result, bubbles can be formed in the liquid (ink) which directly corresponds to the drive signal. With the use of the expansion and contraction of the air bubbles, the liquid (ink) can be jetted through jet ports so as to form at least one liquid droplet. It is more preferable if this drive signal has a pulse-like shape since the expansion and contraction of air bubbles can be readily and suitably carried out so that jetting of the liquid (ink) having an excellent responsiveness can be attained.

As the pulse-like drive signal, those disclosed in U.S. Pat. No. 4,463,359 specification and U.S. Pat. No. 4,345,262 specification are more suitable. Further, if the terms disclosed in U.S. Pat. No. 4,313,124 specification relating to a temperature rising rate of the above-mentioned thermally acting surface, are used, excellent recording can be performed.

As to the structure of the recording head, in addition to the arrangement in which jet ports, liquid passages and electrothermally energy converting media are combined as disclosed in the above-mentioned patent specification (having straight line-like liquid passages or right angle liquid passage), those disclosed in U.S. Pat. No. 4,558,333 specification and U.S. Pat. No. 4,459,600 specification, which concern such an arrangement that the thermal action is effected in a curved zone, can be used.

Further, the arrangement disclosed in Japanese Patent Application Laid-Open No. 59-123670 which concerns common slits that are used as jetting parts of a plurality of electrothermally energy converting media, or the arrangement disclosed in Japanese Patent Application Laid-Open No. 59-138461 which concerns opening holes for absorbing pressure waves having thermal energy, which are opposed to jetting parts can be preferably used.

Moreover, a recording head of a replaceable chip type which can be electrically connected with the apparatus body and which can be fed with ink from the apparatus body, or a recording head of a cartridge type with which an ink tank is integrally incorporate can be effectively used in the present invention.

Further, the restoring means, an auxiliary assist means or the like may be preferably used for the recording head since the effects of the present invention can be further stabilized. Specifically, these means are such as capping means, cleaning means, pressurizing or sucking means for the recording head, and auxiliary assist means for the electrothermally energy converting media, another heating elements or the combination thereof. Further, the provision of an auxiliary jetting mode with which jetting other than that for recording is effective in order to carry out stable recording.

Explanation has been hereinabove made of the use liquid ink. However, ink which is solidified at a temperature equal to or lower than the room temperature, ink which is softened or liquefied at the room temperature, or any other ink which exhibits a liquid phase upon application of a usable recording signal can be also used since the above-mentioned ink jet system is in general adapted to adjust the temperature of ink itself within a range of about 30° C. to 70° C. so as to control the temperature in order to hold the viscosity of the ink in a stable jetting range.

Anyway, ink which prevents a temperature rise caused by thermal energy by positively using the temperature rise as energy for the phase conversion from the solid phase into the liquid phase, or ink which is held in a sold phase in a leaving state in order to prevent the ink from being evaporated, may be used. Anyway there may used ink having such a feature that it is liquefied, at first time, upon application of thermal energy, such as ink which is liquefied in response to the application of recording signal for thermal energy and is jetted as liquid ink, ink which is already solidified at the time of arrival at a recording medium, or the like. In such a case, the ink may be set in such a configuration as disclosed in Japanese Patent Application Laid-Open No. 54-56847 or Japanese Patent Application Laid-Open No. 60-71260, that is, ink is held in a recess part formed of a porous sheet, or in through-holes so as to be opposed to the electrothermally energy converting media. In the present invention, the most effective one of the above-mentioned kinds is such that the above-mentioned membrane boiling is carried out.

In addition, the recording apparatus according to the present invention can be used as an image output terminal which is integrally or separatably incorporated with the above-mentioned data processing equipments such as word-processors or computers, or can have a configuration of a copying machine in combination with an image reader, of facsimile machine having signal transmitting and receiving functions.

Further, not only the ink jet type using thermal energy, the present invention is also applicable for another ink jet type such as using piezo elements or the like.

What is claimed is:

1. An ink jet recording method in which a plurality of recording heads, each having a plurality of ink jet elements, are reciprocated, relative to a recording medium so as to carry out plural cycles of recording scans for one area on the recording medium so as to complete recording in the one area, comprising the steps of:

scanning the recording heads in forward and backward directions of reciprocation; and successively recording images thinned at predetermined thinning rates in the one area during the plural cycles of recording scans, said images being thinned so as not to overlap each other with respect to pixels thereof, wherein during said recording step images recorded by each of the plurality of recording heads in an even scan in one of the forward and backward directions of reciprocation among even times of recording scans are recorded with a first predetermined thinning rate, and images recorded by each of the plurality of recording heads in an odd scan in another one of the forward and backward directions are recorded with a second predetermined thinning rate different from the first predetermined thinning rate.

2. An ink jet recording method as set forth in claim 1 during said recording step the recording head changes a state of ink by use of thermal energy so that ink droplets are jetted from the ink jet head.

3. An ink jet recording method for reciprocatingly moving, in forward and backward movements in a main scan direction, a recording head having a plurality of recording elements, each for ejecting ink, arrayed in a predetermined direction, different from the main scan direction, and causing the recording head to eject ink during each of the forward and backward movements of said recording head, thereby recording an image on a recording medium, said method comprising:

a first step of recording a first thinned image on a predetermined area of said recording medium during the forward movement of said recording head, in accordance with a first mask pattern, using a first group of the recording elements of said recording head;

a second step of feeding said recording medium in a sub-scan direction relative to said recording head by a distance corresponding to the predetermined area of said recording medium, after the first thinned image has been recorded in said first step, said distance corresponding to the predetermined area being shorter than a length recordable by the plurality of recording elements of said recording head;

a third step of recording a second thinned image on the predetermined area of said recording medium during the backward movement of said recording head, in accordance with a second mask pattern, using a second group of the recording elements of said recording head;

a fourth step of feeding said recording medium in the sub-scan direction relative to said recording head by a distance corresponding to the predetermined area of said recording medium after the second thinned image has been recorded in said third step;

a fifth step of recording a third thinned image on the predetermined area of said recording medium during the forward movement of said recording head, in accordance with a third mask pattern, using a third group of the recording elements of said recording head;

a sixth step of feeding the recording medium in a sub-scan direction relative to the recording head by a distance corresponding to the predetermined area, after the third thinned image has been recorded in said fifth step, the distance corresponding to the predetermined area being shorter than a length recordable by the plurality of recording elements of the recording head; and a seventh step of recording a fourth thinned image on the predetermined area of the recording medium during the backward movement of the recording head, in accordance with a fourth mask pattern, using a fourth group of the recording elements of the recording head, wherein each of the first, second, third and fourth mask patterns has a pixel array including pixel groups each composed of m (where m is an integer and $m \geq 2$) pixels in the main scan direction, arrayed in accordance with a predetermined array rule, the pixel groups not being adjacent to each other and not overlapping each other, pixels recorded in accordance with the first mask pattern and pixels recorded in accordance with the third mask pattern are adjacent to each other in the main scan direction, and pixels recorded in accordance with the second mask pattern and pixels recorded in accordance with the fourth mask pattern are adjacent to each other in the main scan direction.

4. An ink jet recording method as set forth in claim 3, wherein during said recording steps a plurality of droplets of a first color of ink are recorded in duplicate.

5. An ink jet recording method as set forth in claims 3 or 4, wherein during said recording steps the recording head changes a phase of the ink using thermal energy so that ink droplets are ejected.

6. An ink jet recording apparatus for reciprocatingly moving, in forward and backward movements in a main scan direction, a recording head having a plurality of recording elements, each for ejecting ink, arrayed in a predetermined direction different from the main scan direction, and causing said recording head to eject ink during each of the forward and backward movements of said recording head, thereby recording an image on a recording medium, said apparatus comprising:

scan means for reciprocatingly moving said recording head in the main scan direction to perform a recording scan;

feeding means for feeding said recording medium in a sub-scan direction relative to said recording head after an image has been recorded by performing the recording scan; and control means for controlling driving of said recording head so as to record images on said recording medium during the forward and backward movements of said recording head by said scan means using first and second mask patterns, respectively, wherein said control means controls the driving of said recording head so as to record a first thinned image on a predetermined area of said recording medium during the forward movement of said recording head, in accordance with a first mask pattern, using a first group of the recording elements of said recording head, and further controls the driving of said recording head, after feeding said recording medium by a distance corresponding to the predetermined area of said recording medium, to record a second thinned image on the predetermined area of said recording medium during the backward movement of said recording head, in accordance with a second mask pattern, using a second group of the recording elements of said recording head, wherein each of the first and second mask patterns has a pixel array including pixel groups each composed of m pixels in the main scan direction and n (where m and n are integers and n<m) pixels in the sub-scan direction, arrayed in accordance with a predetermined array rule, said pixel groups being adjacent to each other with continuous p (where p is an integer and n<p<m) pixels in the sub-scan direction, said pixel groups partially overlapping each other in the main scan direction, and wherein the first and second mask patterns have respective pixel arrays not overlapping each other.

7. An ink jet recording apparatus as set forth in claim 6, wherein the recording head changes a phase of the ink using thermal energy so that ink droplets are ejected.

8. An ink jet recording method for reciprocatingly moving, in forward and backward movements in a main scan direction, a recording head having a plurality of recording elements, each for ejecting ink, arrayed in a predetermined direction different from the main scan direction, and causing said recording head to eject ink during each of the forward and backward movements of said recording head, thereby recording an image on a recording medium, said method comprising:

a first step of recording a first thinned image on a predetermined area of said recording medium during the forward movement of said recording head, in accordance with a first mask pattern, using a first group of the recording elements of said recording head;

a second step of feeding said recording medium in a sub-scan direction relative to said recording head by a distance corresponding to the predetermined area of said recording medium, after the first thinned image has been recorded in said first step, said distance corresponding to the predetermined area being shorter than a length recordable by the plurality of recording elements of said recording head;

a third step of recording a second thinned image on the predetermined area of said recording medium during the backward movement of said recording head, in accordance with a second mask pattern, using a second group of the recording elements of said recording head;

wherein each of the first and second mask patterns has a pixel array including pixel groups each composed of m pixels in the main scan direction and n (where m and n are integers and n<m) pixels in the sub-scan direction, arrayed in accordance with a predetermined array rule, said pixel groups being adjacent to each other with continuous p (where D is an integer and n<p<m) pixels in the sub-scan direction, said pixel groups partially overlapping in the main scan direction, and wherein the first and second mask patterns have respective pixel arrays not overlapping each other.

9. An ink jet recording method as set forth in claim 8, wherein during said recording steps the recording head changes a phase of the ink using thermal energy so that ink droplets are ejected.

10. A method for recording printing position deviation adjusting test patterns in an ink jet recording apparatus which reciprocatingly moves, in forward and backward movements in a main scan direction, and includes a recording head having a plurality of recording elements, each for ejecting ink, arrayed in a predetermined direction different from the main scan direction, and the recording head is caused to eject ink during each of the forward and backward movements of the recording head, thereby recording an image on a recording medium, the method comprising:

a first step of recording a first test pattern having a length corresponding to plural pixels in the main scan direction, leaving a space corresponding to the plural pixels in the main scan direction, during the forward movement of the recording head, and a second step of recording a second test pattern having a length corresponding to the space in the main scan direction on the space during the backward movement of the recording head.

11. A recording method as set forth in claim 10, wherein during said recording steps the first and second test patterns are line-like patterns in the main scan direction.

12. A recording method as set forth in claim 11, wherein during said recording steps the line-like patterns are arranged in a plural number, with fine gaps therebetween arranged perpendicular to the main scan direction.

13. A recording method as set forth in claim 10, wherein during said recording steps the first and second test patterns are substantially band-like line patterns in the main scan direction.

14. A recording method as set forth in any one of claims 10 and 11 to 13, wherein during said recording steps the first and second test patterns are line like patterns in the main scan direction, and are recorded such that the second test pattern is recorded between successive recordings of the first test pattern.

15. A recording method as set forth in any one of claims 10 and 11 to 13, wherein during said recording steps the first and second test patterns are recorded in accordance with four or more sets of divided data, plural sets of divided data being provided to the recording head during each forward and backward movement of the recording head, respectively, so as to form the first and second test patterns during a plurality of forward and backward movements of the recording head.

16. A recording method as set forth in any one of claims 10 and 11 to 13, further comprising the step of providing the recording head such that the recording head is an ink jet head comprising a plurality of ink jet ports arranged in a direction crossing the main scan direction.

17. A recording method as set forth in any one of claims 10 and 11 to 13, wherein the recording head is provided with a plurality of head parts which are integrally incorporated with one another and are arranged at adjusted positional intervals, and further comprising the step of determining a registration adjustment of each of the head parts by an ink test of one of the head parts.

18. A recording method as set forth in any one of claims 10 and 11 to 13, wherein a plurality of the first and second test patterns are recorded in said recording steps in accordance with a plurality of forward and backward registration timings of divided data, and further comprising the step of changing the forward and backward registration timings while recording within a range of less than 1.00 pixel.

19. A recording method as set forth in claim 18, further comprising a step of performing a correcting process for correcting the forward and backward registration timings while recording within a range of less than 1.00 pixel.

20. A recording method as set forth in any one of claims 10 and 11 to 13, further comprising the step of providing divided data corresponding to the first and second test patterns during forward and backward movements of the recording head, the divided data corresponding to a plurality of dots which are successively recorded during one of the forward and backward movements of the recording head.

21. A recording method as set forth in any one of claims 10 and 11 to 13, wherein a plurality of sets of different first and second test patterns are recorded in a plurality of test pattern areas, respectively, and further comprising the step of designating a set of first and second test patterns by respectively designating a corresponding test pattern area.

22. A recording method as set forth in claim 21, further comprising the step of providing each of the plurality of test pattern areas with a first recording pattern area including a center test recording area and left and right test recording areas, and a second recording pattern area having a number of test recording areas which is less than that of the first recording pattern area.

23. A method for recording a printing position deviation adjusting pattern in an ink jet recording apparatus which reciprocatingly moves, in forward and backward movements in a main scan direction, and having a first recording head having a plurality of recording elements for ejecting a first color ink, arrayed in a predetermined direction, and a second recording head having a plurality of recording elements for ejecting a second color ink, arrayed in the predetermined direction, different from the main scan direction, and which also causes said first and second recording heads to eject the first color ink and the second color ink during each of the forward and backward movements of said recording head, thereby recording a color image on a recording medium, said method comprising:

a first step of recording a part of said adjusting pattern on a predetermined area of said recording medium during the forward movement of each of said first and second recording heads, in accordance with a first mask pattern, using a portion of the recording elements of each of said first and second recording heads;

a second step of feeding said recording medium in a sub scan direction relative to said recording heads by a distance corresponding to the predetermined area of said recording medium; and a third step of recording a remaining part of said adjusting pattern on the predetermined area of said recording medium during the backward movement of each of said first and second recording heads, in accordance with a second mask pattern, using a remaining portion of the recording elements of each of said first and second recording heads;

wherein said adjusting pattern comprises a plurality of overlapping pixels of the first and second color inks, said plurality of pixels not being adjacent to each other in each of the main scan direction and the sub-scan direction.

24. An ink jet recording apparatus which reciprocatingly moves, in forward and backward movements in a main scan direction, a recording head having a plurality of recording elements, each for ejecting ink, arrayed in a predetermined direction different from the main scan direction, and said recording head is caused to eject ink in each of the forward and backward movements of said recording head, thereby recording an image on a recording medium, said apparatus comprising:

scan means for reciprocatingly moving said recording head in the main scan direction to perform a recording scan; and control means for controlling driving of said recording head so as to record an image corresponding to a printing position deviation adjusting pattern on the recording medium during each of the forward and backward movements of said recording head, in accordance with a command for recording the adjusting pattern, wherein said control means controls the driving of said recording head so as to record a first test pattern having a length corresponding to plural pixels in the main scan direction in the forward movement of said recording head, leaving a space in the main scan direction, and to record a second test pattern having a length corresponding to the space in the main scan direction on the space in the backward movement of said recording head.

25. An ink jet recording apparatus as set forth in claim 24, wherein the first and second test patterns are line-like patterns in the main scan direction.

26. An ink jet recording apparatus as set forth in claim 25, wherein the first and second test patterns are composed of a plurality of line-like patterns in the main scan direction which are arranged with slight gaps therebetween in a direction perpendicular to the main scan direction.

27. An ink jet recording apparatus as set forth in claim 24, wherein the first and second test patterns are substantially band-like patterns in the main scan direction.

28. An ink jet recording apparatus as set forth in any one of claims 24 and 25 through 27, wherein the first and second test patterns are line patterns in the main scan direction which are recorded by the recording head during the forward and backward movements such that the second test pattern is recorded between successive recordings of the first test pattern.

29. An ink jet recording apparatus as set forth in any one of claims 24 and 25 through 27, wherein the first and second test patterns are recorded in accordance with four or more sets of divided data, plural sets of divided data being provided to the recording head during each forward and backward movement, respectively, so as to form the first and second test patterns during a plurality of forward and backward movements of the recording head.

30. An ink jet recording apparatus as set forth in any one of claims 24 and 25 through 27, wherein said recording head comprises a plurality of ink jet head parts which are integrally incorporated with one another and arranged at adjusted positional intervals, each of said head parts incorporating a plurality of ink jet ports arranged in a direction crossing the main scan direction, and a means for determining a registration adjustment for each of said head parts in accordance with an ink test of one of said head parts.

31. An ink jet recording apparatus as set forth in any one of claims 24 and 25 through 27, further comprising means for forming a plurality of the first and second test patterns in accordance with divided data having a forward and backward registration timing which is changed while recording within a range of less than 1.00 pixel.

32. An ink jet recording apparatus as set forth in claim 31, further comprising correction means for correcting the forward and backward registration timing while recording within a range of less than 1.00 pixel.

33. An ink jet recording apparatus as set forth in any one of claims 24 and 25 through 27, wherein divided data corresponding to the first and second test patterns is provided, respectively, during forward and backward movements of the recording head so that a plurality of dots are successively recorded during one of the forward and backward movements of the recording head.

34. An ink jet recording apparatus as set forth in any one of claims 24 and 25 through 27, further comprising memory means for storing data, said memory means having designating means for designating a plurality of test pattern areas, and for recording the first and second test patterns in one or more of the plurality of test pattern areas.

35. An ink jet recording apparatus as set forth in claim 34, wherein the plurality of test pattern areas comprise a first recording pattern area including a center test recording area and left and right test recording areas, and a second recording pattern area having a number of test recording areas which is less than that of the first recording pattern area.

36. An ink jet recording apparatus as set forth in any one of claims 24 and 25 through 27, further comprising means for reading a recording condition of the adjusting pattern and for performing registration adjustment.

37. A method for recording a printing position deviation adjusting pattern in an ink jet recording apparatus which reciprocatingly moves, in forward and backward movements in a main scan direction, a recording head having a plurality of recording elements, each for ejecting ink, arrayed in a predetermined direction different from the main scan direction, and causes the recording head to eject ink during each of the forward and backward movements of the recording head, thereby recording an image on a recording medium, said method comprising:

a first step of recording a first adjusting pattern having a length corresponding to plural pixels in the main scan direction, leaving a predetermined number of spaces, and thereafter recording a second adjusting pattern on the predetermined number of spaces in the backward movement of the recording head, a first mark associated with the first adjusting pattern being recorded together with the first adjusting pattern in said first step; and a second step of changing a driving timing of the recording head to perform said first step, and recording a second mark, the second mark recorded in said second step being different from the first mark recorded in said first step.

38. A recording method as set forth in claim 37, comprising recording the first and second adjusting patterns in band-like patterns in the main scan direction such that the second adjusting pattern is recorded between successive recordings of the first adjusting pattern, and further comprising recording a plurality of the first and second adjusting patterns each having corresponding forward and backward registration timings for divided data, which are changed in positive and negative directions within a range of less than 1.00 pixel, during forward and backward movements of the recording head in accordance with a designated registration.

39. A recording method as claimed in claim 37, further comprising the step of changing registrations corresponding to the first and second marks, during forward and backward movements of the recording head, into predetermined recording registrations in accordance with the first and second marks.

40. A recording method as set forth in claim 39, further comprising designating a plurality of first test pattern areas containing, as test recording areas of a recording medium, a center test recording area and respective test recording areas on left and right sides of the center test recording area, and a plurality of second test pattern areas containing a number of test recording areas which is less than that of said first test pattern areas, and respectively designating a plurality of test pattern areas so as to designate a test pattern recording image.

41. An ink jet recording method in which a recording head, having a plurality of ink jet elements, is reciprocated, relative to a recording medium so as to carry out plural cycles of recording scans for one area on the recording medium so as to complete recording in the one area, comprising the steps of:

scanning the recording head in forward and backward directions of reciprocation; and successively recording images thinned at a predetermined thinning rate in the one area during even times of recording scans, said image being thinned using different mask patterns in respective recording scans, the images being thinned so as not to overlap each other with respect to pixels thereof, wherein each mask pattern has a pixel array including a plurality of pixel groups different in number of pixels from each other in the main scan direction, each of said pixel groups including a plurality of pixels, and the pixel groups are arranged according to a predetermined array rule in the pixel array, and wherein the thinning rate of an image recorded during a recording scan in one of the forward and backward directions of reciprocation of the plural cycles of recording scans is different from that of an image recorded during a recording scan in another one of the forward and backward directions.

42. An ink jet recording method as set forth in claim 41, wherein the recording head changes a state of ink by use of thermal energy so that ink droplets are jetted from the ink jet head.

* * * * *

UNITED STATES PATENT AND TRADEMARK OFFICE
CERTIFICATE OF CORRECTION

PATENT NO. : 6,164,745
DATED : December 26, 2000
INVENTOR(S) : Shigeyasu Nagoshi et al.

It is certified that error appears in the above-identified patent and that said Letters Patent is hereby corrected as shown below:

Title page,
Item [76], Inventors, "Shigeyasu Nagoshi; Makoto Torigoe; Hiromitsu Hirabayashi; Miyuki Mastubara, all of c/o Canon Kabushiki Kaisha 30-2, 3-chome, Shimomaruko, Ohta-ku, Tokyo, Japan" should read -- Shigeyasu Nagoshi; Makoto Torigoe; Hiromitsu Hirabayashi; Miyuki Mastubara, all of (JP) --.

Column 2,
Line 11, "data" should read -- data are --.

Column 5,
Line 26, "landing" should read -- landing on --; and
Line 27, "but" should read -- but is --.

Column 6,
Line 34, "fact" should read -- fact that --.

Column 7,
Line 21, "heat"" should read -- the head --.

Column 8,
Line 18, "are different in" should read -- differ as to --; and
Line 24, "only" should read -- only in --.

Column 12,
Line 10, "of use." should read -- use. --.

Column 13,
Line 13, "vertilines" should read -- vertical lines --;
Line 22, "exaction of" should read -- demand for --; and
Line 40, "produced in association with" should read -- devised with an eye to correcting --.

Column 14,
Line 44, "pm" should read -- $\mu$m --.

Column 17,
Line 50, "a the four pass printing in" should read -- the four pass printing in a --.

UNITED STATES PATENT AND TRADEMARK OFFICE
CERTIFICATE OF CORRECTION

PATENT NO. : 6,164,745
DATED : December 26, 2000
INVENTOR(S) : Shigeyasu Nagoshi et al.

It is certified that error appears in the above-identified patent and that said Letters Patent is hereby corrected as shown below:

Column 20,
Line 36, "cartridges" should read -- cartridge --.

Column 22,
Line 26, "each of" should read -- of --.

Column 23,
Line 53, "print" should read -- print with --.

Column 27,
Line 59, "uneven" should read -- of uneven --.

Column 28,
Line 57, "resting which are" should read -- resting, which is --.

Column 29,
Line 9, "exhibits" should read -- exhibit --; and
Line 56, "such a case that recording" should read -- which case, recording is carried out --.

Column 30,
Line 7, "time difference, uneven" should read -- a time difference, an uneven --;
Line 13, "process" should read -- processes --; and
Line 22, "this" should read -- in this --.

Column 32,
Line 4, "are" should read -- is --;
Line 16, "which it can provide" should read -- so that there can be provided --;
Line 29, "bayer" should read -- Bayer --;
Line 33, "step-likely," should read -- stepwise, --;
Line 43, "are" should read -- and --; and
Line 55, "set" should read -- to set --.

Column 33,
Line 2, "color" should read -- colors --;
Line 6, "particular" should read -- particularly --;
Line 28, "direction" should read -- directions --;
Line 32, "ununiform" should read -- non-uniform --;
Line 56, "ununiformity" should read -- non-uniformity --;

UNITED STATES PATENT AND TRADEMARK OFFICE
CERTIFICATE OF CORRECTION

PATENT NO. : 6,164,745
DATED : December 26, 2000
INVENTOR(S) : Shigeyasu Nagoshi et al.

It is certified that error appears in the above-identified patent and that said Letters Patent is hereby corrected as shown below:

Column 33 cont'd,
Line 57, "mask" should read -- masks --;
Line 62, "scan))" should read -- scan) --; and
Line 64, "color in each scan can be uniformalized." should read -- colors in each scan can be made uniform --.

Column 34,
Line 16, "deference" should read -- difference --;
Line 27, "is" should read -- are --;
Line 31, "it is" should read -- making it --;
Line 32, "improve hindrance by" should read -- correct hindrance of --;
Line 48, "those" should read -- the sum of the number of pixels --;
Line 50, "mask" should read -- masks --; and
Line 61, "those" should read -- the instability --.

Column 35,
Line 37, "affection" should read -- the effect caused --.

Column 37,
Line 62, "event" should read -- even --.

Column 38,
Line 39, "indicates" should read -- indicate --;
Line 53, "two times as large as the" should read -- than twice as great a --; and
Line 54, "pixels" should read -- pixel --.

Column 40,
Line 11, "that" should read -- those --;
Line 27, "with which" should read -- which --; and
Line 64, "disappeared" should read -- made to disappear --.

Column 41,
Line 27, "color are carried." should read -- color. --; and
Line 59, "are" should read -- is --.

Column 42,
Line 1, "are" should read -- is --.

UNITED STATES PATENT AND TRADEMARK OFFICE
CERTIFICATE OF CORRECTION

PATENT NO. : 6,164,745
DATED : December 26, 2000
INVENTOR(S) : Shigeyasu Nagoshi et al.

It is certified that error appears in the above-identified patent and that said Letters Patent is hereby corrected as shown below:

Column 43,
Line 5, "determines" should read -- determine --; and
Line 67, "ready" should read -- reading --.

Column 44,
Line 52, "detected" should read -- detect --.

Column 45,
Line 13, "made" should read -- been made --.

Column 46,
Line 2, "corresponds" should read -- correspond --;
Line 19, "thermally energy" should read -- thermal-energy --;
Line 29, "electrothermally energy" should read -- electrothermal-energy --;
Line 38, "incorporate" should read -- incorporated, --;
Line 46, "another" should read -- other --;
Line 47, "which" should be deleted;
Line 50, "use" should read -- use of --; and
Line 63, "sold" should read -- solid --.

Column 47,
Line 8, "electrothermally" should read -- electrothermal --;
Line 17, "of" should read -- or of a --;
Line 46, "claim 1" should read -- claim 1, --; and
Line 47, "during" should read -- wherein during --.

Signed and Sealed this

Nineteenth Day of August, 2003

JAMES E. ROGAN
*Director of the United States Patent and Trademark Office*